(12) United States Patent
Kreysler et al.

(10) Patent No.: US 12,378,764 B2
(45) Date of Patent: *Aug. 5, 2025

(54) WEATHERPROOF JOINT FOR EXTERIOR BUILDING PANELS

(71) Applicant: William Kreysler & Associates, Inc., American Canyon, CA (US)

(72) Inventors: William Kreysler, American Canyon, CA (US); Timothy Oliver, San Francisco, CA (US); Joshua Zabel, Oakland, CA (US); Alyssa Johnson, American Canyon, CA (US)

(73) Assignee: William Kreysler & Associates, Inc., American Canyon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,320

(22) Filed: Apr. 22, 2024

(65) Prior Publication Data
US 2024/0344333 A1 Oct. 17, 2024

Related U.S. Application Data

(63) Continuation of application No. 17/665,246, filed on Feb. 4, 2022, now Pat. No. 11,965,331.

(60) Provisional application No. 63/145,808, filed on Feb. 4, 2021.

(51) Int. Cl.
*E04B 2/96* (2006.01)
*B32B 3/30* (2006.01)
(Continued)

(52) U.S. Cl.
CPC .................. *E04B 2/92* (2013.01); *B32B 3/30* (2013.01); *B32B 5/02* (2013.01); *B32B 13/14* (2013.01);
(Continued)

(58) Field of Classification Search
CPC ... E04B 2/885; E04B 2/90; E04B 2/92; E04B 2/96; E04B 2/721; E04B 2/723; E04B 1/14; E04B 1/6518; E04B 2002/0243; E04B 2002/0245; E04B 2002/0247; E04B 2002/0252; E04B 2002/0254; E04C 2/26; E04C 2/28; E04C 2/292; E04C 2/296; E04C 2/388; F16B 5/0024
See application file for complete search history.

(56) References Cited

U.S. PATENT DOCUMENTS 1,045,691 A * 11/1912 Fischer .................. F41H 5/013
89/36.01
1,723,306 A * 8/1929 Sipe ........................ E04B 1/615
52/396.04
(Continued)

*Primary Examiner* — Kyle J. Walraed-Sullivan
(74) *Attorney, Agent, or Firm* — Polsinelli PC

(57) ABSTRACT

In one aspect, the present disclosure includes a curtain wall panel having an inner core material sandwiched between two outer walls and at least one elastic member inserted into at least one channel formed by the inner core material. In some aspects, the present disclosure provides a curtain wall system including a plurality of adjacent panels of the present disclosure and at least one joining member configured to be received within a recess formed by the at least one elastic member of at least two of the plurality of adjacent panels. In another aspect, the present disclosure provides a method for assembling a curtain wall system of the present disclosure.

20 Claims, 48 Drawing Sheets

(51) Int. Cl.
  *B32B 5/02* (2006.01)
  *B32B 13/14* (2006.01)
  *B32B 27/12* (2006.01)
  *B32B 27/18* (2006.01)
  *B32B 27/36* (2006.01)
  *E04B 2/92* (2006.01)
  *E04F 13/08* (2006.01)

(52) U.S. Cl.
  CPC .............. *B32B 27/12* (2013.01); *B32B 27/18* (2013.01); *B32B 27/36* (2013.01); *E04B 2/96* (2013.01); *E04F 13/0866* (2013.01); *E04F 13/0898* (2013.01); *B32B 2260/021* (2013.01); *B32B 2260/046* (2013.01); *B32B 2262/101* (2013.01); *B32B 2307/304* (2013.01); *B32B 2307/3065* (2013.01); *B32B 2307/4026* (2013.01); *B32B 2307/712* (2013.01); *B32B 2607/00* (2013.01); *E04F 2201/0547* (2013.01)

(56) References Cited

U.S. PATENT DOCUMENTS

| | | | | |
|---|---|---|---|---|
| 1,743,492 A * | 1/1930 | Sipe | F16B 19/002 | 29/451 |
| 1,985,992 A * | 1/1935 | Hayman | A63H 33/105 | 376/459 |
| 2,363,405 A * | 11/1944 | Eichelberger | E04B 2/42 | 403/409.1 |
| 2,392,551 A * | 1/1946 | Roe | E04B 2/08 | 52/592.6 |
| 2,423,695 A * | 7/1947 | Falco | E04C 2/384 | 52/223.7 |
| 3,512,819 A * | 5/1970 | Gillingwater | E04B 1/6158 | 52/461 |
| 3,640,039 A * | 2/1972 | McKee | E04B 1/6158 | 52/396.04 |
| 3,641,730 A * | 2/1972 | Meckstroth | F16B 5/0052 | 52/309.11 |
| 3,667,180 A * | 6/1972 | Tischuk | E04F 13/0803 | 52/592.4 |
| 3,680,277 A * | 8/1972 | Martin | F16B 5/0052 | 52/438 |
| 3,686,817 A * | 8/1972 | Adams | E04B 1/6154 | 52/438 |
| 3,791,090 A * | 2/1974 | Kniefel | E04B 2/08 | 52/286 |
| 3,797,190 A * | 3/1974 | Widdowson | E04C 2/292 | 52/592.4 |
| 3,849,959 A * | 11/1974 | Lindner | E04C 2/296 | 52/396.05 |
| 3,972,167 A * | 8/1976 | Vogeli | E06B 5/00 | 52/574 |
| 4,052,832 A * | 10/1977 | Jungers | E04B 1/32 | 52/779 |
| 4,123,885 A * | 11/1978 | Scott | E04F 13/12 | 52/489.1 |
| 4,170,430 A * | 10/1979 | Mrotzek | F16B 5/0024 | 403/292 |
| 4,316,351 A * | 2/1982 | Ting | E04C 2/292 | 52/592.4 |
| 4,486,994 A * | 12/1984 | Fisher | E04B 1/14 | 52/742.16 |
| 4,589,240 A * | 5/1986 | Kendall | E06B 3/827 | 49/501 |
| 4,712,352 A * | 12/1987 | Low | E04C 2/296 | 52/656.1 |
| 4,744,185 A * | 5/1988 | Lamberet | E04C 2/292 | 52/309.11 |
| 4,854,095 A * | 8/1989 | Michlovic | E04B 2/88 | 52/311.1 |
| 4,936,069 A * | 6/1990 | Hunter | E04C 2/292 | 52/794.1 |
| 5,007,222 A * | 4/1991 | Raymond | F24F 13/20 | 52/775 |
| 5,014,476 A * | 5/1991 | Leslie | E04B 1/6162 | 52/586.1 |
| 5,056,290 A * | 10/1991 | Alexander | E04B 1/6116 | 52/309.3 |
| 5,179,810 A * | 1/1993 | Gename | E04B 2/7409 | 52/240 |
| 5,272,850 A * | 12/1993 | Mysliwiec | E04B 1/6158 | 52/775 |
| 5,533,312 A * | 7/1996 | Mihalcheon | E06B 3/827 | 52/800.1 |
| 5,548,937 A * | 8/1996 | Shimonohara | F16B 5/0076 | 52/587.1 |
| 5,628,158 A * | 5/1997 | Porter | E04C 2/296 | 52/794.1 |
| 5,950,389 A * | 9/1999 | Porter | E04C 2/296 | 403/DIG. 15 |
| 6,186,691 B1 * | 2/2001 | Rudolf-Bauer | E06B 7/2318 | 403/381 |
| 6,192,641 B1 * | 2/2001 | Andraso | E04B 1/948 | 52/235 |
| 6,761,008 B2 * | 7/2004 | Chen | B29C 65/564 | 52/309.1 |
| 6,799,404 B2 * | 10/2004 | Spransy | E04B 9/02 | 52/582.1 |
| 8,147,162 B1 * | 4/2012 | Burnett | F16B 12/20 | 312/263 |
| 10,316,516 B2 * | 6/2019 | Carlyon | E04C 2/292 |  |
| 10,829,929 B1 * | 11/2020 | Hansen | E04B 1/6162 |  |
| 11,221,031 B1 * | 1/2022 | Pedrotti | F16B 5/0024 |  |
| 11,965,331 B2 * | 4/2024 | Kreysler | E04F 13/0898 |  |
| 2003/0046892 A1 * | 3/2003 | Albany | E04C 2/292 | 52/582.1 |
| 2005/0034413 A1 * | 2/2005 | Weber | E04B 2/705 | 52/831 |
| 2006/0016151 A1 * | 1/2006 | Tan | E04B 2/7425 | 52/775 |
| 2007/0240375 A1 * | 10/2007 | Bennett | E04D 3/18 | 52/586.1 |
| 2009/0100780 A1 * | 4/2009 | Mathis | E04C 2/296 | 52/794.1 |
| 2009/0199497 A1 * | 8/2009 | Wrightman | E04B 2/705 | 52/745.1 |
| 2009/0241460 A1 * | 10/2009 | Beaulieu | F16B 21/082 | 52/586.2 |
| 2010/0162659 A1 * | 7/2010 | Laprise | E04B 2/7425 | 52/762 |
| 2011/0047922 A1 * | 3/2011 | Fleming, III | B32B 7/12 | 52/582.1 |
| 2011/0265310 A1 * | 11/2011 | Beaulieu | A47B 97/00 | 29/525.08 |
| 2013/0326984 A1 * | 12/2013 | Litaize | E04B 1/6137 | 52/426 |
| 2015/0086793 A1 * | 3/2015 | Kreysler | B32B 27/12 | 156/243 |
| 2015/0176619 A1 | 6/2015 | Baker | | |
| 2016/0002913 A1 * | 1/2016 | Schilcher | E04B 1/61 | 52/586.2 |
| 2018/0298600 A1 * | 10/2018 | Moss | E04B 1/388 | |
| 2018/0298609 A1 * | 10/2018 | Banerjee | B32B 5/245 | |
| 2018/0355604 A1 * | 12/2018 | Schilcher | F16B 5/0056 | |
| 2018/0355607 A1 * | 12/2018 | Parshad | E04C 2/30 | |
| 2020/0325682 A1 * | 10/2020 | Du | E04F 15/02038 | |
| 2022/0136234 A1 * | 5/2022 | Schneider | E04B 1/2403 | 52/586.2 |
| 2022/0282473 A1 * | 9/2022 | Sutton | B65D 88/522 | |
| 2023/0160215 A1 * | 5/2023 | Orjebin | B32B 9/002 | 52/483.1 |

* cited by examiner

WEATHERPROOF JOINT FOR EXTERIOR BUILDING PANELS

CROSS-REFERENCE TO RELATED APPLICATIONS

This application is a continuation of and claims the benefit of U.S. application Ser. No. 17/665,246, filed on Feb. 4, 2022, entitled "WEATHERPROOF JOINT FOR EXTERIOR BUILDING PANELS," which claims the benefit of priority to U.S. provisional application No. 63/145,808, filed Feb. 4, 2021, entitled "WEATHERPROOF JOINT FOR EXTERIOR BUILDING PANELS," each of the foregoing applications is expressly incorporated by reference herein in their entireties.

FIELD OF THE DISCLOSURE

The present disclosure pertains to curtain wall panels, curtain wall systems, and methods of assembling curtain wall systems, more specifically, the present disclosure pertains to fiber-reinforced plastic (FRP) curtain wall panels, FRP curtain wall systems, and methods of assembling FRP curtain wall systems.

BACKGROUND

A curtain wall is the non-structural outer covering or cladding of a building, utilized to keep the weather out and occupants in. It is anchored to a building to form the building facade, cladding, or envelope. Current curtain wall systems typically include panels constructed from glass, metal, or cement, and a connection system for joining the panels together. The panels are typically fixed to the building via anchors or brackets. Curtain wall systems may be assembled on site or alternatively, may be "unitized" systems that are assembled at a factory prior to installation.

BRIEF DESCRIPTION OF THE DRAWINGS

The following detailed description will be better understood when read in conjunction with the accompanying drawings, which illustrate certain aspects of the present disclosure. It should be understood that the accompanying drawings, which are incorporated herein and constitute a part of this specification, depict only example aspects or features consistent with the present disclosure and therefore should not be considered to be limiting of its scope. The accompanying drawings, together with the description, serve to explain the advantages and principles consistent with the present disclosure, in which.

Reference characters indicate corresponding elements among the views of the drawings. The headings used in the figures do not limit the scope of the claims.

DETAILED DESCRIPTION

Figure 1:
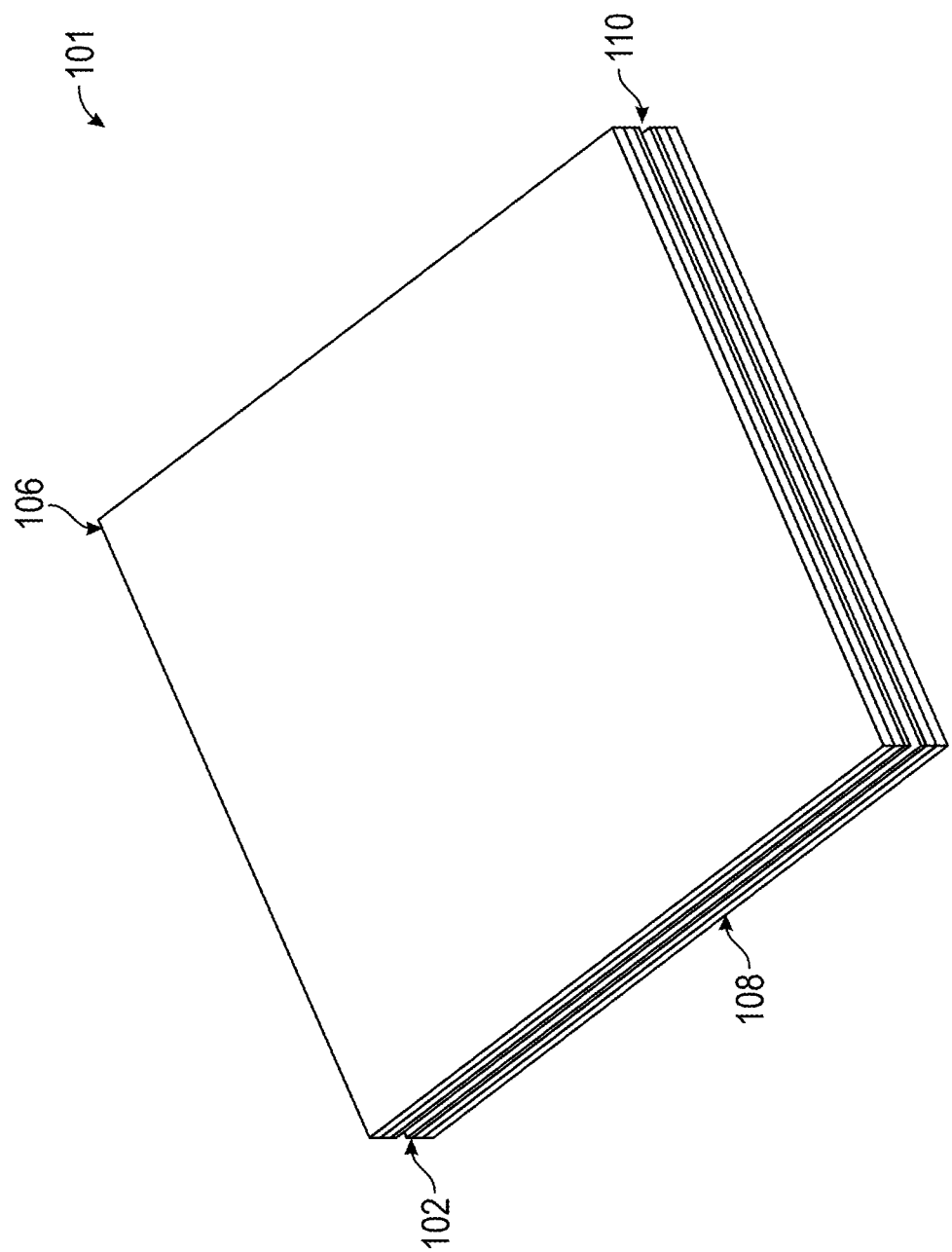
FIG. 1 is a perspective view of an example curtain wall panel in accordance with some aspects of the present disclosure.

Various examples of the present disclosure will be described more fully hereinafter with reference to the accompanying drawings, in which like numerals represent like elements throughout the several figures and in which example embodiments aspects or features are shown. A person skilled in the relevant art will recognize that other components and/or configurations may be used without parting from the spirit and scope of the disclosure. Thus, the following description and the accompanying drawings are merely illustrative and are not to be construed as limiting. Numerous specific details are described herein to provide a thorough understanding of the present disclosure. However, in certain aspects, well-known or conventional details are not described to avoid obscuring the description.

However, some examples of the claims may be embodied in many different forms and should not be construed as limited to the embodiments set forth herein. The examples set forth herein are non-limiting examples and are merely examples among other possible examples.

Reference to "one example," "some examples," "other examples," "one aspect," "some aspects," or "other aspects" means that a particular feature, structure, or characteristic described in connection with the example or aspect is included in at least one embodiment of the disclosure. The appearance of the above-listed phrases in various places in the specification do not necessarily refer to the same example or aspect, nor do they necessarily refer to separate or alternative examples or aspects mutually exclusive of other examples or aspects. Moreover, various features are described which may be exhibited by some examples or aspects and not by others.

The terms used in this specification generally have their ordinary meanings in the art, within the context of the present disclosure, and in the specific context where each term is used. Alternative language and synonyms may be used for any one or more of the terms discussed herein, and no special significance should be placed upon whether a term is elaborated or discussed herein. In some cases, synonyms for certain terms are provided. A recital of one or more synonyms does not exclude the use of other synonyms. The use of examples anywhere in this specification, including examples of any terms discussed herein is illustrative only and is not intended to further limit the scope and meaning of the disclosure or of any example term. Likewise, the disclosure is not limited to various examples or aspects given in this specification.

Additional features and advantages of the present disclosure will be set forth in the following description, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The present disclosure provides improvements over current curtain wall panels, connection systems for curtain wall panels, and methods of assembling curtain wall systems by providing curtain wall panels, connection systems for curtain wall panels, and methods of assembling curtain wall systems that provide improved thermal insulation and waterproofing, decreased fabrication and installation time and costs, and decreased difficulty and expense in replacing curtain wall panels compared to current connection systems, methods, and panels for curtain walls.

Curtain Wall Panel

In one aspect, the present disclosure relates to a curtain wall panel or cladding for an exterior of a building. For example, FIGS. 1-7 illustrate an example curtain wall panel of the present disclosure.

Figure 2:
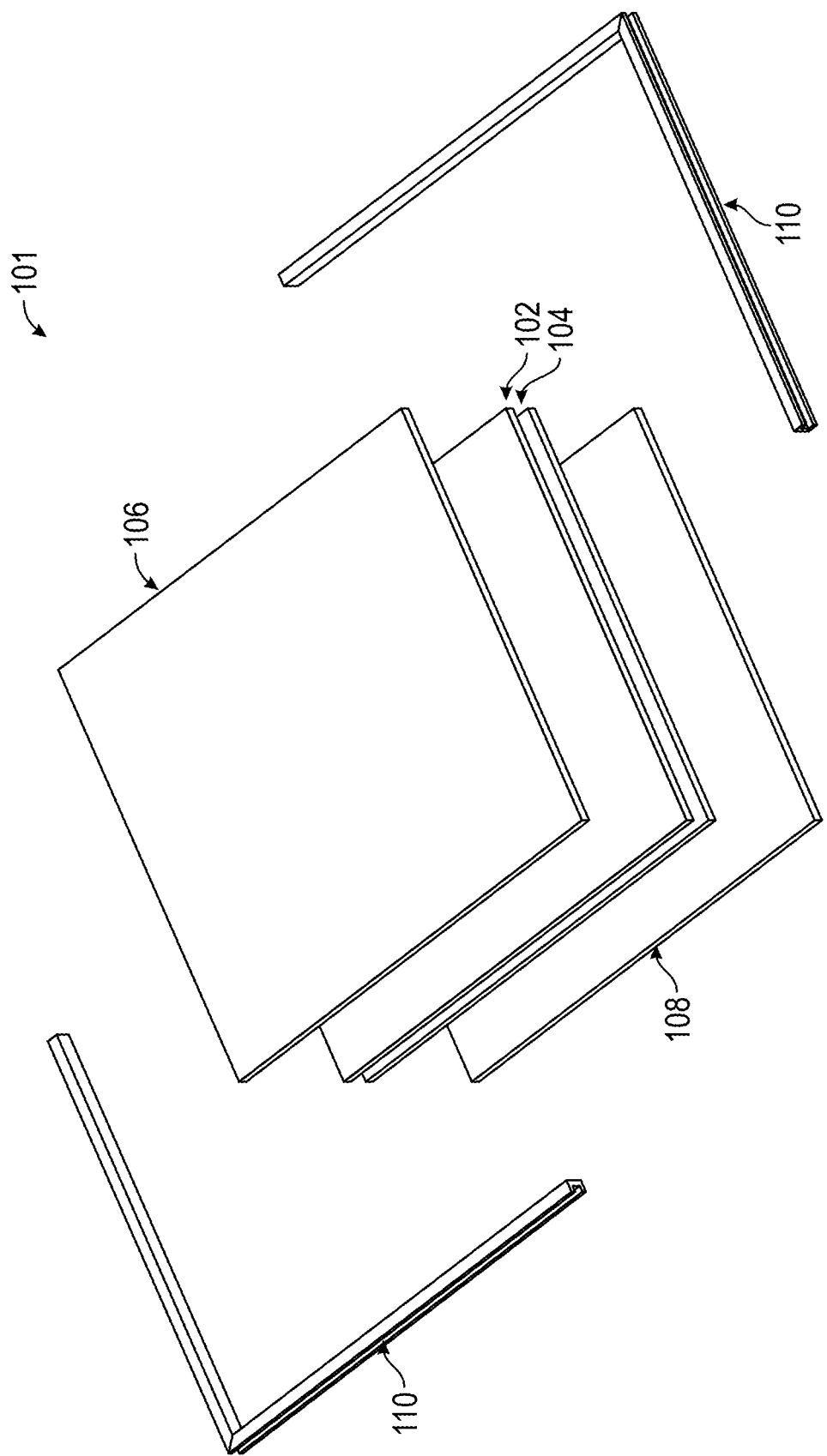
FIG. 2 is an exploded view of the example curtain wall panel of FIG. 1.
Figure 3:
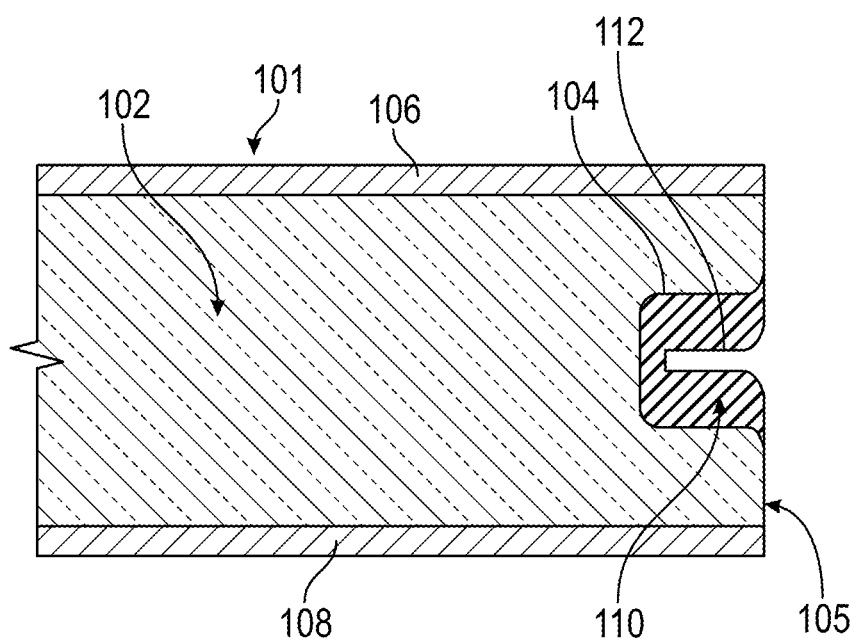
FIG. 3 is a cross-sectional view of a portion of the example curtain wall panel of FIG. 1.

FIG. 1 is a perspective view of an example curtain wall panel 101 of the present disclosure, FIG. 2 is an exploded view of the example curtain wall panel 101 of FIG. 1, and FIG. 3 is a cross-sectional view of a portion of the example curtain wall panel of FIG. 1.

As shown in FIGS. 1 and 2, the panel 101 may be rectangular or square. However, the panel 101 may be any shape and size suitable for use as a curtain wall panel of a building.

As shown in FIGS. 1-3 the panel 101 includes an inner core material 102, also referred to herein as a core 102. The inner core material may comprise any type of insulating material sufficient to provide weatherproofing, waterproofing or water resistance, and/or fire-resistance to curtain wall panels as required by the governing building codes and regulations, including but not limited to, gypsum, vacuum sealed space, fire-retardant insulation, fire-resistant FRP, and/or insulating foam, or a combination thereof. In some aspects, the fire-resistant FRP may include, but is not limited to, a moldable FRP composite 400, 500, or 600 of the present disclosure, as described herein and illustrated in FIGS. 16-18.

In some aspects, the core 102 has a length, a width, and a thickness. In some aspects the thickness of the core 102 may be 2 to 8 inches. In at least one aspect, the thickness of the core 102 may be 4 inches. In some instances, the thickness of the core 102 may be uniform or may vary across the length and/or width of the core 102. However, it is foreseen that the length, width, and/or thickness of the core 102 may be any size suitable for use as a curtain wall panel of a building.

Figure 4:
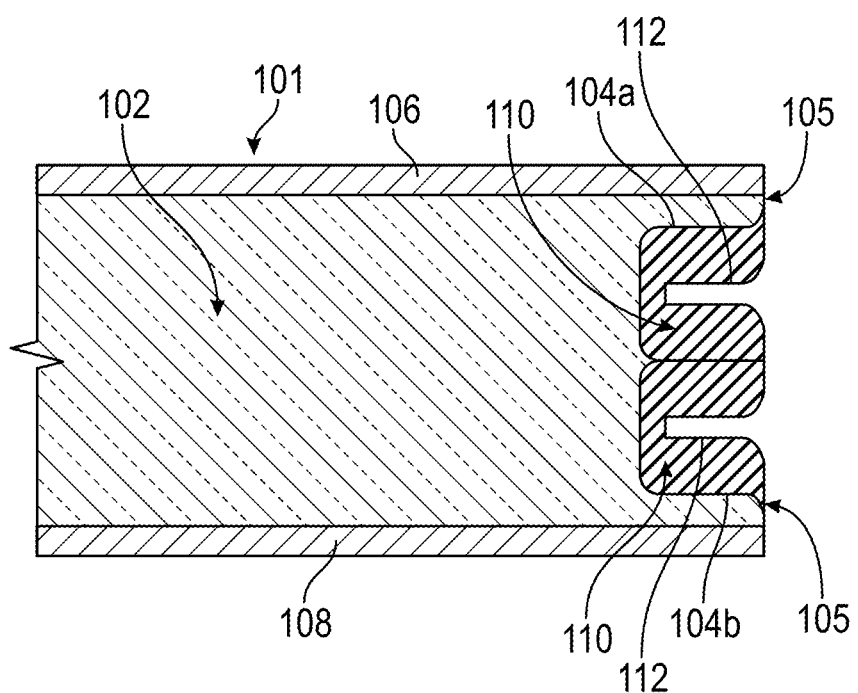
FIG. 4 is a cross-sectional view of the portion of the example curtain wall panel of FIG. 1, illustrating additional features in accordance with some aspects of the present disclosure.

In some aspects, the core 102 has a perimeter 105 and forms at least one core channel 104 that extends around the perimeter 105 of the core 102 and extends a predetermined depth inward from the perimeter 105, in a direction toward a center of the panel 101. In some aspects, the predetermined depth of the at least one core channel 104 is constant around the perimeter 105 of the core 102. In other aspects, the predetermined depth of the at least one core channel 104 may vary around the perimeter 105 of the core 102. In some examples, as shown in FIGS. 1 and 2, the at least one core channel 104 may be a single channel that extends around an entirety of the perimeter 105 of the core. However, it is foreseen that the at least one core channel 104 may include any number of channels. For example, the at least one core channel 104 may include two or more core channels 104, each of which extend around a portion of the perimeter 105 of the core. In some examples, as shown in FIG. 4, the at least one core channel 104 may include a first core channel 104a and a second core channel 104b that extend around the perimeter 105 of the core 102 parallel to one another and extend to a predetermined depth from the perimeter 105 toward the center of the panel 101. In examples where the at least one core channel 104 includes two core channels 104, the predetermined depth to which the core channels 104a and 104b extend inward from the perimeter 105 may be the same or different. In some aspects, the predetermined depth to which the at least one core channel 104, 104a, 104b extend may be 1 to 3 inches.

The panel 101 further includes a first outer wall 106 coupled to a first side of the core 102, and a second outer wall 108 coupled to a second side of the core 102 opposite the first side. In some aspects, the first outer wall 106 and/or second outer wall 108 comprise, consist, or consist essentially of gypsum or other fire-resistant material. For example, in some instances, the first outer wall 106 and/or the second outer wall may comprise a fire-resistant fiber-reinforced plastic (FRP), including but not limited to the moldable FRP composite 400, 500, or 600 of the present disclosure, as described herein and illustrated in FIGS. 16-18. In some aspects, the first outer wall 106 and/or the second outer wall may have an inner layer comprising gypsum and an outer layer comprising fire-resistant FRP attached thereto. In some instances, the outer layer comprising fire-resistant FRP may be the moldable FRP composite 400, 500, or 600 of the present disclosure, as described herein and illustrated in FIGS. 16-18. However, the use of an additional outer layer is generally for architectural purposes and is not required, and when present, the additional outer layer may comprise other materials used for curtain wall panels, such as glass, aluminum, cement, or the like.

In some examples, the first outer wall 106 may include a gel coat layer having at least one of heat-dissipating components, initiators, fillers, or other additives. In some aspects, when exposed to heat or fire, the gel coat layer may release water, swell, increase in surface area and/or produce char to decrease the thermal conductivity and heat transfer across the outer wall 106 and cool the panel 101. The volume or weight ratio of gel coat, heat-dissipating components, accelerators, initiators, fillers and/or other additives in the gel coat layer can be varied to accommodate different applications, fire standards, smoke standards, building standards or other desired product specifications. In some aspects, the gel coat may be a halogenated or non-halogenated resin, such as a polyester resin. In some aspects, the gel coat FIREBLOCK™ 2330PAWK745 manufactured by CCP Composites U.S.

In some aspects the first outer wall 106 and the second outer wall 108 may have a length, a width, and a thickness. In some aspects, the thickness of the first outer wall 106 and/or the second outer wall 108 may be uniform or may vary across a length and/or width thereof. In some aspects, the thickness of the first outer wall 106 and/or the second outer wall 108 may be 0.19 inches to 2 inches. In at least one aspect, the thickness of the first outer wall 106 and/or the second outer wall 108 may be 0.56 inches. However, it is foreseen that the thickness of the first outer wall 106 and/or the second outer wall 108 may be any thickness suitable for use as a curtain wall panel.

The panel 101 further includes at least one elastic member 110. In some aspects, the at least one elastic member 110 is configured to be received within the at least one core channel 104 of the core 102.

In some aspects, the at least one elastic member 110 is a single elastic member that encircles the entirety of the core channel 104. However, it is foreseen that any number of elastic members 110 may be used. For example, as shown in FIG. 2, the at least one elastic member 110 includes two elastic members 110 that encircle the core channel 104.

Turning to FIG. 4, in examples where the at least one core channel 104 includes two core channels 104 that extend around the perimeter 105 of the core 102 parallel to one another, the at least one elastic member 110 may include two elastic members 110 that extend parallel to one another and are received in the two parallel core channels 104, respectively.

As shown in FIGS. 1-5, the at least one elastic member 110 forms a recess 112 (or if more than one elastic member 110, each elastic member 110 forms a recess 112) that extends around a top surface of the at least one elastic member 110, respective to the perimeter 105, and extends a predetermined depth inward toward the perimeter 105 of the core 102. In some aspects, the predetermined depth to which the recess 112 extends may be 1 to 3 inches. In some aspects, the recess 112 may extend inward through a portion of a depth of the at least one elastic member 110. In other aspects, the recess 112 may extend inward through an entirety of the depth of the at least one elastic member 110, to the core channel 104 formed by perimeter 105 of the core 102.

Although not shown, in some examples, each elastic member 110 may include two recesses 112. In examples where each panel 101 includes multiple recesses 112, whether the elastic member 110 includes two recesses 112 or the panel 101 includes two elastic members with at least one recess 112 each (as shown in FIG. 4), the predetermined depth to which the recesses 112 of the elastic member(s) 110 extend toward the perimeter 105 may be the same or different. In some instances, the at least one elastic member 110 may be a rubber gasket. In some aspects, a bottom surface of the at least one elastic member 110 may contact a bottom surface of the at least one core channel 104, for example, as shown in FIG. 3. In some aspects, the bottom surface of the at least one elastic member 110 may be spaced apart from the bottom surface of the at least one core channel 104 to define an air gap therebetween FIG. 5 is a perspective view of the example curtain wall panel of FIG. 1, illustrating additional features, FIG. 6 is an exploded view of the example curtain wall panel of FIG. 5, and FIG. 7 is a cross-sectional view of the example curtain wall panel of FIG. 5.

Figure 5:
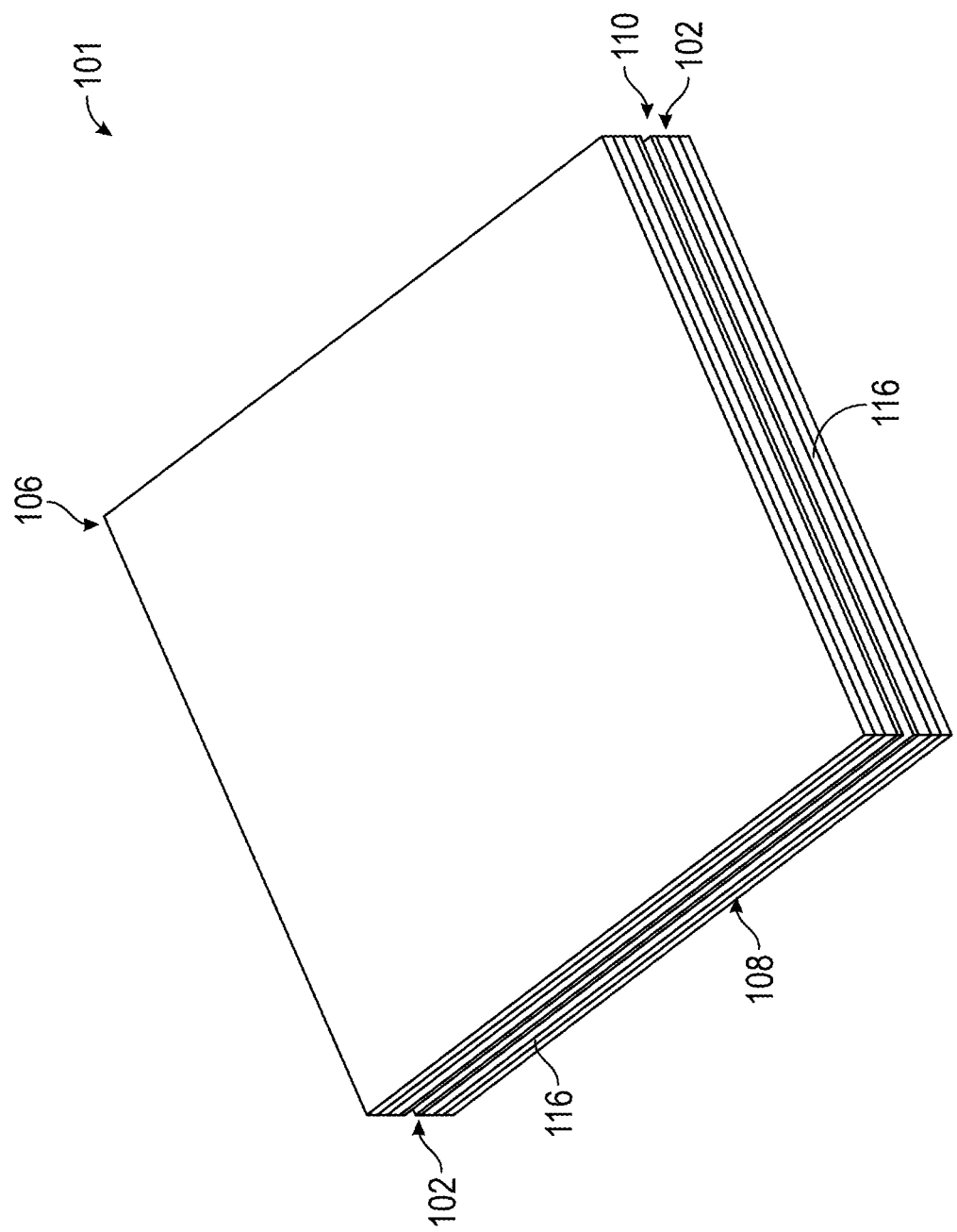
FIG. 5 is a perspective view of the example curtain wall panel of FIG. 1, illustrating additional features in accordance with some aspects of the present disclosure.
Figure 6:
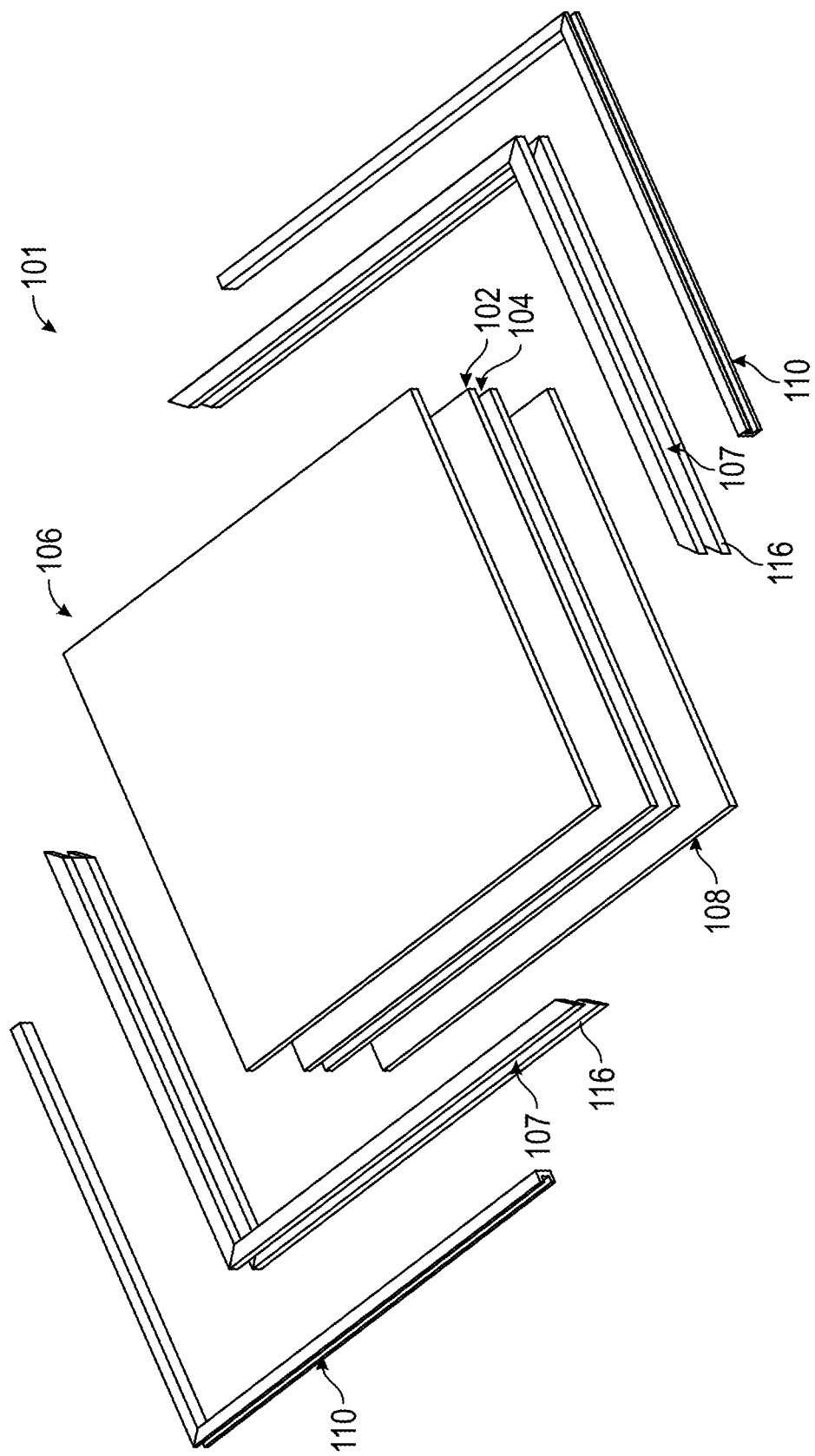
FIG. 6 is an exploded view of the example curtain wall system of FIG. 5.
Figure 7:
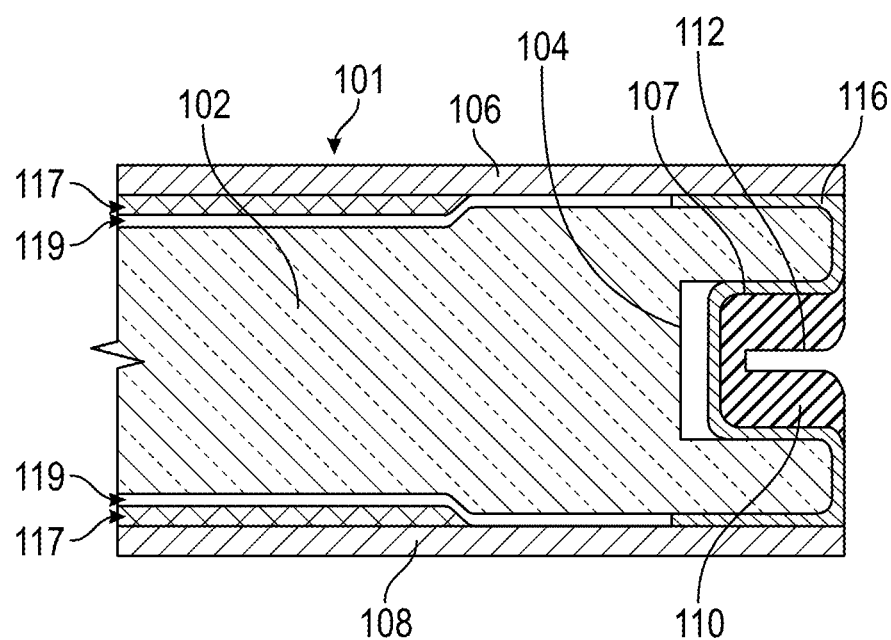
FIG. 7 is a cross-sectional view of a portion of the example curtain wall panel of FIG. 5.

As shown in FIGS. 5-7, in some aspects, the panel 101 may further comprise a frame 116 disposed around the perimeter 105 of the core 102 between the core 102 and the at least one elastic member 110. The frame may have an interior surface and an exterior surface. In some examples, the interior surface of the frame 116 is shaped to be received within the core channel 104 and the exterior surface of the frame 116 forms a at least one frame channel 107. In some aspects, the shape of the at least one frame channel 107 may be the same or similar to the shape of the at least one core channel 104. In some aspects, the interior surface of the frame 116 may directly contact an entirety of the perimeter 105 of the core 102. In other aspects, at least a portion of the interior surface of the frame 116 may be spaced apart from the perimeter 105 of the core 102 and may define one or more air gaps therebetween, for example, as shown in FIG. 7.

In some aspects, the at least one elastic member 110 may be configured to be received directly within the at least one frame channel 107 of the frame 116. In some aspects, the at least one elastic member 110 is a single elastic member that encircles the entirety of the at least one frame channel 107. However, it is foreseen that any number of elastic members 110 may be used. For example, as shown in FIG. 6, the at least one elastic member 110 includes two elastic members 110 that encircle the at least one frame channel 107. In some examples, as shown in FIG. 7, a bottom surface of the at least one elastic member 110 may contact the exterior surface of the at least one frame channel 107. In some examples, the bottom surface of the at least one elastic member 110 may be spaced apart from the exterior surface of the at least one frame channel 107 to define an air gap therebetween.

As shown in FIG. 6, the frame 116 may include two frame portions that, together, form the frame 116. However, it is foreseen that the frame 116 may be a unitary structure or may comprise any number of frame portions. In some aspects, the frame 116 may comprise FRP. In other aspects, the frame 116 may consist or consist essentially of FRP. However, it is foreseen that the frame may comprise aluminum or other materials suitable for use in curtain wall systems, which will be readily apparent to those skilled in the art.

As shown in FIG. 7, the frame 116 may include a first outer edge that extends between the first outer wall 106 and the core 102 and a second outer edge that extends between the second outer wall 108 and the core 102 to provide a weatherproof seal along the perimeter 105 of the panel 101.

In some aspects, the frame 116, the first outer wall 106, and the second outer wall 108 may form a monocoque FRP panel surrounding the core 102. In some examples, the FRP may be the moldable fire-resistant fiber-reinforced plastic (FRP) composite 400, 500, or 600 of the present disclosure, as described herein and illustrated in FIGS. 16-18.

In some aspects, the frame 116 may have a thickness defined as a distance between the interior surface and the exterior surface of the frame. In some aspects, the thickness of the frame may be uniform. In other aspects, the thickness of the frame may vary along a width and/or length of the frame. In some examples, the thickness of the frame may be 0.06 to 0.17 inches. In at least one example, the thickness of the frame may be 0.13 inches.

In some aspects, the panel 101 may include a fire-resistant coating or layer 119, surrounding at least a portion of the core 102, as shown in FIG. 7. For example, the fire-resistant coating may comprise a fire-resistant FRP. In some aspects, the fire-resistant FRP may include, but is not limited to, the moldable FRP composite 400, 500, or 600 of the present disclosure, as described herein and illustrated in FIGS. 16-18. In some aspects, the core 102 may further have a layer 117 of stiffening material or stiffening core surrounding at least a portion of the core 102. Optionally, 117 can be covered by FRP laminate.

FRP Curtain Wall System

In one aspect, the present disclosure relates to a connection system for curtain wall panels or a curtain wall system. For example, FIGS. 8A-14 illustrate an example curtain wall system of the present disclosure.

As shown in FIGS. 8A-14, the curtain wall system 100 may include a plurality of adjacent panels 101 of the present disclosure and at least one joining member 114, 114a, 114b.

The at least one joining member 114, 114a, 114b is configured to be inserted into the recess 112 of the elastic member 110 of a panel 101 in such a way that it protrudes from the recess 112 and can be inserted into the recess 112 of an elastic member 110 of at least one adjacent panel. In such aspects, each joining member 114 is configured to be received within at least two adjacent panels 101 to couple or join the adjacent panels 101.

Figure 8A:
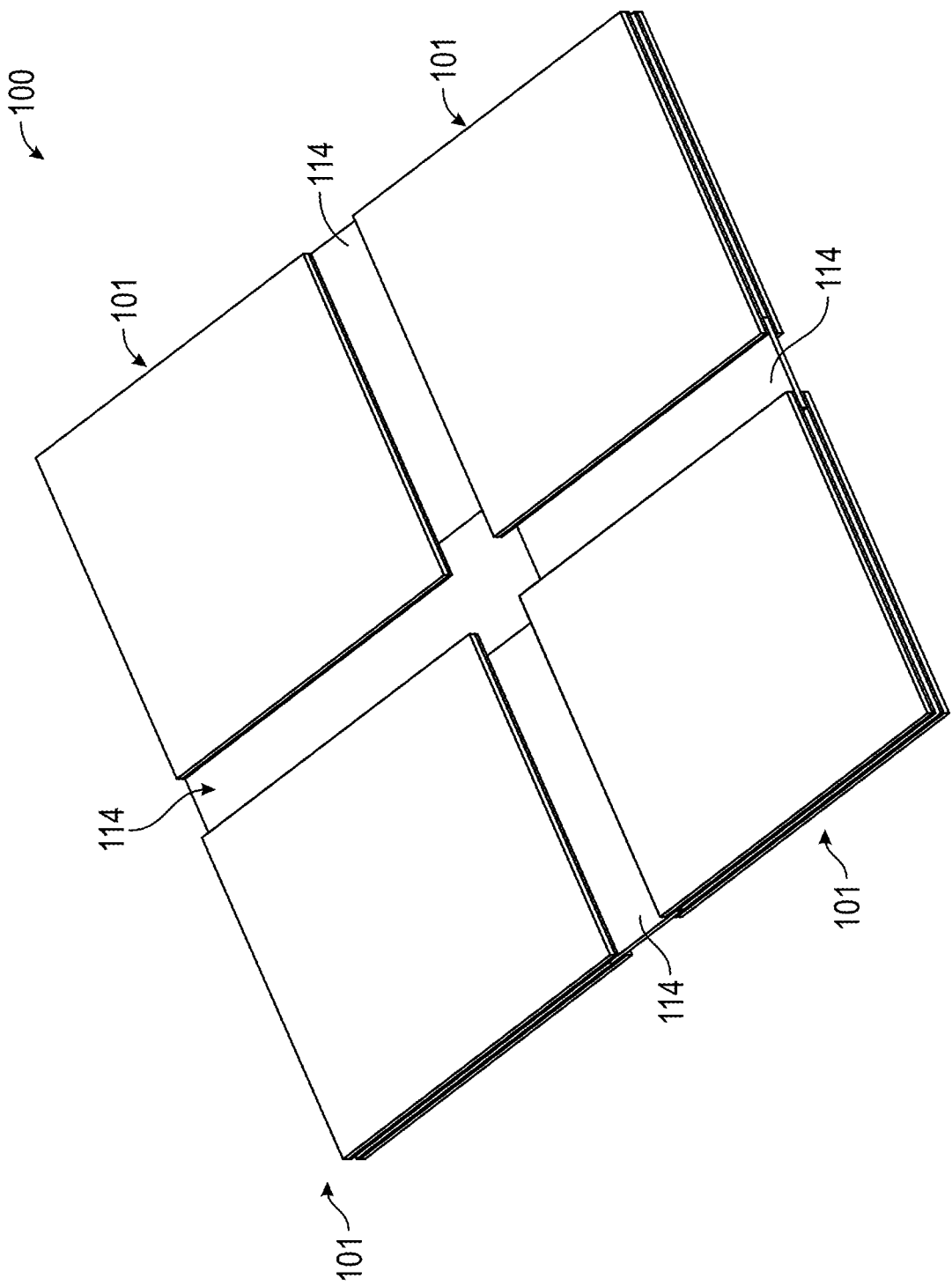
FIG. 8A is a perspective view of an example curtain wall system in accordance with some aspects of the present disclosure.
Figure 8B:
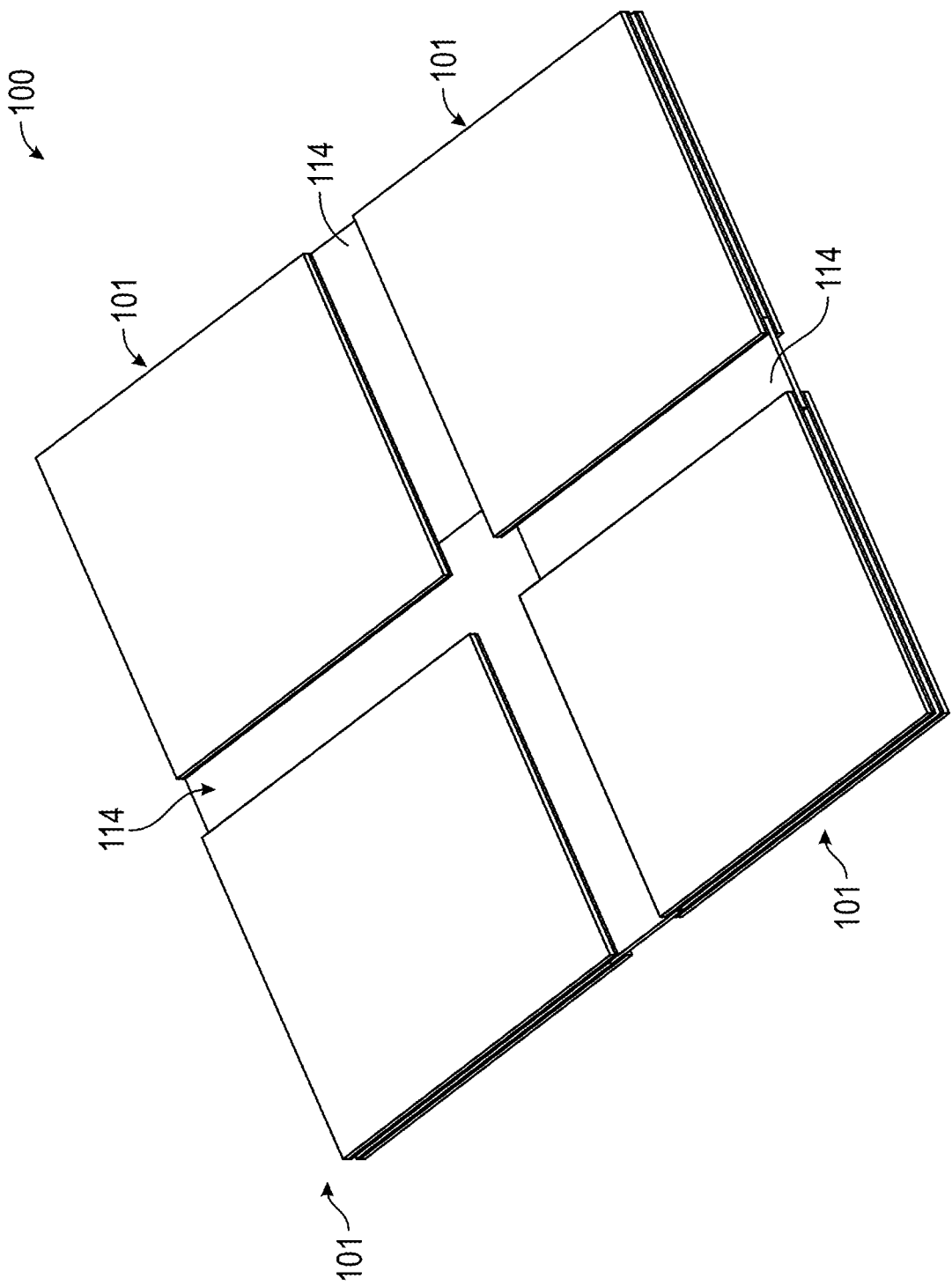
FIG. 8B is a perspective view of an example curtain wall system in accordance with some aspects of the present disclosure.
Figure 9:
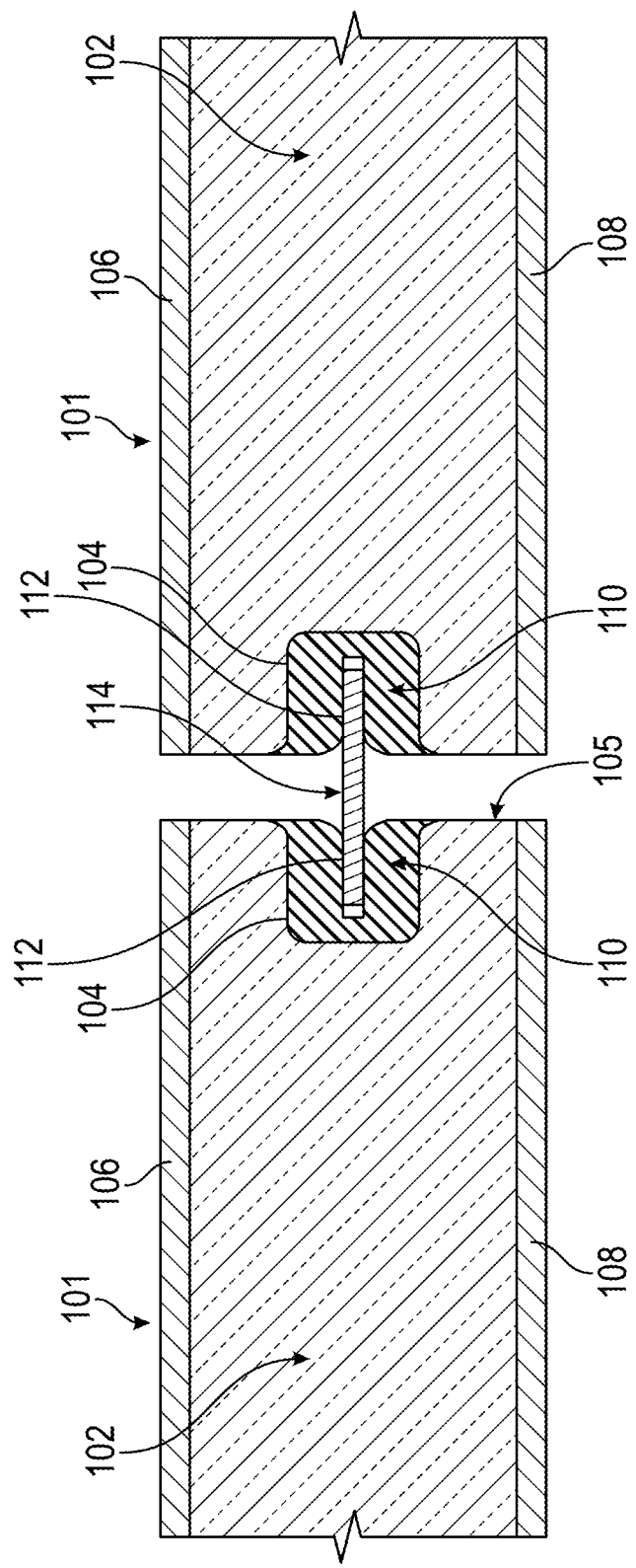
FIG. 9 is a cross-sectional view of two adjoining panels of the example curtain wall system of FIG. 8A or 8B.

FIGS. 8A-8B are perspective views of an example curtain wall system 100 in accordance with some aspects of the present disclosure and FIG. 9 is a cross-sectional view of two adjoining panels 101 of the example curtain wall system of FIG. 8A or 8B. In some examples, as shown in FIGS. 8A-9, the panels 101 of a curtain wall system 100 in accordance with some aspects of the present disclosure may be the panels 101 illustrated in FIGS. 1-3 and described herein.

As shown in FIG. 8A, the curtain wall system 100 may include four panels 101 and five joining members 114. However, it is foreseen that any number of panels 101 and joining members 114 may be used to form the curtain wall system 100. In one example, the curtain wall system 100 may include two panels 101 and one joining member. In another example, as shown in FIG. 8B, the system 100 may include four panels 101 and three joining members 114.

In some aspects, the plurality of joining members 114 may be rectangular, L-shaped, or may be a combination of rectangular and L-shaped joining members 114. For example, as shown in FIG. 8A, the plurality of joining members 114 are rectangular. In another example, as shown in FIG. 8B, one joining member 114 is L-shaped and two joining members 114 are rectangular. However, it is foreseen that the joining members 114 may be of any size and shape sufficient to provide the weatherproof seal between the joining member 114 and recess 112 and to allow the curtain wall system 100 to move as needed, along with the movement of the building to which it is to be attached. In some aspects, the joining members 114 may be uniform in size and shape. In other aspects, the joining members 114 may be different in size and/or shape.

Figure 10:
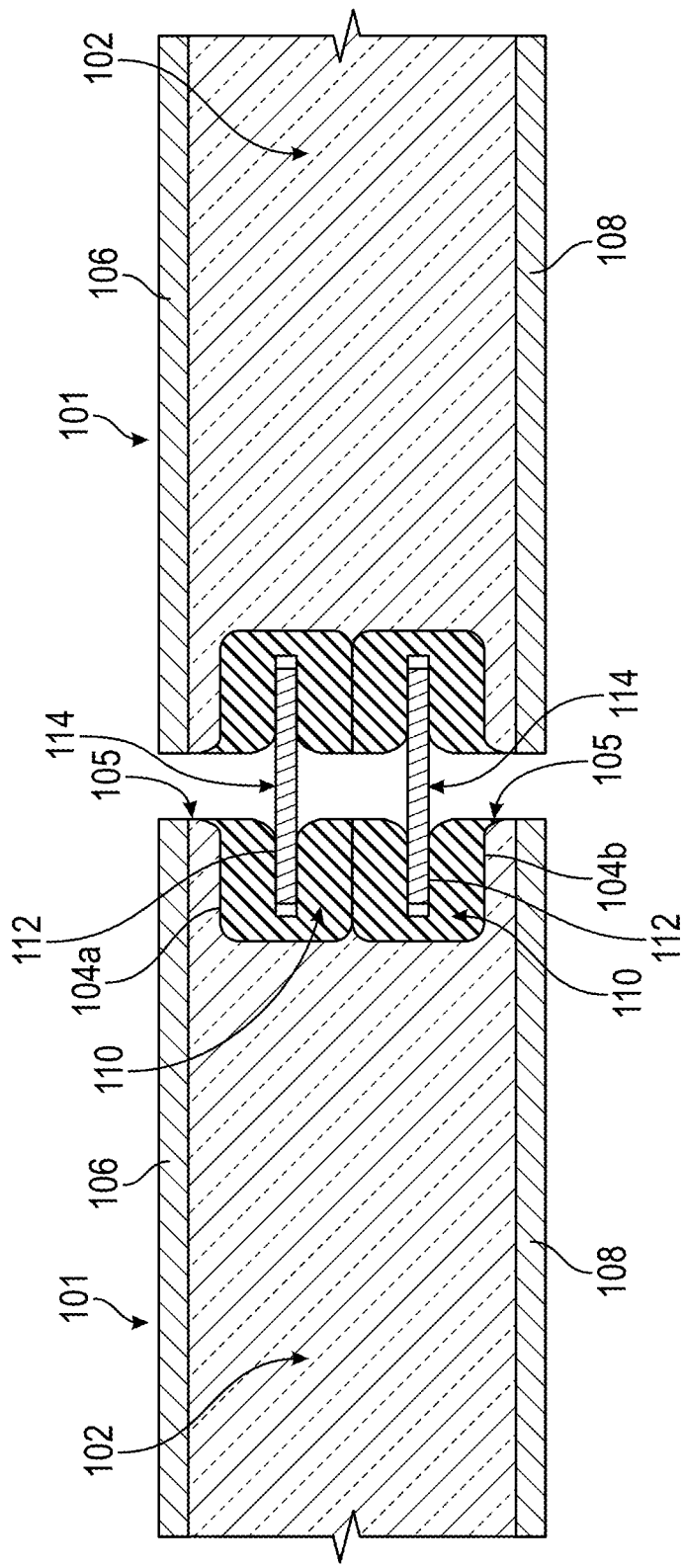
FIG. 10 is a cross-sectional view of the two adjoining panels of the an example curtain wall system of FIG. 9, illustrating additional features in accordance with some aspects of the present disclosure.

FIG. 10 is a cross-sectional view of the two adjoining panels of the example curtain wall system of FIG. 9, illustrating additional features in accordance with some aspects of the present disclosure. In some examples, as shown in FIG. 10, the panels 101 of a curtain wall system in accordance with some aspects of the present disclosure may be the panels 101 illustrated in FIG. 4 and described herein.

Figure 11:
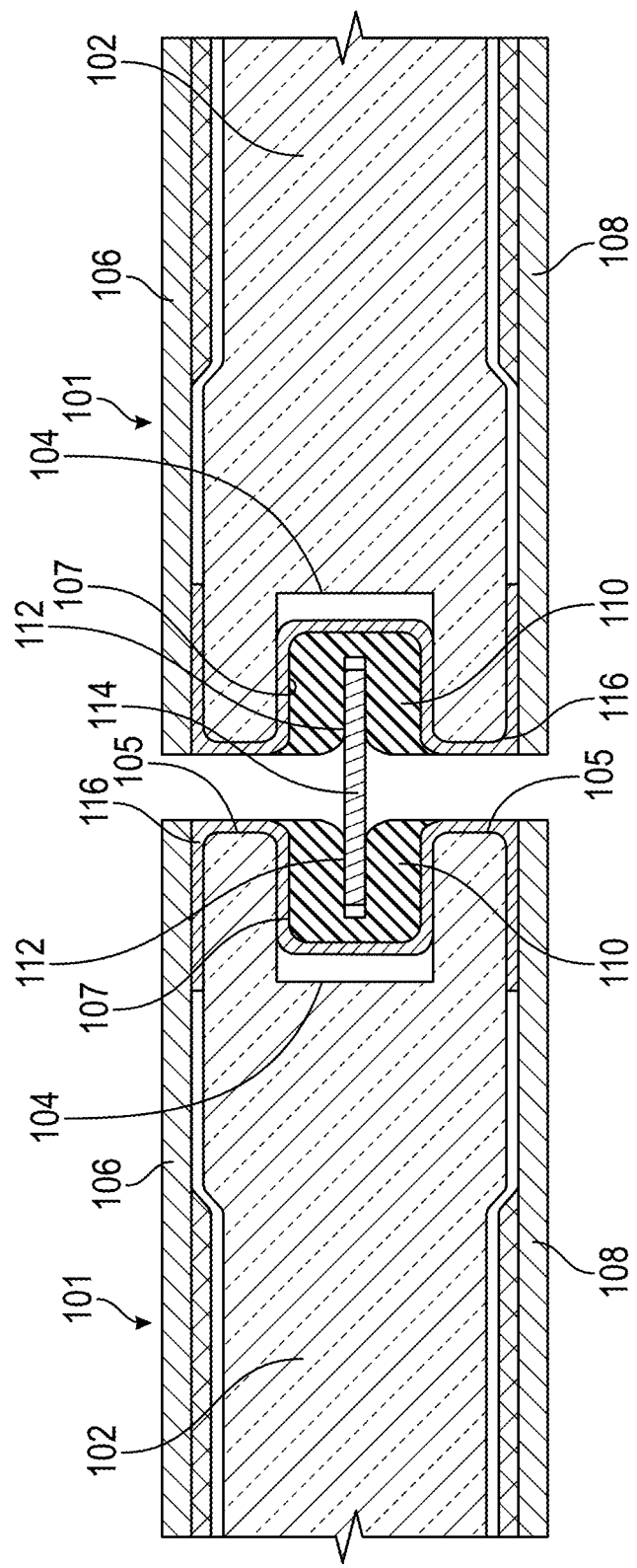
FIG. 11 is a cross-sectional view of the two adjoining panels of the example curtain wall system of FIG. 9, illustrating additional features in accordance with some aspects of the present disclosure.

FIG. 11 is a cross-sectional view of the two adjoining panels of the example curtain wall system of FIG. 9, illustrating additional features in accordance with some aspects of the present disclosure. In some examples, as shown in FIG. 11, the panels 101 of a curtain wall system in accordance with some aspects of the present disclosure may be the panels 101 illustrated in FIGS. 5-7 and described herein.

Figure 12:
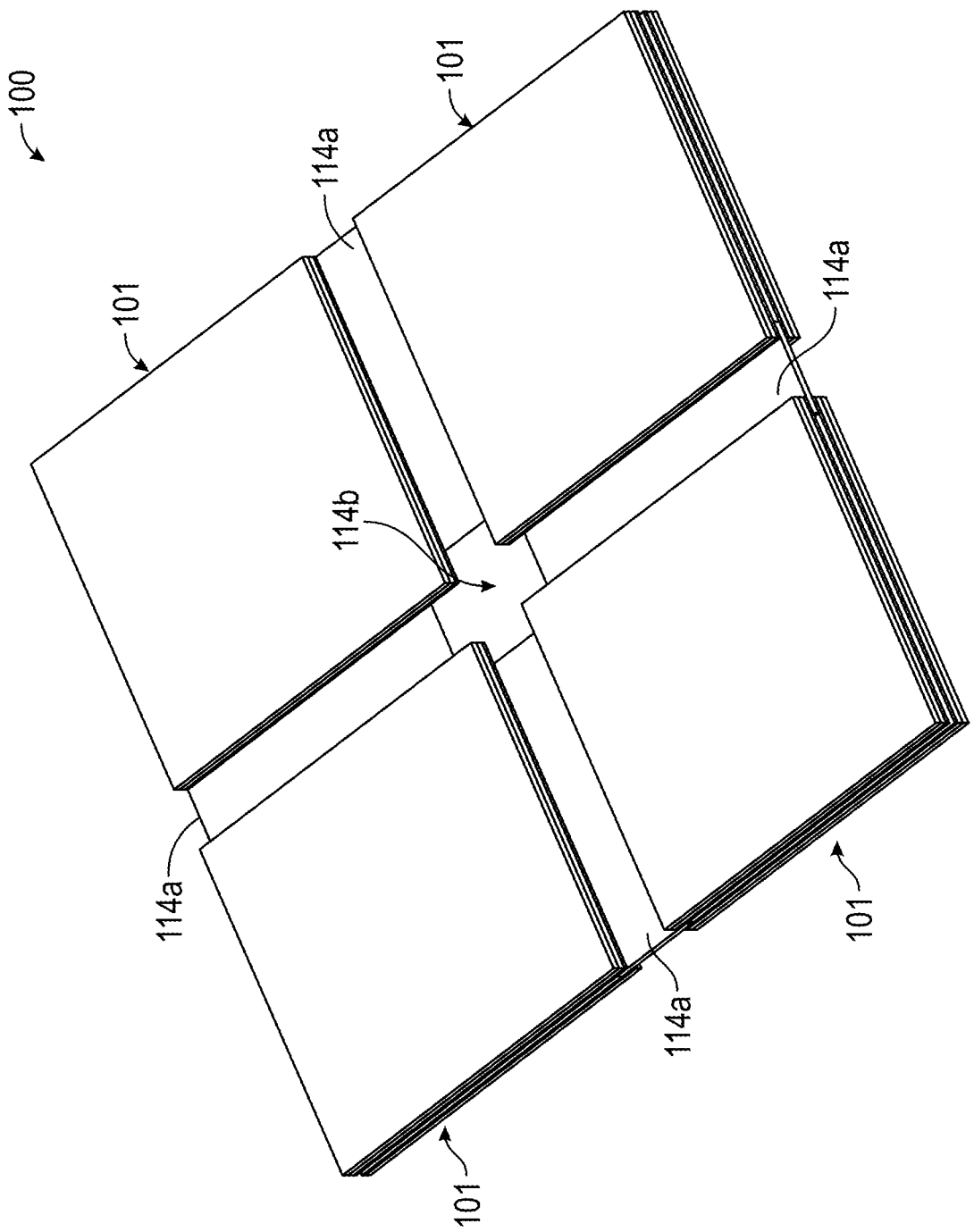
FIG. 12 is a perspective view of an example curtain wall system illustrating additional features in accordance with some aspects of the present disclosure.
Figure 13:
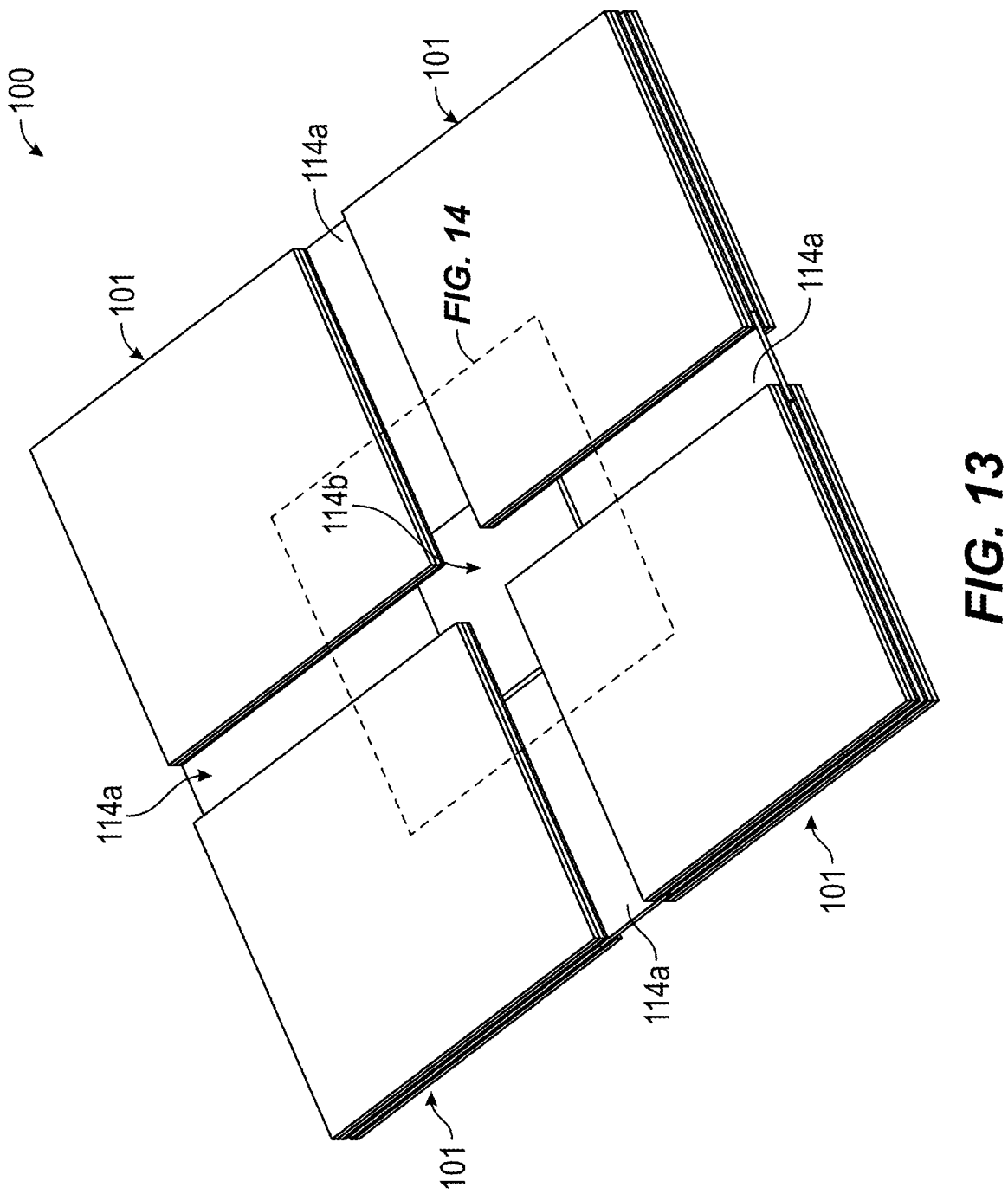
FIG. 13 is a perspective view of an example curtain wall system illustrating additional features in accordance with some aspects of the present disclosure.
Figure 14:
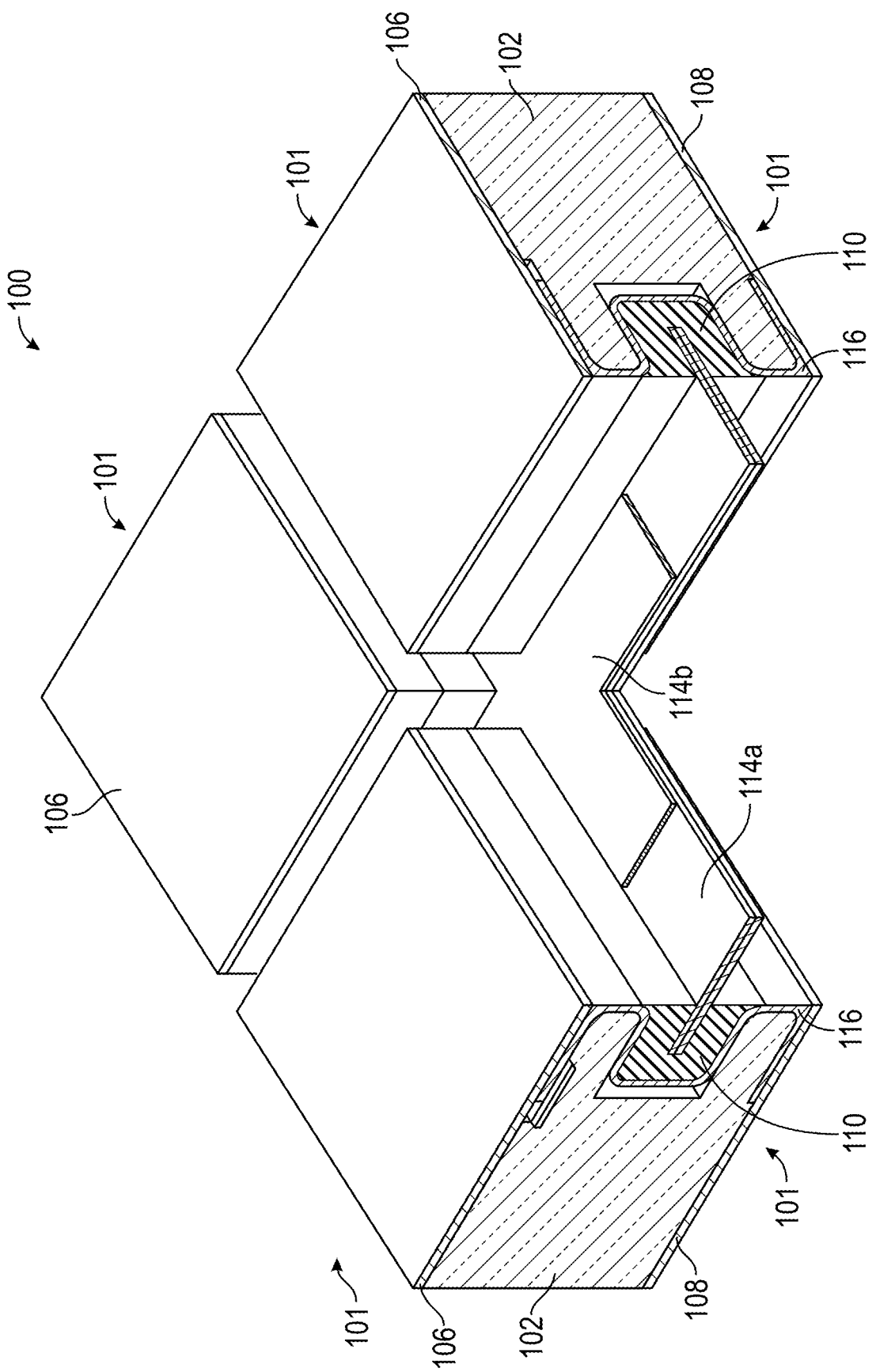
FIG. 14 is a cross-sectional view of a portion of the example curtain wall system of FIG. 13, wherein the lower left panel is cut away.

FIG. 12 is a perspective view of an example curtain wall system in accordance with some aspects of the present disclosure. FIG. 13 is a perspective view of an example curtain wall system in accordance with some aspects of the present disclosure and FIG. 14 is a cross-sectional view of a portion of the example curtain wall system of FIG. 13, wherein the lower left panel is cut away. As shown in FIGS. 12-14, in some examples, the at least one joining member 114 may include a plurality of long joining members 114a and at least one short joining member 114b. Each of the plurality of long joining members 114a may be configured to be received in the elastic members 110 of two adjacent panels 101 at a side thereof and the at least one short joining member 114b may be configured to be received in the recesses 112 of elastic members 110 of four adjacent panels 101 at a corner thereof.

In some examples, as shown in FIG. 12, the at least one short joining member 114b may be received be within the elastic members 110 of the four panels 101 such that the at least one short joining member 114b is positioned adjacent to the long joining members 114a. In other examples, as shown in FIGS. 13 and 14, the at least one short joining member 114b may be received within the elastic members 110 of the four panels 101 such that the at least one short joining member 114b overlapping with the long joining members 114a.

In some aspects, each of the joining members 114, 114a, 114b may have a length, a width, and a thickness. In some aspects, the thickness of the each of the joining members 114 may be 0.04-0.17 inches. In some aspects, the thickness of each of the joining members 114 may be about 0.13 inches. In some examples, such as the example shown in FIGS. 13 and 14, the thickness of the long joining members 114a and/or the short joining members 114b may be 0.04-0.17 inches. In some examples, the thickness of the long joining members 114a and/or the short joining members 114b may be up to 3 mm. In some examples, the thickness of the long joining members 114*a* may be 0.13 inches and the thickness of the short joining members may be 0.04 inches. However, it is foreseen that the thickness of each of the joining members may be any thickness suitable for joining the adjacent panels 101. In some aspects, the joining members 114, 114*a*, and/or 114*b* may be uniform in thickness. In other aspects, the thickness of each of the joining members 114, 144*a*, and/or 114*b* may vary.

In some aspects the at least one short joining member 114*b* may have a rectangular shape, as shown in FIG. 12. In some aspects, the at least one short joining member 114*b* may be L-shaped, as shown in FIGS. 13-14. However, it is foreseen that the at least one short joining member 114*b* may be of any shape suitable to be received within the elastic members 110 of the corners of at least four adjoining panels 101.

In some examples, the joining members 114 may be slidably mounted within the recess 112. For example, while not shown, the joining members 114 may be capable of being fully or mostly recessed within at least one of the panels to facilitate installation and removal. The joining member could be arranged to then be protruded to mate with a neighboring panel for installation. In such embodiments, the joining member 114 can have a protrusion mounted thereto to facilitate manipulation of the joining member to move it into a recessed configuration or a protruding configuration. The protrusion could take the form of a stiff cable or handle that can be affixed to the joining member 114 and be accessible outside the panel-through the recess-which the joining member is recessed withing the panel. The protrusion could also take the form of a rigid handle that is movable within a channel formed through the insulating core, and the second outer wall 108.

In some aspects the joining members 114, 114*a*, 114*b* comprise FRP. In other aspects, the joining members consist or consist essentially of FRP. For example, in some aspects, the joining members 114, 114*a*, 114*b* comprise carbon fiber. In other aspects, the joining members 114, 114*a*, 114*b* may consist or consist essentially of carbon fiber.

In some aspects, the joining members 114, 114*a*, 114*b* and/or the recess(es) 112 may be coated in a lubricant to assist in installation, weatherproofing, and to allow easier movement of the joining members 114, 114*a*, 114*b* within the recesses 112.

In some examples, each of the joining members 114, 114*a*, 114*b* may comprise an elongated spline configured to be received lengthwise within the recess 112 of the elastic member 110 of at least two adjacent panels 101.

In some aspects, the recess 112 and at least one joining member 114 are sized, and the elastic member 110 is sufficiently elastic or resilient, such that, when a joining member 114 is received within the recess 112 of the elastic member 110, the connection of the joining member 114 and the elastic member 110 form a weatherproof seal that allows the joining member 114 to shift position within the recess 112 of the elastic member 110 as needed, to allow the curtain wall system 100 to move along with the movement of the building to which it is to be attached. In some aspects, the joining member 114 may contact a bottom of the recess 112. In other aspects, there may be an air gap between the joining member 114 and the bottom of the recess 112, for example, as shown in FIG. 11.

In some aspects, the top surface of each of the at least one elastic member 110 is beveled on one or both sides of the recess 112, as shown in FIG. 9. In some aspects, the beveled top surface of the at least one elastic member 110 provides for easier insertion of the at least one joining member 114 into the recess 112. Although not shown, in some aspects, the top surface of each of the at least one elastic member 110 may be flat and may not have beveled edges on either side of the recess 112.

In some aspects, the recess 112 and joining members 114 are sized such that a middle portion of the joining member 114 extends between the top surface of the elastic members 110 of the adjoining panels 101 to form a gap between the perimeters 105 of the adjacent panels 101, as shown in FIGS. 7-14. The gap allows for movement of a building to which the panels 101 are to be attached. In some instances, caulking, sealant, or other weatherproofing materials may be provided in this gap to provide additional water-proofing and/or weatherproofing to the curtain wall system 100, while being sufficiently flexible to allow movement of the building, as needed. In some examples, the gap between the perimeters 105 of the adjoining panels 101 may be up to 1 inch. In some examples, the gap between the perimeters 105 of the adjoining panels 101 may be 0.5-1 inch. In at least one example, the gap between the perimeters 105 of the adjoining panels 101 may be 0.75 inches. However, it is foreseen that the gap between the perimeters 105 of the adjoining panels 101 may be any length suitable for curtain wall systems, which will be readily apparent to those in the art.

Although not shown, in some aspects, the curtain wall system 100 of the present disclosure may further include a plurality of anchors to secure the panels 101 to a building for which the curtain wall system will form a building facade.

Method for Assembling a Curtain Wall System

In one aspect, the present disclosure provides a method for assembling a curtain wall system 100 of the present disclosure. An example method 200 for assembling a curtain wall system 100 of the present disclosure is provided in FIG. 15.

Figure 15:
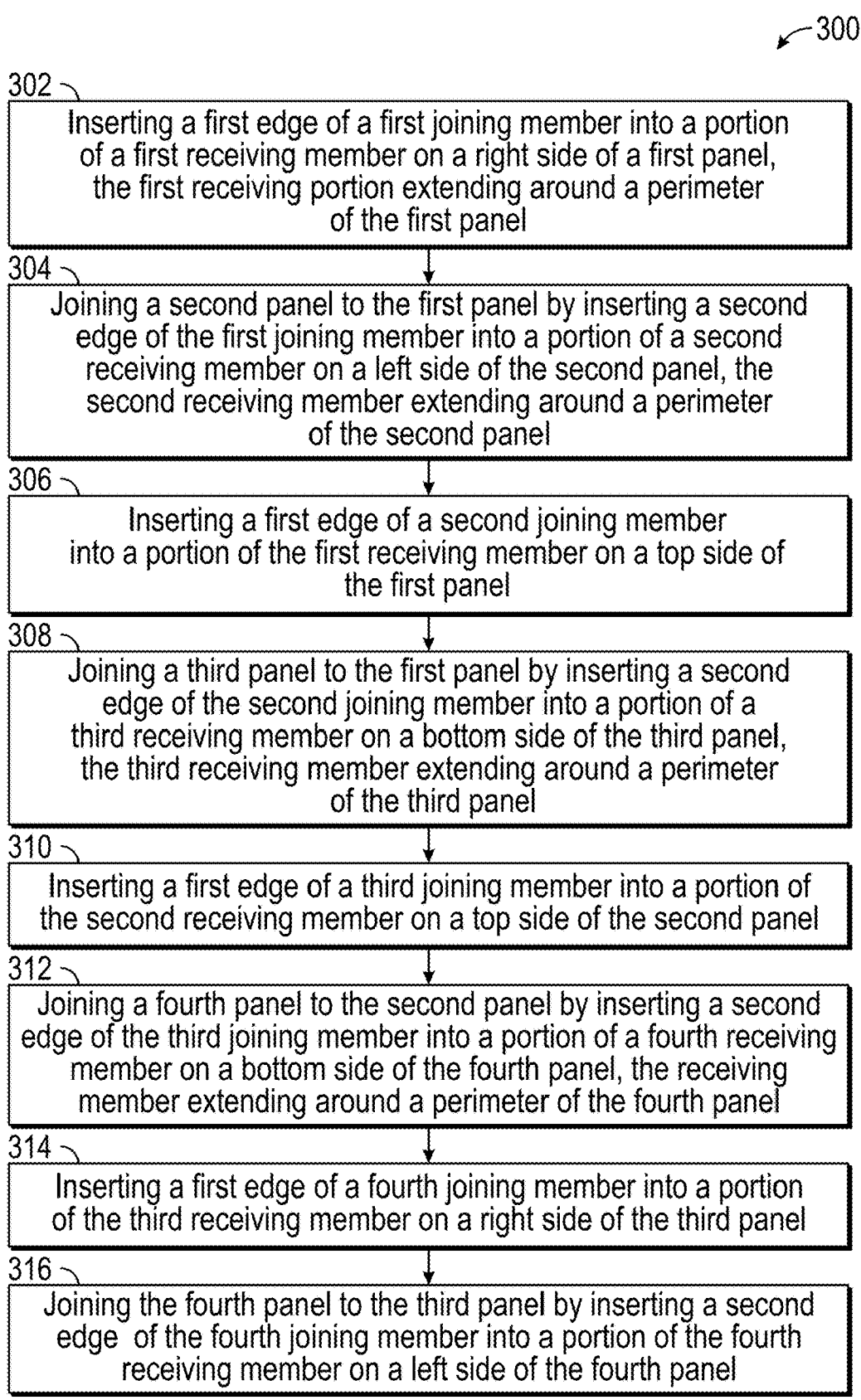
FIG. 15 is an example method in accordance with some aspects of the present disclosure.

As shown in FIG. 15, at step 202, the method 200 includes inserting a first edge of a first joining member into a portion of a first receiving member on a right side of a first panel, the first receiving portion extending around a perimeter of the first panel. In some aspects, the panels may be panels 101 of the present disclosure.

At step 204, the method 200 includes joining a second panel to the first panel by inserting a second edge of the first joining member into a portion of a second receiving member on a left side of the second panel, the second receiving member extending around a perimeter of the second panel.

At step 206, the method 200 includes inserting a first edge of a second joining member into a portion of the first receiving member on a top side of the first panel.

At step 207, the method 200 includes joining a third panel to the first panel by inserting a second edge of the second joining member into a portion of a third receiving member on a bottom side of the third panel, the third receiving member extending around a perimeter of the third panel.

At step 208, the method 200 includes inserting a first edge of a third joining member into a portion of the second receiving member on a top side of the second panel.

At step 210, the method includes joining a fourth panel to the second panel by inserting a second edge of the third joining member into a portion of a fourth receiving member on a bottom side of the fourth panel, the receiving member extending around a perimeter of the fourth panel.

At step 212, the method includes inserting a first edge of a fourth joining member into a portion of the third receiving member on a right side of the third panel.

At step 214, the method includes joining the fourth panel to the third panel by inserting a second edge of the fourth joining member into a portion of the fourth receiving member on a left side of the fourth panel.

In some aspects, the method may further include inserting a first portion of a fifth joining member into a portion of the first receiving member at a first corner of the first panel where the top side and the right side of the first panel meet.

In some aspects, the method may include inserting a second portion of the fifth joining member into a portion of the receiving member at a second corner of the second panel where the left side and top side of the second panel meet.

Moldable Fire Resistant FRP Composites

In one aspect, the present disclosure relates to moldable fire-resistant fiber-reinforced plastic (FRP) composites for use with the panel 101, curtain wall system 100, and method 300 of the present disclosure.

The moldable fire-resistant composites can be molded or formed from one or more composite layers containing one or more fire-resistant components, fire-retardant components, smoke-suppressant components, flame-spread-reducing components, heat-dissipating components, heat-transfer-reducing components, structure reinforcing g components or combinations thereof. The moldable fire-resistant composites can be incorporated into products and materials to increase structural integrity and reduce flammability, flame spread, smoke generation and smoke spread resulting from exposure to heat or fire. The moldable fire-resistant composites are easily molded into small, large, or complex shapes to accommodate structural, architectural, and aesthetic specifications and designs.

The moldable fire-resistant composites can be incorporated into a wide variety of structures, materials, substrates and products including, but not limited to building materials, high-rises, vehicles, ships, aircrafts, spacecrafts, clothing, firefighting equipment, military equipment, weapons, electronic appliances, furniture, metals, iron, steel, stainless steel, wood, plastic, PVC, composites and other structures, materials, substrates and products.

The moldable fire-resistant composites herein disclosed can include a series of composite materials and layers including, but not limited to: (1) a base resin layer formed from one or more layers of an intumescent resin mixed with one or more heat-dissipating components; (2) an adhesive layer formed from adhesive; and (3) a reinforced resin layer formed from one or more layers of resin reinforced with a reinforcing structure. The moldable fire-resistant composites do not have to contain an adhesive layer and the moldable fire-resistant composites can also include a base resin layer adhered directly to a reinforced resin layer without an adhesive layer.

Base Resin Layer

The base resin materials or layers disclosed in this specification can be formed from intumescent resins, heat-dissipating components, accelerators, initiators, fillers and other additives. The volume or weight ratio of intumescent resin, heat-dissipating components, accelerators, initiators, fillers and other additives in the base resin layer can be varied to accommodate different applications, fire standards, smoke standards, building standards or other desired product specifications.

The heat-dissipating component in the base resin layer can be any heat dissipating material including, but not limited to sand, dried silica, anhydrous silicon dioxide (SiO2), gravel, rock, clay, ceramic, polymer or other heat or fire dissipating component capable of increasing the surface area, decreasing the thermal conductivity and/or decreasing the transfer of heat across the moldable fire-resistant composite.

The intumescent resin is a substance that imparts fire, flame and/or smoke resistant or suppressant properties to the composite matrix by reducing fire, flame and/or smoke spread. Suitable intumescent resins include unsaturated polyester resins or non-halogenated, unsaturated polyester resins. The intumescent resin can contain accelerators, initiators, fillers and other additives used to improve the hardening, heat resistance, fire resistance and/or smoke resistance characteristics of the intumescent resin.

Initiators initiate the reaction or crosslinking of the intumescent resin and accelerators accelerate the rate of reaction or crosslinking of the intumescent resin. Accelerators can act as initiators and initiators can act as accelerators. The accelerators and initiators used in the base resin can be hardening catalysts that promote exothermic chemical reactions within the base resin layer. The exothermic reactions generate heat, causing the intumescent resin to undergo crosslinking, curing and hardening at a faster rate. Suitable accelerators and initiators include peroxide catalysts, such as methyl ethyl ketone peroxide (MEKP) compounds, cobalt containing compounds, Lewis acids, such as BF3-amine complexes or Lewis bases, such as tertiary amines or imidazole compounds. Suitable MEKP compounds can include, but are not limited to organic peroxides, such as Luperox® DDM-9 manufactured by Arkema Inc. or Hi-Point® PD-1 manufactured by Pergan Marshall, LLC. The cobalt containing compounds can include, but are not limited to cobalt naphthenate, ketone peroxide/cobalt or peroxyester/cobalt.

The intumescent resin can also include additives, fillers, and flame-retardant synergists. Additives, fillers, and flame-retardant synergists can include, but are not limited to water containing additives, such as alumina trihydrate (ATH) that releases water vapor when the intumescent resin is exposed to fire or heat, thereby cooling the moldable fire-resistant composite. Additives, fillers, and flame-retardant synergists can also include colloidal antimony pentoxides, such as NYACOL® APE3040 manufactured by NYACOL® Nano Technologies Inc.

Reinforced Resin Layer

The reinforced resin materials and layers disclosed in this specification can be formed from one or more layers of resin reinforced with a reinforcing structure. The resin can include the intumescent resins described in this specification, epoxy resins, phenolic resins, halogenated resins, such as brominated resins, and unsaturated polyester resins that impart fire, flame and/or smoke resistant or suppressant properties by reducing flame and smoke spread. The reinforced resin layer can also contain accelerators, initiators, fillers and other additives used to improve the hardening, heat resistance, fire resistance and smoke resistance characteristics of the reinforced resin layer. The accelerators, initiators, fillers and additives can include, but are not limited to peroxide catalysts such as methyl ethyl ketone peroxide (MEKP) or aluminum hydrates such as alumina tri-hydroxide (ATH). Alumina trihydrate (ATH) releases water vapor at a specific temperature, thereby cooling the moldable fire-resistant composite when exposed to fire or heat. Other accelerators, initiators, fillers and additives described with respect to the base resin layer can also be used in the reinforced resin layer.

The reinforcing structure of the reinforced resin layer can be any structure that structurally supports the reinforced resin layer and/or imparts fire, flame and/or smoke resistant and suppressant properties to the moldable fire-resistant composite. The reinforcing structure can include, glass, crushed glass, fiber, fiber glass, carbon fiber, aramid, basalt, natural fibers, hemp, flax, switch grass, cloth, oriented strand cloth, chopped strand mat, paper, ceramic, metal, metal powder, pearlite, cement, polymer or other reinforcing structure capable of being incorporated into the resin to create a reinforced resin layer. The reinforcing structure can also be treated with or made from fire, flame and/or smoke resistant or suppressant materials.

Adhesive Layer

The adhesive materials or layers disclosed in this specification can be formed from an adhesive capable of adhering layers of the moldable fire-resistant composite. The adhesives can be formed from intumescent resins, the reinforced resins or other heat or fire-resistant adhesives described in this specification. Other heat and fire-resistant adhesives can include, but are not limited to cement adhesives including phosphate cements, fire-resistant concrete adhesives or polymer adhesives, such as acrylic resins, epoxy resins, rubber resins or combinations thereof.

The adhesive layer can be an additional smooth layer of intumescent resin applied to the base resin layer to create a suitable adhesive interface between a base resin layer and a reinforced resin layer. The base resin layers can also be directly adhered to the reinforced resin layers without the need for an adhesive layer. Alternatively, an adhesive layer can be incorporated between a base resin layer and a reinforced resin layer to adhere the layers to one another.

Figure 16:
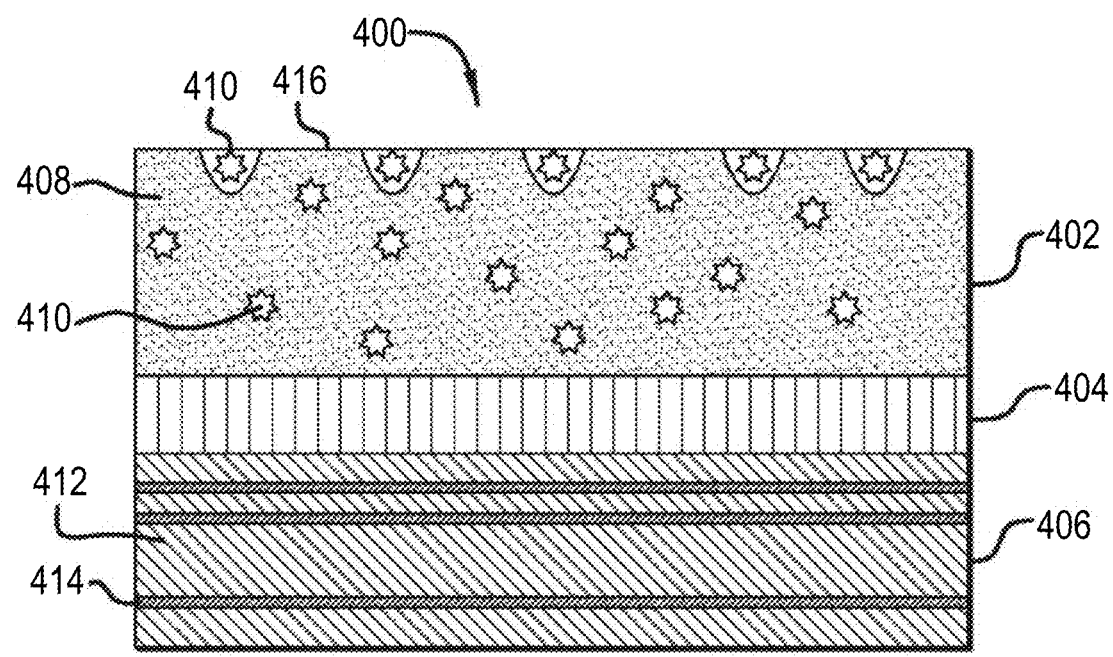
FIG. 16 is a cross-sectional view of an example moldable fire-resistant composite in accordance with some aspects of the present disclosure.

FIG. 16 illustrates a cross sectional view of an exemplary moldable fire-resistant composite 401 according to one embodiment. The moldable fire-resistant composite 401 can include a series of composite layers including: (1) a base resin layer 402 formed from one or more layers of an intumescent resin 408 mixed with one or more heat-dissipating components 410; (2) an adhesive layer 404 formed from adhesive; and (3) a reinforced fire-retardant layer 406 formed from one or more layers of a resin 412 reinforced with a reinforcing structure 414. Alternatively, the moldable fire-resistant composite 401 can include a base resin layer 402 adhered directly to a reinforced fire-retardant layer 406 without an adhesive layer in between.

When exposed to heat or fire, the intumescent resins 408 or the reinforced resins 412 can release water, swell, increase in surface area or produce char to cool the moldable fire-resistant composite 401 or decrease the thermal conductivity of the moldable fire-resistant composite 401. The char is a poor heat conductor that impedes heat transfer across the moldable fire-resistant composite 401.

The base resin layer 402 can include an intumescent resin 408, heat-dissipating components 410, accelerators, initiators, fillers and other additives described in this specification. The volume or weight ratio of intumescent resin 408, heat-dissipating components 410, accelerators, initiators, fillers and other additives in the base resin layer 402 can be varied to accommodate different applications, fire standards, smoke standards, building standards or other desired product specifications.

The heat-dissipating component 410 in the base resin layer 402 can be any heat dissipating material 410 including, but not limited to sand, dried silica, anhydrous silicon dioxide (SiO2), gravel, rock, clay, ceramic, porous cement, polymer or other heat or fire dissipating component capable of increasing the surface area, decreasing the thermal conductivity and/or decreasing the heat transfer across the moldable fire-resistant composite 401.

In an exemplary embodiment, the heat-dissipating component 410 is sand and the weight ratio of intumescent resin to sand in the base resin layer 402 is 100 parts intumescent resin per 100 parts sand. The volume or weight ratio of intumescent resin to sand can be varied to accommodate different applications, fire standards, smoke standards, building standards or other desired product specifications.

In an exemplary embodiment, the intumescent resin 408 is a non-halogenated resin having the trade name FIRE-BLOCK™ manufactured by CCP Composites U.S. In another exemplary embodiment, the intumescent resin 408 is an unsaturated polyester resin having the trade name NORSODYNE® H 81269 TF manufactured by CCP Composites U.S.

The reinforced fire-retardant layer 406 can include a resin 412 and a reinforcing structure 414. The resin 412 in the reinforcing resin layer 406 can be composed of intumescent resins, halogenated resins such as brominated resins, epoxy resins, phenolic resins and unsaturated polyester resins that impart fire-resistant and/or smoke suppressant properties by reducing flame and smoke spread. The reinforced fire-retardant layer 406 can also contain accelerators, initiators, fillers and other additives described in this specification to improve the hardening, heat resistance, fire resistance and smoke resistance characteristics of the reinforced fire-retardant layer 406. The accelerators, initiators, fillers and additives can include, but are not limited to peroxide catalysts such as methyl ethyl ketone peroxide (MEKP) or aluminum hydrates such as alumina tri-hydroxide (ATH). Alumina trihydrate (ATH) releases water vapor at a specific temperature, thereby cooling the moldable fire-resistant composite when exposed to fire or heat.

In an exemplary embodiment, the reinforced fire-retardant layer 406 contains a halogenated, unsaturated polyester resin 412 and alumina trihydrate (ATH). In some embodiments, the weight ratio of halogenated, unsaturated polyester resin 412 to alumina trihydrate (ATH) in the reinforced fire-retardant layer 406 is 100 parts halogenated unsaturated polyester resin per 100 parts alumina trihydrate (ATH). The volume or weight ratio of halogenated, unsaturated polyester resin to alumina trihydrate (ATH) can be varied to accommodate different applications, fire standards, smoke standards, building standards or other desired product specifications.

In an exemplary embodiment, the intumescent resin 408 is a non-halogenated resin having the trade name FIRE-BLOCK™ manufactured by CCP Composites U.S. In another exemplary embodiment, the intumescent resin 408 is an unsaturated polyester resin having the trade name NORSODYNE® H 81269 TF manufactured by CCP Composites U.S.

The reinforced fire-retardant layer 406 can include a resin 412 and a reinforcing structure 414. The resin 412 in the reinforcing resin layer 406 can be composed of intumescent resins, halogenated resins such as brominated resins, epoxy resins, phenolic resins and unsaturated polyester resins that impart fire-resistant and/or smoke suppressant properties by reducing flame and smoke spread. The reinforced fire-retardant layer 406 can also contain accelerators, initiators, fillers and other additives described in this specification to improve the hardening, heat resistance, fire resistance and smoke resistance characteristics of the reinforced fire-retardant layer 406. The accelerators, initiators, fillers and additives can include, but are not limited to peroxide catalysts such as methyl ethyl ketone peroxide (MEKP) or aluminum hydrates such as alumina tri-hydroxide (ATH). Alumina trihydrate (ATH) releases water vapor at a specific temperature, thereby cooling the moldable fire-resistant composite when exposed to fire or heat.

In an exemplary embodiment, the reinforced fire-retardant layer 406 contains a halogenated, unsaturated polyester resin 412 and alumina trihydrate (ATH). In some embodiments, the weight ratio of halogenated, unsaturated polyester resin 412 to alumina trihydrate (ATH) in the reinforced fire-retardant layer 406 is 100 parts halogenated unsaturated polyester resin per 100 parts alumina trihydrate (ATH). The volume or weight ratio of halogenated, unsaturated polyester resin to alumina trihydrate (ATH) can be varied to accommodate different applications, fire standards, smoke standards, building standards or other desired product specifications.

In another exemplary embodiment, the resin 412 in the reinforced fire-retardant layer 406 is Hetron" FR 650T-20 manufactured by Ashland Inc.

The reinforcing structure 414 can be any structure that supports the reinforced fire-retardant layer 406 and/or imparts fire-resistant or smoke suppressant properties to the moldable fire-resistant composite 401. The reinforcing structure 414 can include glass, crushed glass, fiber, fiber glass, carbon fiber, aramid, basalt, natural fibers, hemp, flax, switch grass, cloth, oriented strand cloth, chopped strand mat, paper, ceramic, metal, metal powder, pearlite, cement, polymer or other reinforcing structure capable of being incorporated into the resin to create a reinforced resin layer. The reinforcing structure 414 can also be treated or made from fire, flame and/or smoke resistant or suppressant materials.

The adhesive layer 404 can include an adhesive capable of adhering layers of the moldable fire-resistant composite 401. The adhesive layer 404 can include the intumescent resins, the reinforced resins or other heat and fire-resistant adhesives disclosed in this specification. Other heat and fire-resistant adhesives can include, but are not limited to cement adhesives including phosphate cements, hydraulic cement aggregates, fire-resistant concrete or polymer adhesives, such as acrylic resins, epoxy resins, rubber resins or combinations thereof.

The moldable fire-resistant composite 401 can be formed from multiple base resin layers 402, adhesive layers 404 and reinforced resin layers 406. Each layer of base resin 402, adhesive 404 and reinforced resin 406 can be stacked on, adhered to or placed in contact with other layers (402, 404, and 406) in any order to form a moldable, fire-resistant, composite matrix 401. Alternatively, the base resin layers 402 can be adhered directly to the reinforced resin layers 406 without an adhesive layer 404 between the base resin layer 402 and reinforced fire-retardant layer 406.

In an exemplary embodiment illustrated in FIG. 16, one or more layers of base resin 402 are stacked on, adhered to or placed in contact with one or more layers of adhesive 404, and one or more layers of adhesive 404 are stacked on, adhered to or placed in contact with one or more layers of reinforced resin 406 to form a first layer of base resin 402, a second layer of adhesive 404 and a third layer of reinforced resin 406 in the moldable, fire-resistant, composite matrix 401.

Figure 17:
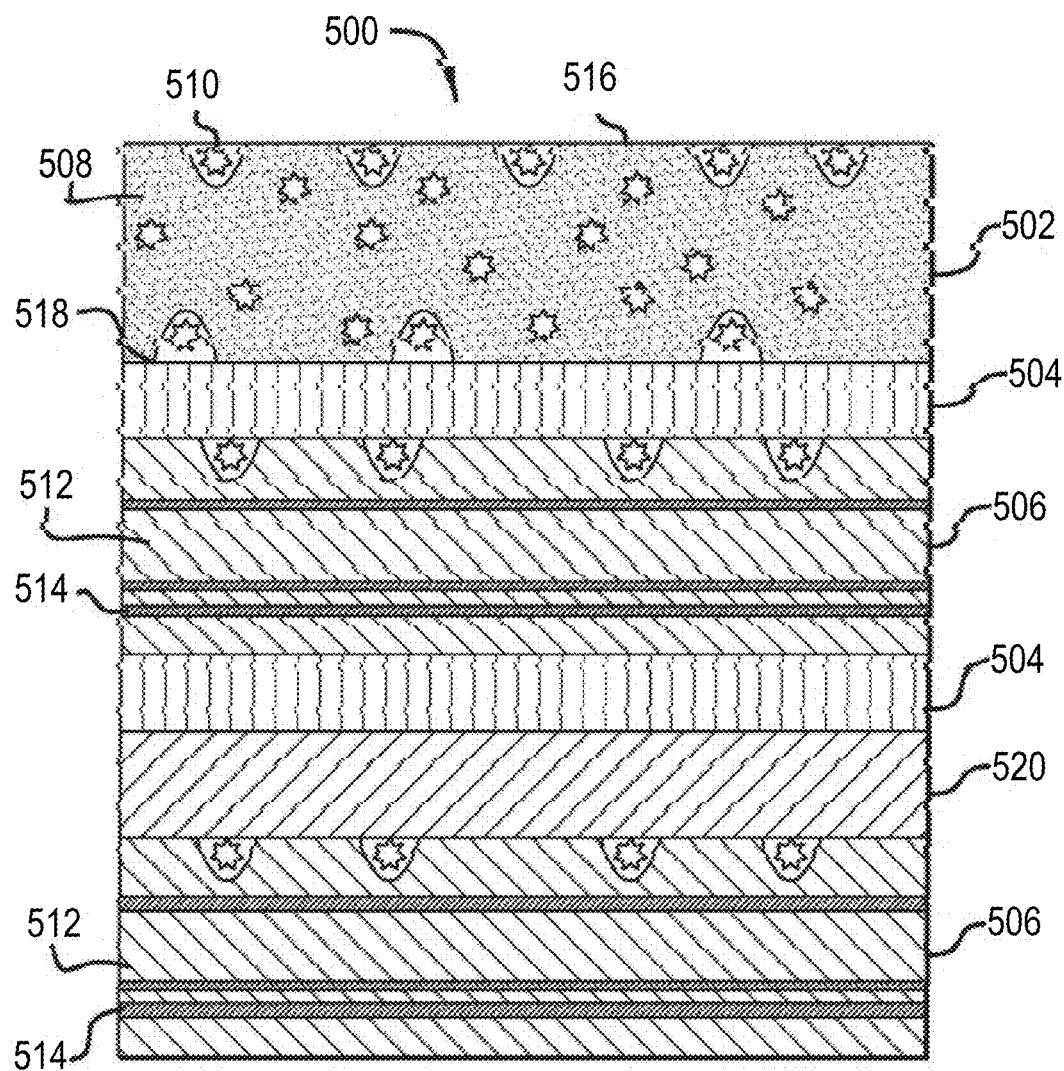
FIG. 17 is a cross-sectional view of an example moldable fire-resistant composite in accordance with some aspects of the present disclosure.

In another exemplary embodiment illustrated in FIG. 16, an outer, exposed surface 416 of the moldable fire-resistant composite 401 is made of a mixture of intumescent resin 408 and heat dissipating material 410. The ratio of intumescent resin 408 to heat dissipating material 410 can be varied to modify the heat, fire and/or smoke resistant or suppressant properties of exposed surfaces 416 of the moldable fire-resistant composite 401 that are most susceptible to heat and fire. FIG. 17 illustrates a cross sectional view of an exemplary moldable fire-resistant composite 501 according to another embodiment. The moldable fire-resistant composite 501 is composed of the same or similar composite layers discussed with respect to FIG. 16 including: (1) base resin layer 502 comprising intumescent resin 508 and a heat dissipating component 510; (2) adhesive layers 504 comprising an adhesive; (3) reinforced resin layers 506 comprising a resin 512 and reinforcing structure 514; and (4) a core 520 layer imparting stiffness and or insulation to the fire-retardant composite 501. The fire-resistant composite 501 can consist of any number of base resin layers 502, adhesive layers 504, reinforced resin layers 506 and core layers 520. Alternatively, the moldable fire-resistant composite 501 can include base resin layers adhered directly to reinforced resin layers 506 and core layers 520 adhered directly to reinforced resin layers 506 without adhesive layers 504 between the other layers. The number of layers and configuration of the layers in the composite matrix 501 can be modified to meet material specifications and produce specific heat, fire and smoke resistant properties.

FIG. 17 illustrates a cross sectional view of a moldable fire-resistant composite 501 having a base resin layers 502, two adhesive layers 504, two reinforced resin layers 506 and a core layer 520. The core layer 520 of the moldable fire-resistant composite 501 can be incorporated with or adhered to any other composite layer to add stiffness and/or insulation to the moldable fire-resistant composite 501. The core layer 520 can be formed from foam, balsa wood, plywood, cement board or other material capable of adding stiffness and/or insulation to the moldable fire-resistant composite 501. FIG. 17 illustrates a core layer 520 adhered directly to a reinforced layer 506. The core layer 520 can also be adhered to a reinforced resin layer 506 with an adhesive layer 504 in between. The core layer 520 can also be adhered directly to a base resin layer 502 or can be adhered to a base resin layer 502 with an adhesive layer 504 in between. The core layer 520 can also be sandwiched between two reinforced resin layers 506 or any two layers to support and/or insulate the layers.

Figure 18:
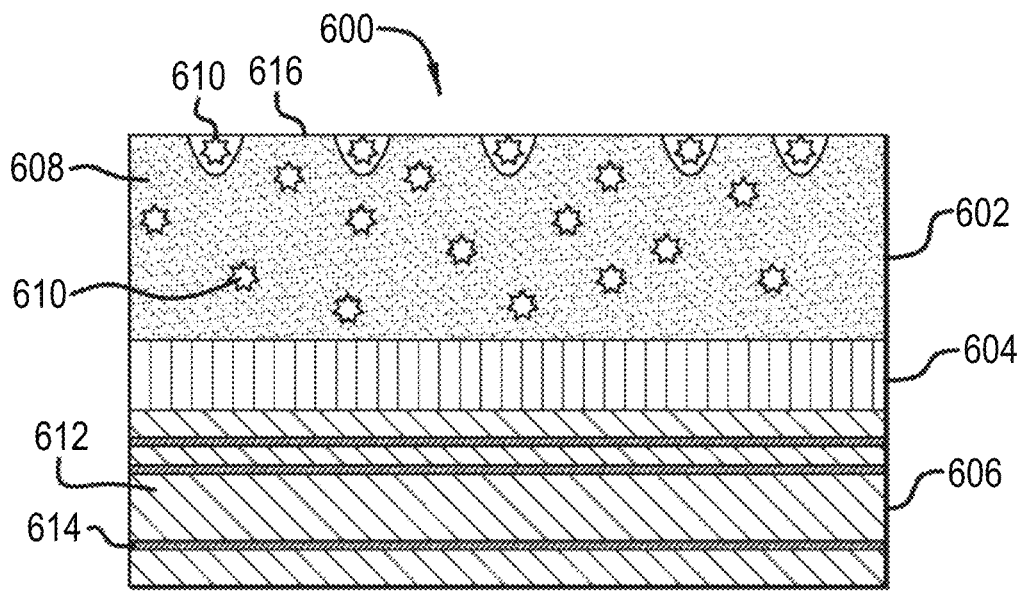
FIG. 18 is a cross-sectional view of an example moldable fire-resistant composite in accordance with some aspects of the present disclosure.

The outer surfaces 516 of the moldable fire-resistant composite 501 can include a mixture of intumescent resin 508 and heat dissipating material 510. The reinforced resin layers 506 can also include a heat dissipating material 510. A heat dissipating material 510 can be dispersed within an interface 518 between any two layers of the moldable fire-resistant composite 501 to protect the interface and adhesion of two layers. For instance, a heat dissipating material 510 can be provided at an interface 518 between a base resin layer 502 and a reinforced resin layer 506 if the base resin layer 502 is adhered directly to the reinforced resin layer 506. A heat dissipating material 510 can also be provided or dispersed within an interface 518 between an adhesive layer 504 and another composite layer of the moldable fire-resistant composite 501 to assure adhesion and protect the adhesive interface 518 from heat and fire. FIG. 18 illustrates a cross sectional view of an exemplary moldable fire-resistant composite 601 according to another embodiment. The moldable fire-resistant composite 601 can include a series of composite layers including: (1) a gel coat layer 602 formed from one or more layers of gel coat 608 mixed with one or more heat-dissipating components 610; (2) an adhesive layer 604 formed from adhesive; and (3) a reinforced resin layer 606 formed from one or more layers of a resin 612 reinforced with a reinforcing structure 614. When exposed to heat or fire, the gel coat 608 and the reinforced resins 612 can release water, swell, increase in surface area and/or produce char to decrease the thermal conductivity and heat transfer across the moldable fire-resistant composite 601 and cool the composite.

The gel coat layer 602 can include a gel coat 608, heat-dissipating components 610, accelerators, initiators, fillers and other additives, such as those described with respect to FIG. 16. The volume or weight ratio of gel coat 608, heat-dissipating components 610, accelerators, initiators, fillers and other additives in the gel coat layer 602 can be varied to accommodate different applications, fire standards, smoke standards, building standards or other desired product specifications.

The gel coat 608 can be a halogenated or non-halogenated resin, such as a polyester resin. In an exemplary embodiment, the gel coat 608 is FIREBLOCK™ 2330PAWK745 manufactured by CCP Composites U.S.

The heat-dissipating component 610 in the gel coat layer 602 can be any heat dissipating material 610 including, but not limited to sand, dried silica, anhydrous silicon dioxide ($SiO_2$), gravel, rock, clay, ceramic, porous cement, polymer or other heat or fire dissipating component capable of increasing the surface area and/or decreasing the heat transfer across the moldable fire-resistant composite.

The reinforced resin layer 606 can include a resin 612 and a reinforcing structure 614. The resin 612 in the reinforcing resin layer 606 can be composed of intumescent resins described is this specification or halogenated, unsaturated polyester resins that impart fire, flame and/or smoke resistant or suppressant properties by reducing flame and smoke spread. The reinforced resin layer 606 can also contain accelerators, initiators, fillers and other additives to improve the hardening, heat resistance, fire resistance or smoke resistance characteristics of the reinforced resin layer 606. The accelerators, initiators, fillers and additives can include, but are not limited to peroxide catalysts such as methyl ethyl ketone peroxide (MEKP) or aluminum hydrates such as alumina tri-hydroxide (ATH). Alumina trihydrate (ATH) releases water vapor at a specific temperature, thereby cooling the moldable fire-resistant composite 601 when exposed to fire or heat.

The reinforcing structure 614 can be any structure that supports the reinforced resin layer 606 and/or imparts fire-resistant or smoke suppressant properties to the moldable fire-resistant composite 601. The reinforcing structure 614 can include, glass, fiber, fiber glass, carbon fiber, cloth, oriented strand cloth, chopped strand mat, paper, ceramic, metal, cement, fire-resistant polymer or other reinforcing structure capable of being incorporated into the resin to create a reinforced resin layer 606. The reinforcing structure 614 can also be treated or made from flame resistant or smoke suppressant materials.

The adhesive layer 604 can include an adhesive capable of adhering layers of the moldable fire-resistant composite 601. The adhesive layer 604 can be formed from intumescent resins, reinforced resins or other heat and fire-resistant adhesives described in this specification. Other heat and fire-resistant adhesives can include, but are not limited to cement adhesives including phosphate cements, fire-resistant concrete or polymer adhesives, such as acrylic resins, epoxy resins, rubber resins or combinations thereof.

The moldable fire-resistant composite 601 can be formed from multiple gel coat layers 602, adhesive layers 604 and reinforced resin layers 606. Each layer of gel coat 602, adhesive 604 and reinforced resin 606 can be stacked on, adhered to or placed in contact with other layers (602, 604, and 606) in any order to form a moldable, fire-resistant, composite matrix 601.

In one exemplary embodiment illustrated in FIG. 18, one or more layers of gel coat 602 are stacked on, adhered to or placed in contact with one or more layers of adhesive 604, and one or more layers of adhesive are stacked on, adhered to or placed in contact with one or more layers of reinforced resin 606 to form a first layer of gel coat 602, a second layer of adhesive 604 and a third layer of reinforced resin 606 in the moldable, fire-resistant, composite matrix 601. Alternatively, the moldable fire-resistant composite 601 can include a gel coat layer 602 adhered directly to a reinforced resin layer 606 without an adhesive layer in between.

In another exemplary embodiment illustrated in FIG. 18, an outer, exposed surface 616 of the moldable fire-resistant composite 601 is made of a mixture of gel coat 608 and heat dissipating material 610. The ratio of gel coat 608 to heat dissipating material 610 can be varied to modify the heat, fire and smoke resistant properties of exposed surfaces of the moldable fire-resistant composite 601 that are most susceptible to heat and fire.

Figure 19:
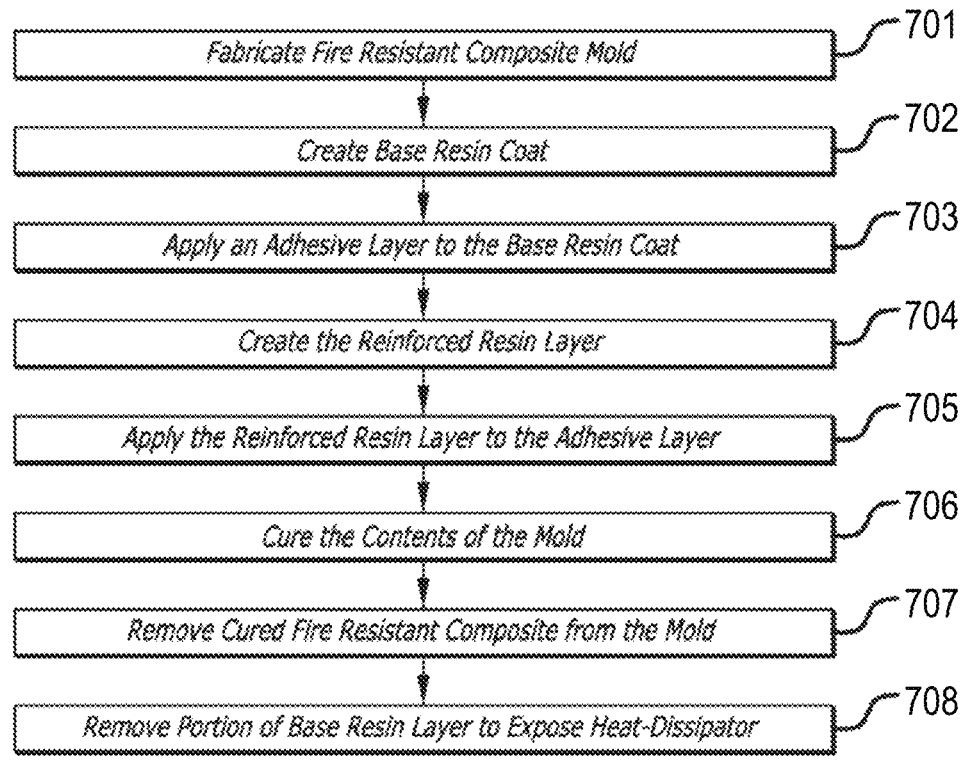
FIG. 19 is a process flow diagram of an example method for manufacturing a moldable fire-resistant composite in accordance with some aspects of the present disclosure.
Figure 20A:
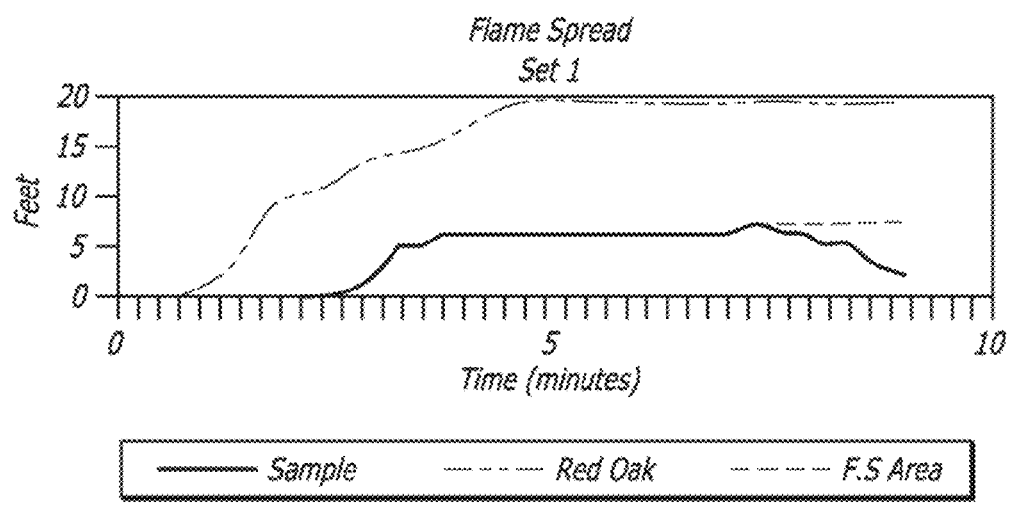
FIGS. 20A-22B are line charts illustrating the flame spread and smoke developed per time for sets 1-3 of Example 5 for ASTM E84-10 Test 1.
Figure 20B:
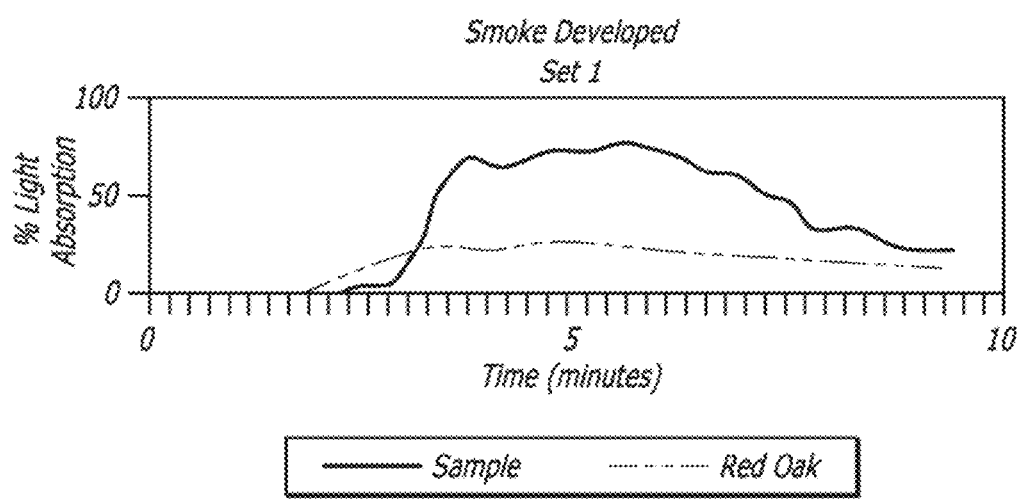
Figure 21A:
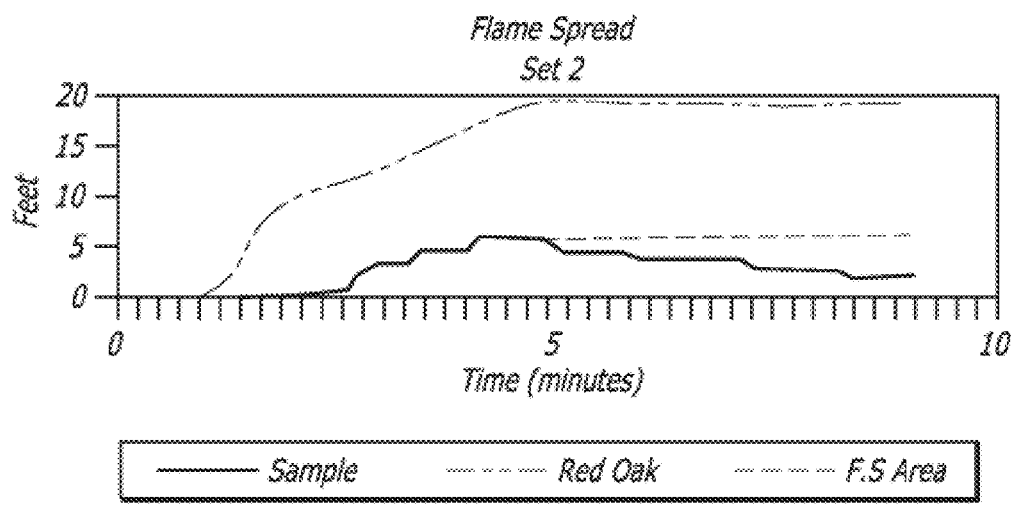
Figure 21B:
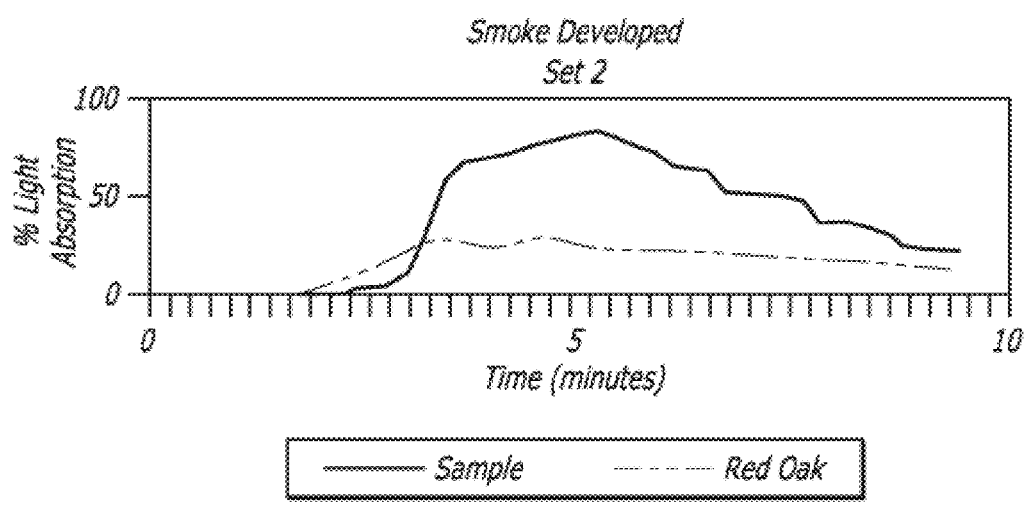
Figure 22A:
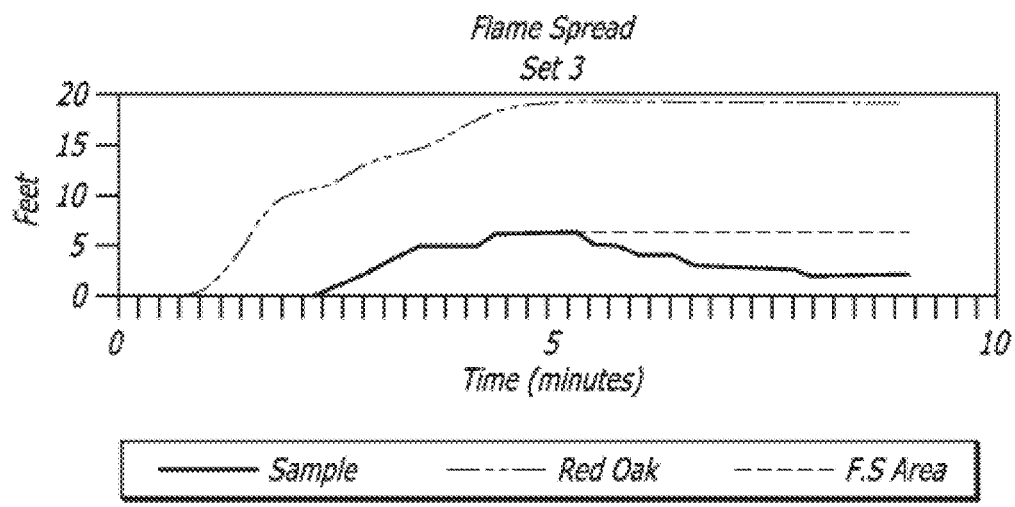
Figure 22B:
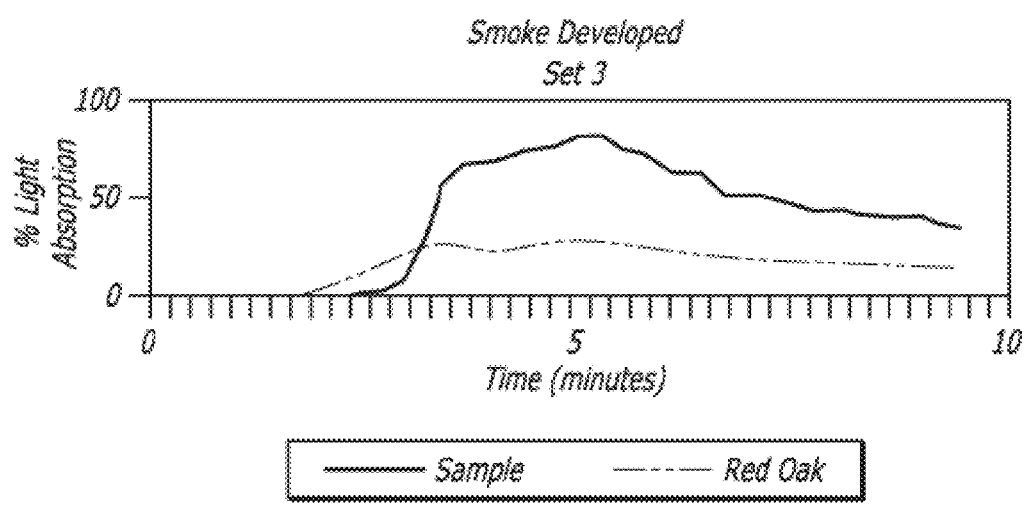
Figure 23A:
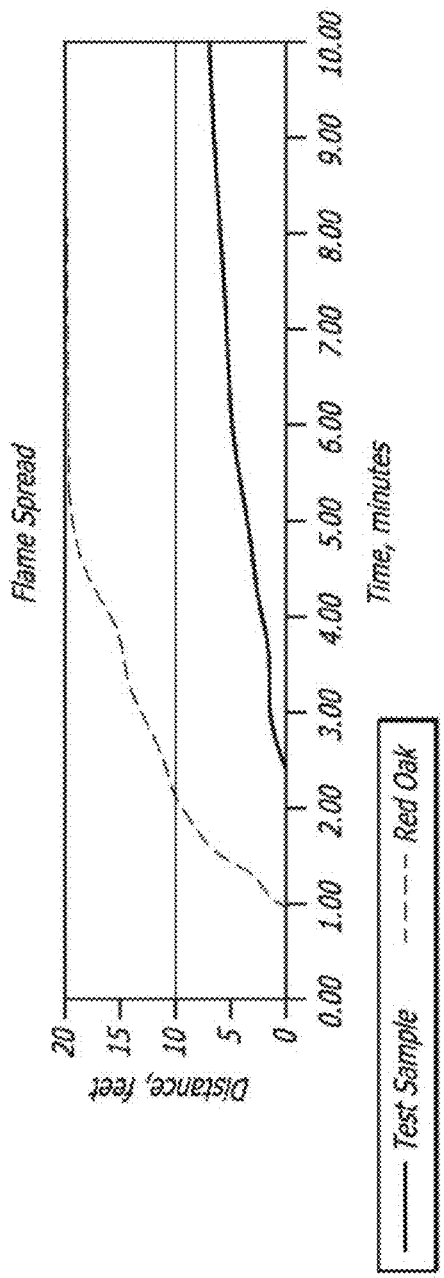
FIGS. 23A-25B are line charts illustrating illustrate the flame spread and smoke developed per time for sets 1-3 of Example 1 for ASTM E84-10 Test 2.
Figure 23B:
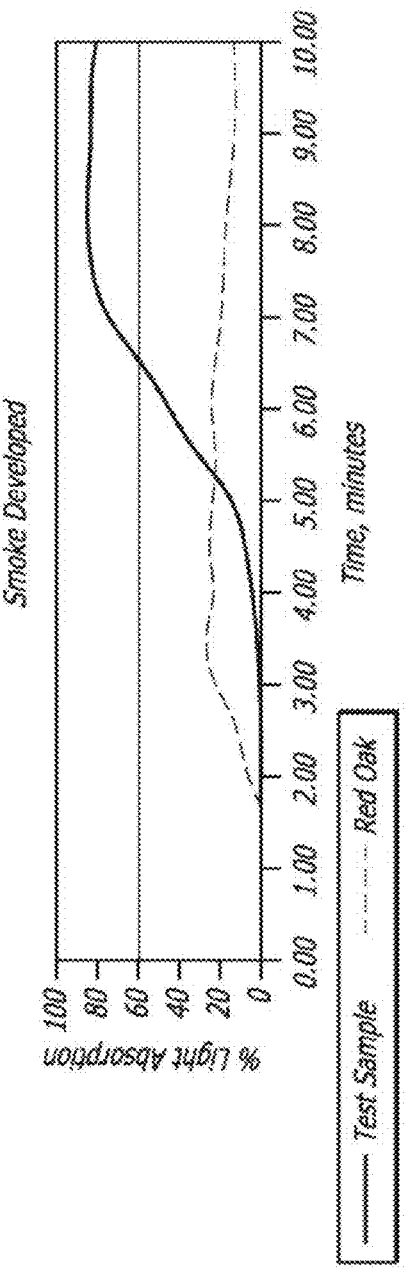
Figure 24A:
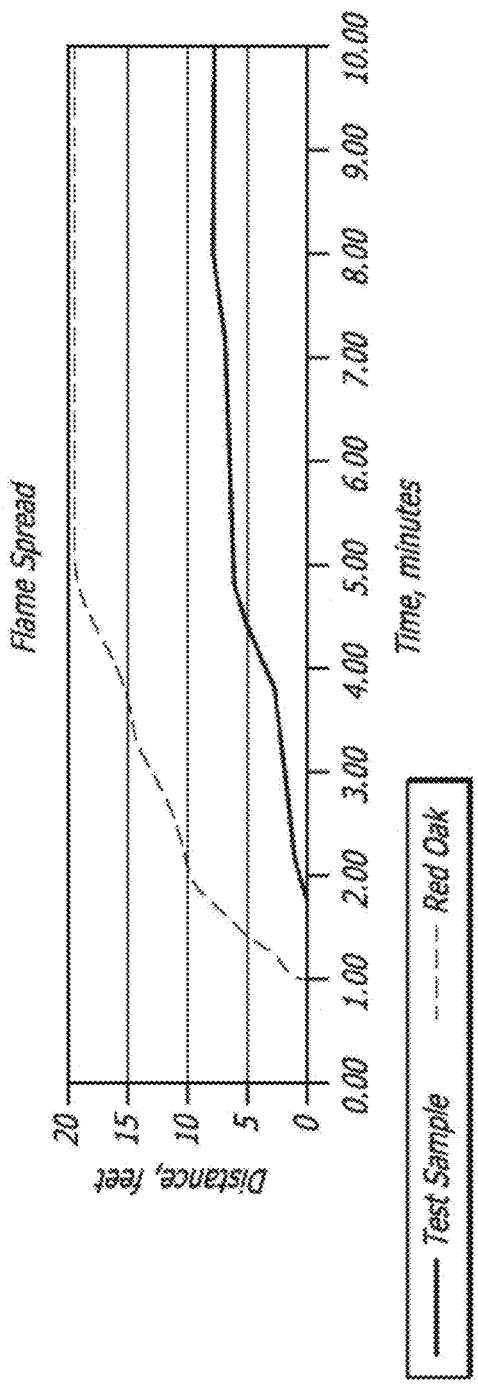
Figure 24B:
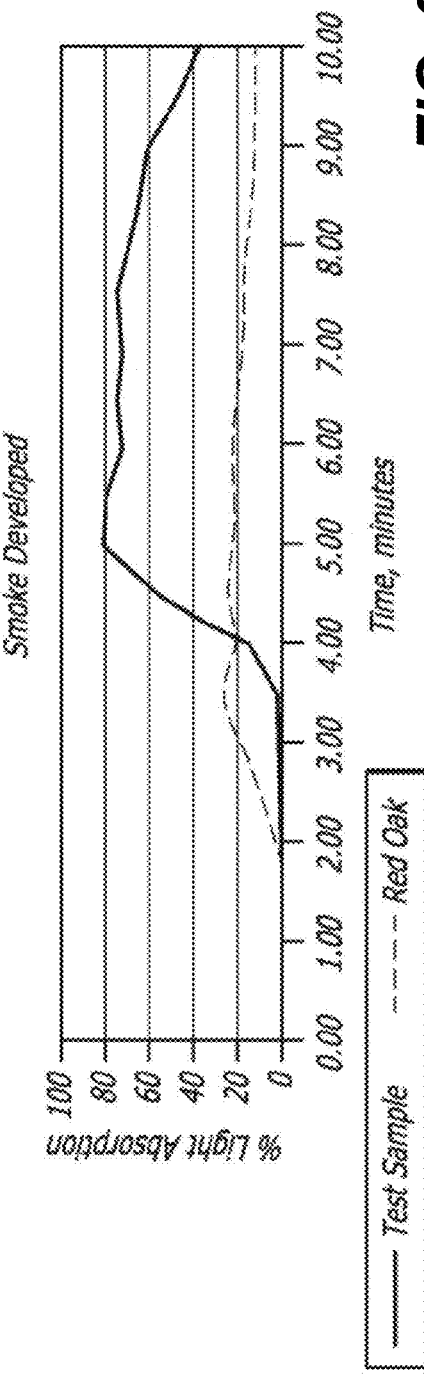
Figure 25A:
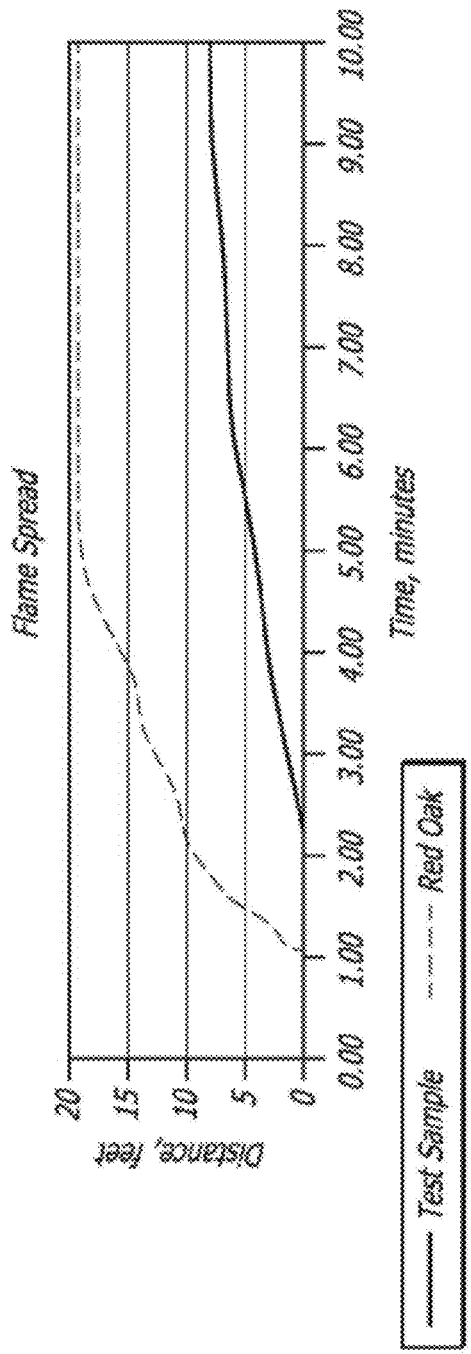
Figure 25B:
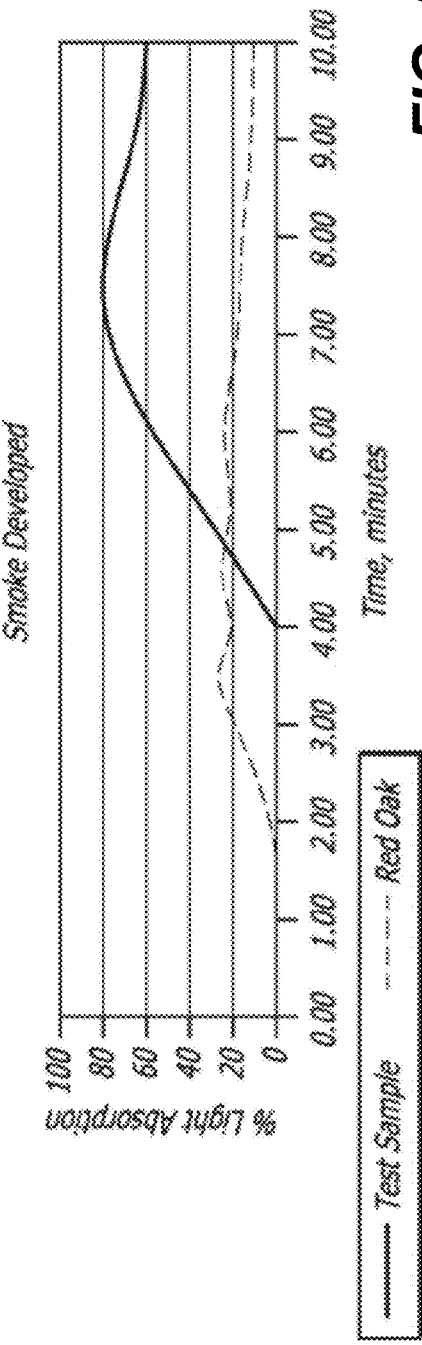
Figure 26A:
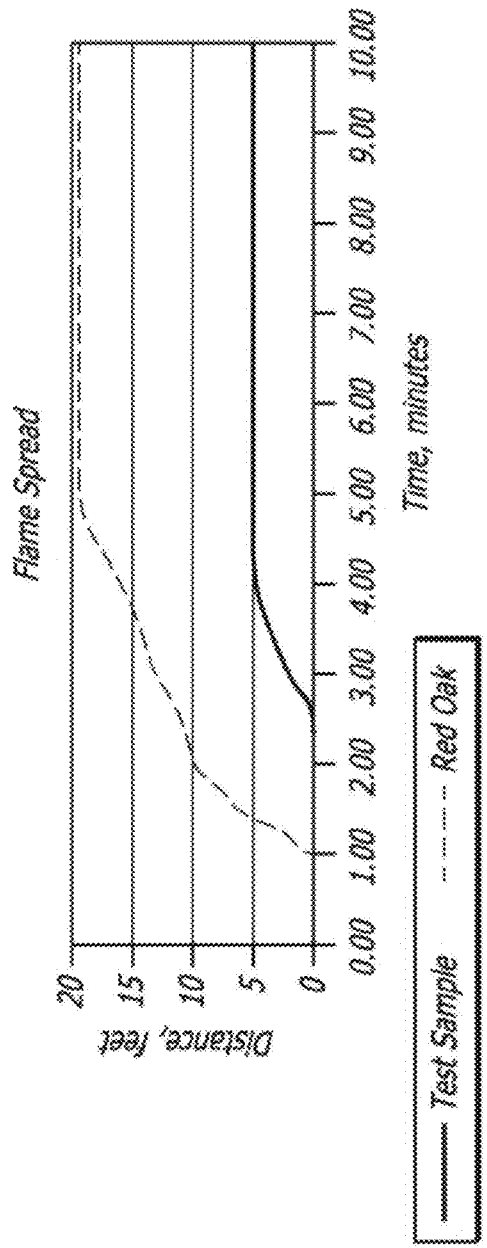
FIGS. 26A-28B are line charts illustrating the flame spread and smoke developed per time for sets 1-3 of Example 6 for ASTM E84-10 Test 3.
Figure 26B:
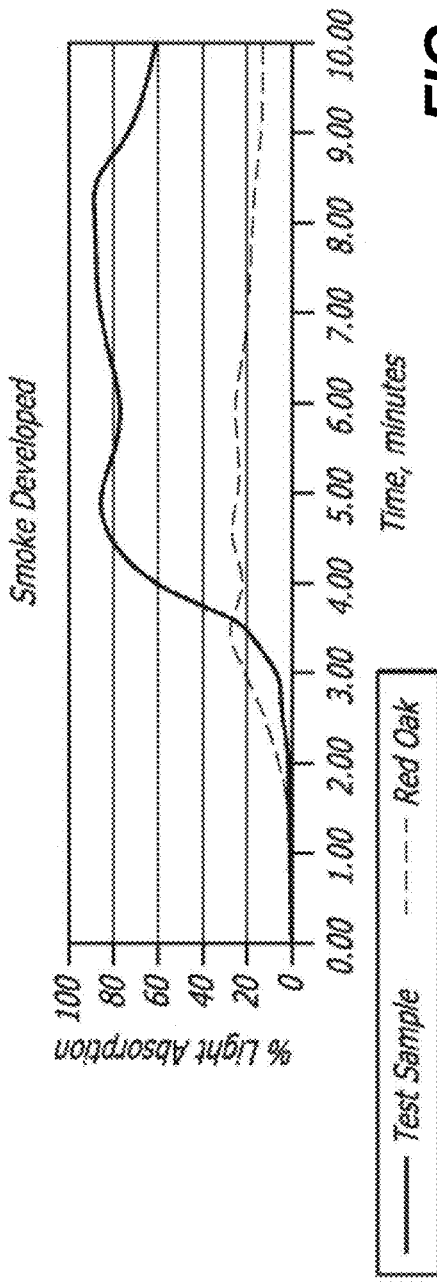
Figure 27A:
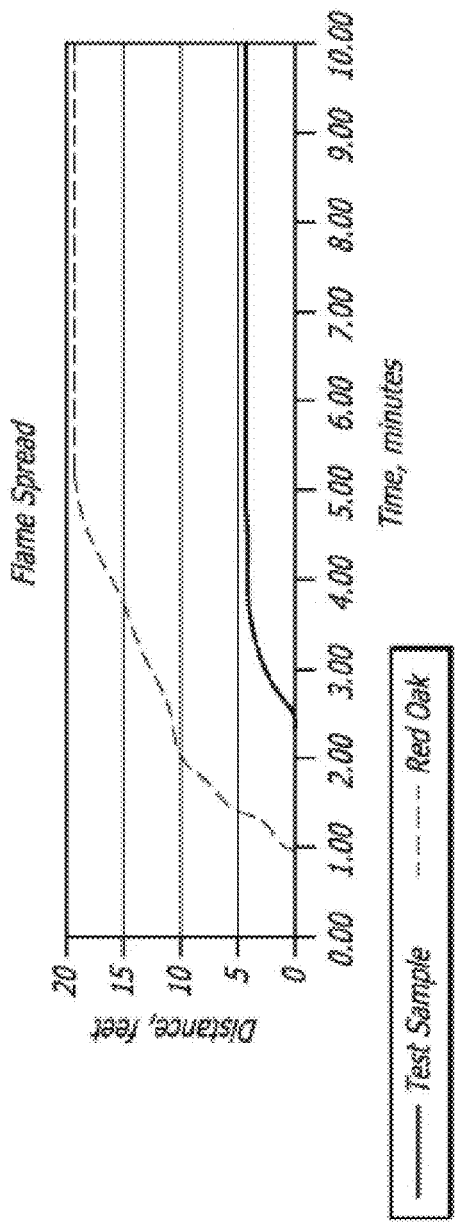
Figure 27B:
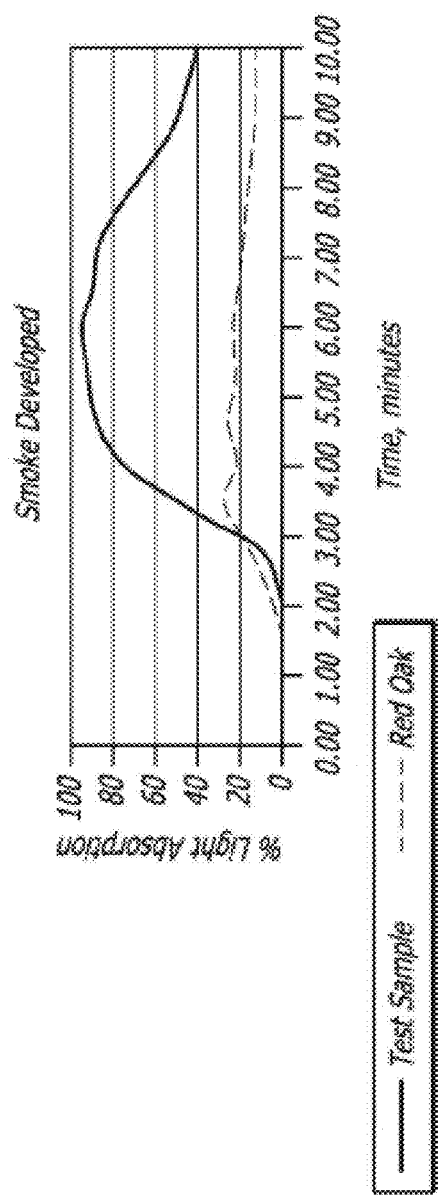
Figure 28A:
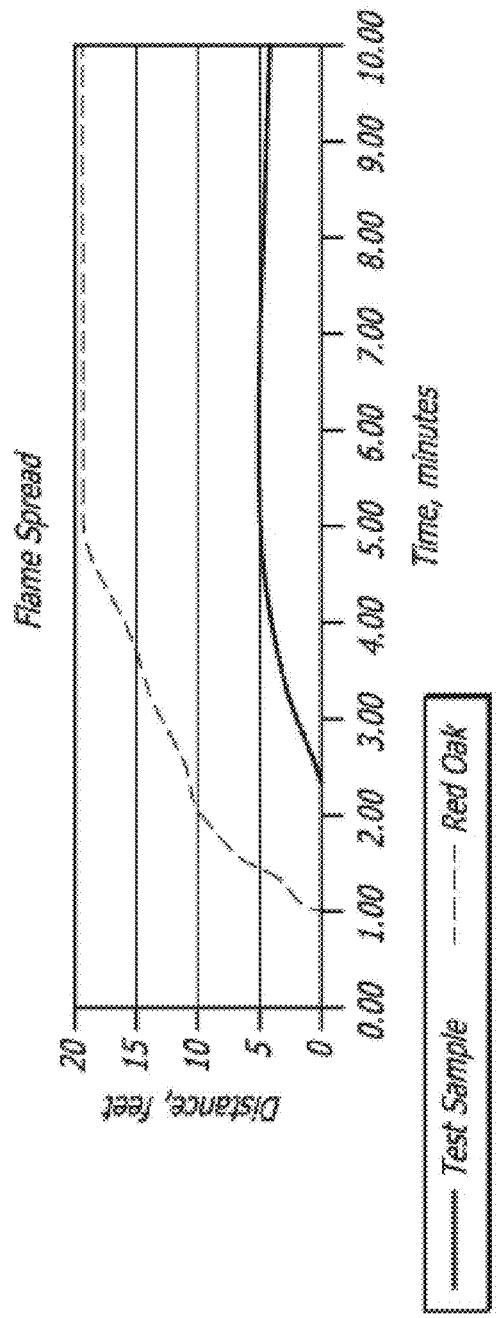
Figure 28B:
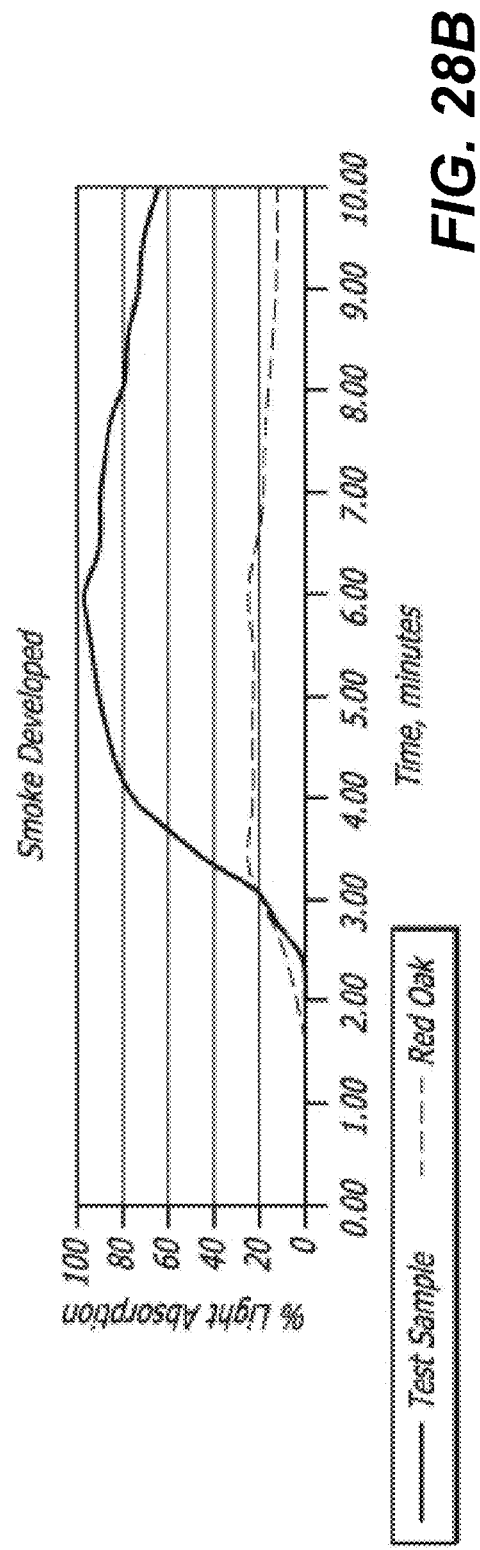

FIG. 19 illustrates a process flow diagram of an exemplary method 700 for manufacturing a moldable fire-resistant composite according to one embodiment. At step 701, a fire-resistant composite mold is fabricated using computer aided manufacturing processes and tools, such as a computer automated milling machine.

At step 702, a base resin coat or layer is created by mixing an intumescent resin or gel coat, a hardening catalyst (e.g., MEKP) and a heat dissipating component, such as those described in this specification. The heat-dissipating component in the base resin layer can be any heat dissipating material including, but not limited to sand, dried silica, anhydrous silicon dioxide ($SiO_2$), gravel, rock, clay, ceramic, porous cement, polymer or other heat or fire dissipating component capable of increasing the surface area and/or decreasing the heat transfer across the moldable fire-resistant composite.

In an exemplary embodiment, the heat dissipating component is kiln dried silica sand and the weight ratio of intumescent resin to sand is 100 parts intumescent resin per 100 parts sand.

The base resin layer is applied or sprayed onto an inside surface of the fire-resistant composite mold with a brush, spray gun or other tool capable of applying the base resin coat to a surface of the fire-resistant composite mold. One or more layers of base resin can be applied to a surface of the fire-resistant composite mold to create a base resin layer having any thickness. In an exemplary embodiment, ⅛th of an inch of base resin is applied to a surface of the fire-resistant composite mold. The base resin can be partially or fully cured at room temperature for a period of time. In an exemplary embodiment, the base resin is allowed to cure at room temperature for a period of time sufficient to achieve suitable crosslinking and hardening of the resin. The base resin can also be cured at a temperature above room temperature.

At step 703, an adhesive layer is applied or sprayed onto the base resin layer prior to or after the base resin layer cures. The adhesive layer can be applied with a brush, spray gun or other tool such as, vacuum applied pressure or a press capable of applying the adhesive layer to a surface of the base resin layer. The adhesive layer can include an adhesive capable of adhering layers of the moldable fire-resistant composite including, but not limited to the intumescent resins, the reinforced resins or other heat and fire-resistant adhesives described in this specification. Other heat and fire-resistant adhesives can include, but are not limited to cement adhesives including polymer adhesives, such as acrylic resins, epoxy resins, rubber resins or combinations thereof. The adhesive layer can comprise the same or a different intumescent resin used in the base resin layer. One or more layers of adhesive can be applied to a surface of the base resin layer to create an adhesive layer having any thickness.

In an exemplary embodiment, the adhesive layer can be an additional smooth layer of intumescent resin applied to the base resin layer to create a suitable adhesive interface between a base resin layer and a reinforced resin layer.

At step 704, a fire-retardant resin, such as a halogenated resin mixture, is created by mixing a halogenated unsaturated polyester resin, alumina trihydrate (ATH) and a hardening catalyst, such as methyl ethyl ketone peroxide (MEKP). The halogenated resin mixture is applied to layers of a reinforcing structure. The reinforcing structure can include, glass, fiber, fiber glass, carbon fiber, cloth, oriented strand cloth, chopped strand mat, paper, ceramic, metal, cement, fire-resistant polymer or other reinforcing structure capable of being incorporated into the resin to create a reinforced resin layer. The reinforcing structure can also be treated or made from flame resistant or smoke suppressant materials. One or more layers of halogenated resin mixture can be applied to a surface of the reinforcing structure to create a halogenated resin layer having any thickness. The halogenated resin mixture can be applied to the reinforcing structure with industrial rollers for impregnating or injecting the halogenated resin mixture into the reinforcing structure to create a reinforced resin layer. The reinforced resin layer can be rolled onto PVC piping or other suitable spindle for transportation.

At step 705, the reinforced resin layer is applied to the adhesive layer by hand, with compacting tools or other tool, such as vacuum pressure or a press capable of applying the reinforced resin layer to a surface of the adhesive layer. One or more reinforced resin layers can be applied to a surface of the adhesive layer to create a reinforced resin layer having any thickness. Sufficient layers of reinforced resin can be applied to achieve the desired laminate strength. The number, size and shape of reinforced resin layers can be modified to accommodate any product specification or architectural design including size, shape or weight requirements of the finished fire-resistant composite. The reinforced resin layer and the adhesive layer are permitted to cure or dry at room temperature for a period of time to create a hardened, structurally reinforced plastic.

In an exemplary embodiment, the reinforced resin layer and the adhesive layer is allowed to cure or dry cure until sufficient crosslinking occurs to achieve the desired laminate strength. The reinforced resin layer and the adhesive layer can also be cured at a temperature above room temperature.

Alternatively, the reinforced resin layer can be directly applied to a surface of the base resin layer within the mold without an adhesive layer in between. The reinforced resin layer can be applied before or after the base resin partially or fully cures into a hardened state.

At step 706, the contents of the mold are cured. A metal (e.g., aluminum) or other frame is embedded into the layers of base resin, adhesive and reinforced resin within the mold. The mold and its contents can be placed in an oven for post curing at a predetermined temperature for a predetermined time to create a cured fire-resistant composite part within the mold.

In an exemplary embodiment, the mold and its contents are post cured in an oven at a temperature of 150 degrees C. until sufficient crosslinking of the resins occur.

At step 807, the cured fire-resistant composite is removed from the mold.

At step 808 a portion of the base resin coat or layer is removed to expose the heat-dissipating component on a surface of the fire-resistant composite part. A portion of the base resin layer can be removed by sand blasting the layer to expose at least a portion of the heat-dissipating component, such as sand in the base resin layer. The exposed heat-dissipating component within the base resin layer of the fire-resistant composite imparts fire-resistant and smoke suppressant properties that further reduce flame and smoke spread when the fire-resistant composite is exposed to fire or heat.

The process for manufacturing moldable fire-resistant composites including the steps illustrated in FIG. 19 can be performed in any order and additional processing steps can be included. For instance, one or more layers or combination of layers of the moldable fire-resistant composite can be adhered to another layer in any order. The moldable fire-resistant composite can also be polished, sanded, or painted with any material to apply a surface finish to any layer of the moldable fire-resistant composite. The process for manufacturing moldable fire-resistant composites disclosed in this specification can be used to shape and mold any fire-resistant composite part to accommodate specific geometries, product specifications and architectural designs.

In an exemplary embodiment, the process steps outlined in FIG. 19 are used to create an exterior panel for a building or high-rise. In some embodiments, the panels described herein are especially useful as exterior, decorative panels for a building or high-rise. In some embodiments, the panels described herein as useful as windscreens for a building or high-rise.

EXAMPLES

The following examples are provided to illustrate exemplary formulations of moldable fire-resistant composites and processes for manufacturing moldable fire-resistant composites. The examples are not intended to limit the scope of the present disclosure. Various formulations throughout the examples when used in combination or independently have been found to impart specific fire, flame and smoke resistant properties to the final moldable fire-resistant composite. The compositions and weight ratios of each component part of a composite layer described in the examples can be modified to meet material or product specifications.

Example 1

A reinforced resin layer was manufactured with the components outlined in Table 1.

TABLE 1

| Reinforced Resin Layer | | |
| --- | --- | --- |
| Material | I.D. (Specification) | Supplier |
| Resin | Norsodyne H 81269 TF | CCP |
| Accelerator | 6% cobalt | |
| Initiators | Luperox ® DDM-9 | Arkema |
| Initiators | Hi-Point ® PD-1 | Pargan Marshall |
| Fiberglass | Chopped strand mat | Metyx |

The reinforced resin layer of Example 1 is composed of a reinforcing resin mixture of the resin Norsodyne H 81269 TF, an accelerator containing 6% cobalt and the initiators Luperox® DDM-9 and Hi-Point® PD-1. The reinforcing resin mixture is applied to chopped strand mat fiberglass to form a reinforced resin layer. The reinforced resin layer was cured at room temperature and post cured at elevated temperature. The percent by weight composition of each component of the reinforced resin layer based on weight of resin of Example 1 is outlined in Table 2.

TABLE 2

Reinforced Resin Layer Weight Composition

| Material | Amount by Weight |
|---|---|
| Resin | As Required |
| Accelerator | 0.15%-0.24% of resin by weight |
| Initiators | 0.9%-2.4% of resin by weight |
| Fiberglass | At least 41% of resin by weight |

Example 2

A reinforced resin layer was manufactured with the components outlined in Table 3.

TABLE 3

Reinforced Resin Layer

| Material | I.D. (Specification) | Supplier |
|---|---|---|
| Resin | Hetron ® 650 | Ashland |
| Synergist | APE 3040 | Nyacol |
| Engineered Filler | MX100 ATH | R J Marshall |
| Initiator | Luperox ® DDM-9 | Arkema |
| Initiator | Hi-Point ® PD-1 | Pargan Marshall |
| Fiberglass | Oriented strand cloth | Metyx |

The reinforced resin layer of Example 2 is composed of a reinforcing resin mixture of the resin Hetron® 650, the synergist APE 3040 and the initiators Luperox® DDM-9 and Hi-Point® PD-1. The reinforcing resin mixture is applied to oriented strand cloth fiberglass to form a reinforced resin layer. The reinforced resin layer was cured at room temperature and post cured at elevated temperature. The percent by weight composition of each component of the reinforced resin layer based on weight of resin of Example 2 is outlined in Table 4.

TABLE 4

Reinforced Resin Layer Weight Composition

| Material | Amount by Weight |
|---|---|
| Resin | As Required |
| Synergist | 3-8% of resin by weight |
| Engineered Filler | 100% of resin by weight |
| Initiators | 0.9%-2.4% of resin by weight |
| Fiberglass | At least 41% of resin by weight |

Example 3

A base resin layer was manufactured with the components outlined in Table 5.

TABLE 5

Base Resin Layer

| Material | I.D. (Specification) | Supplier |
|---|---|---|
| Resin | Norsodyne H 81269 TF | CCP |
| Accelerator | 6% cobalt | |
| Initiator | Luperox ® DDM-9 | Arkema |

TABLE 5-continued

Base Resin Layer

| Material | I.D. (Specification) | Supplier |
|---|---|---|
| Initiator | Hi-Point ® PD-1 | Pargan Marshall |
| Engineered Filler | A204 3-5 micron ATH | R J Marshall |
| Sand | Lapis Lustre #0/30 | Cemex |
| Sand | Lapis Lustre #2/16 | Cemex |

The base resin layer of Example 3 is composed of a mixture of the resin Norsodyne H 81269 TF, the accelerator containing 6% cobalt, the initiators Luperox® DDM-9 and Hi-Point® PD-1 and kiln dried sands Lapis Lustre #0/30 and Lapis Lustre #2/16. A pigment can be added to the base resin layer for coloring. The base resin layer was cured at room temperature and post cured at elevated temperature. The percent by weight composition of each component based on weight of resin of Example 3 is outlined in Table 6.

TABLE 6

Base Resin Layer Weight Composition

| Material | Amount by Weight |
|---|---|
| Resin | As Required |
| Accelerator | 0.15%-0.24% of resin by |
| Engineered Filler | At least 10% of resin by weight |
| Initiators | 0.9%-2.4% of resin by weight |
| Sands | At least 100% of resin by weight |
| Pigment | Up to 2% of resin by weight |

Example 4

A base resin layer was manufactured with the components outlined in Table 7.

TABLE 7

Base Resin Layer

| Material | I.D. (Specification) | Supplier |
|---|---|---|
| Gel Coat | Fireblock ™ 2330PAWK745 | CCP |
| Accelerator | 6% cobalt | |
| Initiator | Luperox ® DDM-9 | Arkema |
| Initiator | Hi-Point ® PD-1 | Pargan Marshall |
| Sand | Lapis Lustre #0/30 | Cemex |
| Sand | Lapis Lustre #2/16 | Cemex |

The base resin layer of Example 4 is composed of the resin Fireblock™ 2330PAWK745, an accelerator containing 6% cobalt, the initiators Luperox® DDM-9 and Hi-Point® PD-1 and kiln dried sands Lapis Lustre #0/30 and Lapis Lustre #2/16. A pigment can be added to the base resin layer for coloring. The base resin layer was cured at room temperature and post cured at elevated temperature. The percent by weight composition of each component based on weight of resin in Example 4 is outlined in Table 8.

TABLE 8

Base Resin Layer Composition

| Material | Amount by Weight |
|---|---|
| Resin | As Required |
| Accelerator | 0.15%-0.24% of resin by weight |
| Engineered Filler | At least 10% of resin by weight |

TABLE 8-continued

Base Resin Layer Composition

| Material | Amount by Weight |
|---|---|
| Initiators | 0.9%-2.4% of resin by weight |
| Sands | At least 100% of resin by weight |
| Pigment | Up to 2% of resin by weight |

Example 5

A moldable fire-resistant composite including a base resin layer; an adhesive layer; and a reinforced resin layer was manufactured according to the process described in FIG. 19 using the reinforced resin layer of Example 1 and the base resin layer of Example 3. The base resin layer was placed in a mold of an exterior building panel. An adhesive composed of the resin Norsodyne H 81269 TF was applied to the base resin layer in the mold. The reinforced resin layer was applied on top of the adhesive layer to adhere the base resin layer to the reinforced resin layer. The base resin layer and the reinforced resin layer can be attached prior to or after some curing occurs to either layer. The composite layers were cured at room temperature and post cured in an oven to assure adequate crosslinking of the resins. The resulting composite exterior building panel was removed from the mold and the base resin layer was sand-blasted to remove a layer of the base resin and expose the heat-dissipating sand component on a surface of the moldable fire-resistant composite panel. The moldable fire-resistant composite panel can be further processed for surface finishing, coloring or shaping. The base resin layer of Example 5 exhibits superior smoke suppressant properties and the reinforced resin layer exhibits superior flame retardant properties. The various layers of the moldable fire-resistant composite can be designed to suppress smoke, flames or both depending on the specific application of the composite part.

Example 6

A moldable fire-resistant composite including a base resin layer; an adhesive layer; and a reinforced resin layer was manufactured according to the process described in FIG. 19 using the reinforced resin layer of Example 2 and the base resin layer of Example 4. The base resin layer was placed in a mold of an exterior building panel. An adhesive composed of the resin Fireblock™ 2330PAWK745 was applied to the base resin layer in the mold. The reinforced resin layer was applied to the top of the adhesive layer to adhere the base resin layer to the reinforced layer. The base resin layer and the reinforced resin layer can be attached prior to or after some curing occurs to either layer. The composite layers were cured at room temperature and post cured in an oven to assure adequate crosslinking of the resins. The resulting composite exterior building panel was removed from the mold and the base resin layer was sand-blasted to remove a layer of the base resin and expose the heat-dissipating sand component on a surface of the moldable fire-resistant composite panel. The moldable fire-resistant composite panel can be further processed for surface finishing, coloring or shaping. The base resin layer of Example 6 exhibits superior smoke suppressant properties and the reinforced layer exhibits superior flame retardant properties. The various layers of the moldable fire-resistant composite can be designed to suppress smoke, flames or both depending on the specific application of the composite part.

ASTM E84-10 Flame and Smoke Spread Tests

The moldable fire-resistant composites of Examples 1, 5 and 6 were tested as described in the ASTM E84-10 X3. Guide to Handling Multiple Test Data. The testing included standard flame and smoke density developed classification tests in accordance with the ASTM Designation E84-10 "Standard Method of Test for Surface Burning Characteristics of Building Materials." In order to obtain the Flame Spread Classification, the results of the test should be compared to Table 9.

TABLE 9

ASTM E84-10 Flame Spread Classification

| NPA Class | IBC Class | Flame Spread | Smoke Developed |
|---|---|---|---|
| A | A | 0 to 25 | Less than or equal to 450 |
| B | B | 26 to 75 | Less than or equal to 450 |
| C | C | 76 to 200 | Less than or equal to 450 |

ASTM E84-10 Test 1

ASTM E84-10 Test 1 was performed on the moldable fire-resistant composite of Example 5. Three samples of the moldable fire-resistant composite of Example 5 were tested. The ignition occurred in 2 minutes and 33 seconds. The flame front was a maximum of 7 feet. The time to maximum spread was 8 minutes and 2 seconds. The test duration was 10 minutes. The ASTM E84-10 test results of Example 5 are provided in Table 10.

TABLE 10

ASTM E84-10 Test 1

| Material | Flame Spread | Smoke Developed |
|---|---|---|
| Set No. 1 | 25 | 250 |
| Set No. 2 | 20 | 250 |
| Set No. 3 | 20 | 250 |

FIGS. 20A-22B illustrate the flame spread and smoke developed per time for sets 1-3 of Example 5 for ASTM E84-10 Test 1.

ASTM E84-10 Test 2

ASTM E84-10 Test 2 was performed on the reinforced resin layer of Example 1. Three samples of the reinforced resin layers were tested. The ignition occurred in 2 minutes and 25 seconds. The flame front was a maximum of 7 feet. The time to maximum spread was 9 minutes and 41 seconds. The test duration was 10 minutes. The ASTM E84-10 test results of Example 1 are provided in Table 11.

TABLE 11

ASTM E84-10 Test 2

| Material | Flame Spread | Smoke Developed |
|---|---|---|
| Set No. 1 | 15 | 250 |
| Set No. 2 | 25 | 250 |
| Set No. 3 | 20 | 250 |

FIGS. 23A-25B illustrate the flame spread and smoke developed per time for sets 1-3 of Example 1 for ASTM E84-10 Test 2.

ASTM E84-10 Test 3

ASTM E84-10 Test 3 was performed on the moldable fire-resistant composite of Example 6. Three samples of the moldable fire-resistant composite of Example 6 were tested.

The ignition occurred in 2 minutes and 23 seconds. The flame front was a maximum of 5 feet. The time to maximum spread was 4 minutes and 24 seconds. The test duration was 10 minutes. The ASTM E84-10 test results of Example 6 are provided in Table 12.

TABLE 12

| ASTM E84-10 Test 3 | | |
| --- | --- | --- |
| Material | Flame Spread | Smoke Developed |
| Set No. 1 | 20 | 350 |
| Set No. 2 | 15 | 350 |
| Set No. 3 | 10 | 350 |

FIGS. 26A-28B illustrate the flame spread and smoke developed per time for sets 1-3 of Example 6 for ASTM E84-10 Test 3.

NFPA 285 Tests

The moldable fire-resistant composites of Example 6 underwent the NFPA 285 test, 2012 Edition, "Standard Fire Test Method for Evaluation of Fire Propagation Characteristics of Exterior Non-Load Bearing Wall Assemblies Containing Combustible Components." The wall assemblies in NFPA 285 Tests 1 and 2 below met the acceptance criteria stated in the standard. NFPA 285 provides a method of determining the flammability characteristics of exterior, non-load bearing wall assemblies, which contain combustible components. The test method is intended to simulate the "full-scale" fire performance of the wall assembly being evaluated. The following performance characteristics are evaluated: (1) Flame propagation over the exterior face of the system, (2) Vertical flame spread within the combustible core components from one story to the next, (3) Vertical flame spread over the interior (room side) surface of the panels from one story to the next, and (4) Lateral flame spread from the compartment of fire origin to adjacent spaces.

NFPA 285 Test 1

The moldable fire-resistant composite panels were made according to Example 6. Each panel underwent the NFPA 285 testing. The moldable fire-resistant composite panels were a nominal 7/16-in. thick panel, consisting of a 3/16-in. thick base resin layer and a 1/4-in. thick reinforced resin layer. The panels included preformed returns, integral steel perimeter framing, and a 1-in. thick mineral wool layer bonded to the back face of the panels within the return. The panels were an off-white color and had a nominal density of 125 lb/ft3. A base wall assembly consisted of 20-ga, 3-5/8-in., C-channel steel studs framed vertically 24 in. on center. Stud sections were included horizontally in between the vertical studs located nominally at the 11 ft 6-in. elevation, at the 5-ft elevation (in line with the window header framing), and 5 in. below the window sill. The interior face of the wall was sheathed with 5/8-in. Type "X" gypsum wallboard. The interior face gypsum joints were finished with 2-in. tape and treated with joint compound compliant to ASTM C 475, Standard Specification for Joint Compound and Joint Tape for Finishing Gypsum Board. The base wall assembly included 4-in. thick, 4-pcf, mineral wool safing placed within the stud cavity at each floor line and was held in place by "Z" clips. The mineral wool insulation was installed in multiple layers to cover the full thickness of the floor lines, which were nominally 8 in. thick. The exterior surface of the base wall was sheathed with 1/2-in. thick Densglass® Gold sheathing.

Following the completion of the base wall, 3×3×1/8-in. structural steel tubes were installed vertically over the exterior face of the wall. The vertical steel tubes were secured to the wall with 3-in. wide, 16-ga steel straps, which conformed to the face of the steel tube and tied back to the horizontal studs with a total of 4 fasteners per strap. The steel tubes were also tied back to the test frame at the top of each steel tube by welding 2×1/4-in. flat stock to the top of each tube, extending back to and welded to the test frame. A horizontal steel tube section was positioned nominally 2-3/4 in. above the window header to act as a base for the vertical steel tubes which were located above the window opening. The horizontal steel tube was supported by 3×3×1/4-in. angle clips bolted to a piece of flat stock which was welded to the underside of the horizontal tube. The supporting angle clips were secured to the vertical steel tubes that ran to the sides of the window opening. All vertical steel tubes included brackets which came off the front face of the tube and acted as hangers for the moldable fire-resistant composite panels. The hangers consisted of 2×3×1/8-in. tubes protruding off the front face of the tube with a 3×3×1/4-in. angle sitting on top surface of the protrusion.

Upon completion of the steel tube installation, 4-in. thick mineral wool insulation was installed between all steel tubes covering the full area of the wall except for where the steel tubes were. The mineral wool was installed using bugle head screws with 1-1/2-in. diameter washers. After the installation of the mineral wool, the moldable fire-resistant composite panels were lifted into place and were hung from the brackets on the steel tubes. The panels were preformed such that when installed they would have a nominal 1-in. gap between adjacent panels at the front face and a 1/4-in. gap between the returns of the panels. The 1/4-in. gaps between panel returns were filled with an intumescent gasket identified as "SpecSeal Series EW285 Firestop Gasket" and were manufactured by STI. The dimensions of the intumescent gasket was 3/4×3/8 in. (W×T).

After all the panels were installed, 20-ga galvanized steel flashing was installed on the interior surface of the window opening. The steel flashing was "L" shaped, capping the back edge of the base wall and terminating nominally 1 in. short of the front face of the moldable fire-resistant composite panels. The steel flashing on the interior window surfaces was attached only to the steel studs and track with two rows of fasteners spaced nominally 10 in. on center around the perimeter of the window. The test wall assembly was built into a movable frame system that was installed and secured to the test apparatus.

The test conditions were recorded at an ambient temperature of 85.2° F. and a relative humidity of 66.2%. The airflow across the exterior face of the test assembly was less than 4 ft/s as determined by an anemometer placed at right angles to the exterior face. Visual observations made during the test appear in Tables 13 and 14. Flame propagation observations are based on sustained flames on the surface of the wall. Intermittent flaming above the sustained flames is not considered for estimating the extent of flame propagation.

TABLE 13

| Test Observations of Front Wall | |
| --- | --- |
| Time | Observations of Front Wall |
| 0 | Start of test. |
| 1:30 | Light smoking from window header. Flashing beginning to sag and deflect. |

TABLE 13-continued

Test Observations of Front Wall

| Time | Observations of Front Wall |
|---|---|
| 5:00 | Window burner placed. |
| 6:30 | Discoloration spots are developing in the area of flame impingement above window header. |
| 10:00 | Wall continues to discolor. No attached flaming to wall. |
| 13:00 | Light smoke is beginning to accumulate in lab. No apparent smoking directly from the wall assembly. |
| 16:00 | Visible deflection to panels in area of flame impingement. |
| 17:00 | Flame is beginning to attach to wall assembly. |
| 20:00 | Flaming reaches 11-ft elevation (6 ft above window opening). |
| 23:00 | Flaming has receded to 10-ft elevation (5 ft above window opening). |
| 25:00 | Flaming attached to window jamb near upper corner where it meets window header. |
| 30:00 | Flaming has receded to 9-ft elevation (4 ft above window opening). Test terminated. Start of 10-min observation period. |
| 32:00 | All residual flaming has ceased. No further observations. |

TABLE 14

Test Observations of Second-Floor Room

| Time | Observations of Front Wall |
|---|---|
| 0 | Start of test. 100% visibility in second floor room. |
| 10:00 | No visible changes to visibility in second floor room. 100% visibility. |
| 20:00 | Slight reduction to visibility. 90% visibility. |
| 25:00 | Further reduction to visibility. 70% visibility. |
| 30:00 | Further reduction to visibility. 50% visibility. Test terminated. No flaming in second floor room during test period. Start of 10-min observation period. |
| 35:00 | Visibility increasing. 70% visibility. |

Flame Propagation, Exterior Face of Wall Assembly (1). TCs 11 and 14-17 did not exceed 1000° F. at any time during the test; (2). Flames emitting from the surface of the exterior face did not reach a vertical elevation of 10 ft above the top of the window opening at any time during the test; and (3). Flames emitting from the surface of the exterior face did not reach a lateral distance of 5 ft from the vertical centerline of the window opening any time during the test.

Flame Propagation, Core Components

The temperatures in the air cavity behind the panels as measured by TCs 28 and 31-40 did not exceed 1000° F. at any time during the test.

Flame Propagation, Beyond First-Story Test Room (1). Flames did not occur over the surface of the exterior face beyond the concrete block walls or beyond the intersection of the test wall assembly, and the concrete block fixture walls. (2). Lateral temperatures of the air cavity, as measured by TCs 18 and 19, did not exceed 1000° F. at any time during the test.

Temperatures in Second-Story Test Room

Temperatures 1 in. from the interior surface of the wall assembly within the second floor test room, as measured by TCs 49-54, did not exceed 500° F. above the ambient temperature at any time during the test.

Flames in Second-Story Test Room

Review of the pertinent TC data, second-floor videotape, and post-test inspection indicated that flame propagation did not occur in the second floor at any time during the test. The panels met acceptance criteria as stated in the NFPA 285 Standard.

Figure 29:
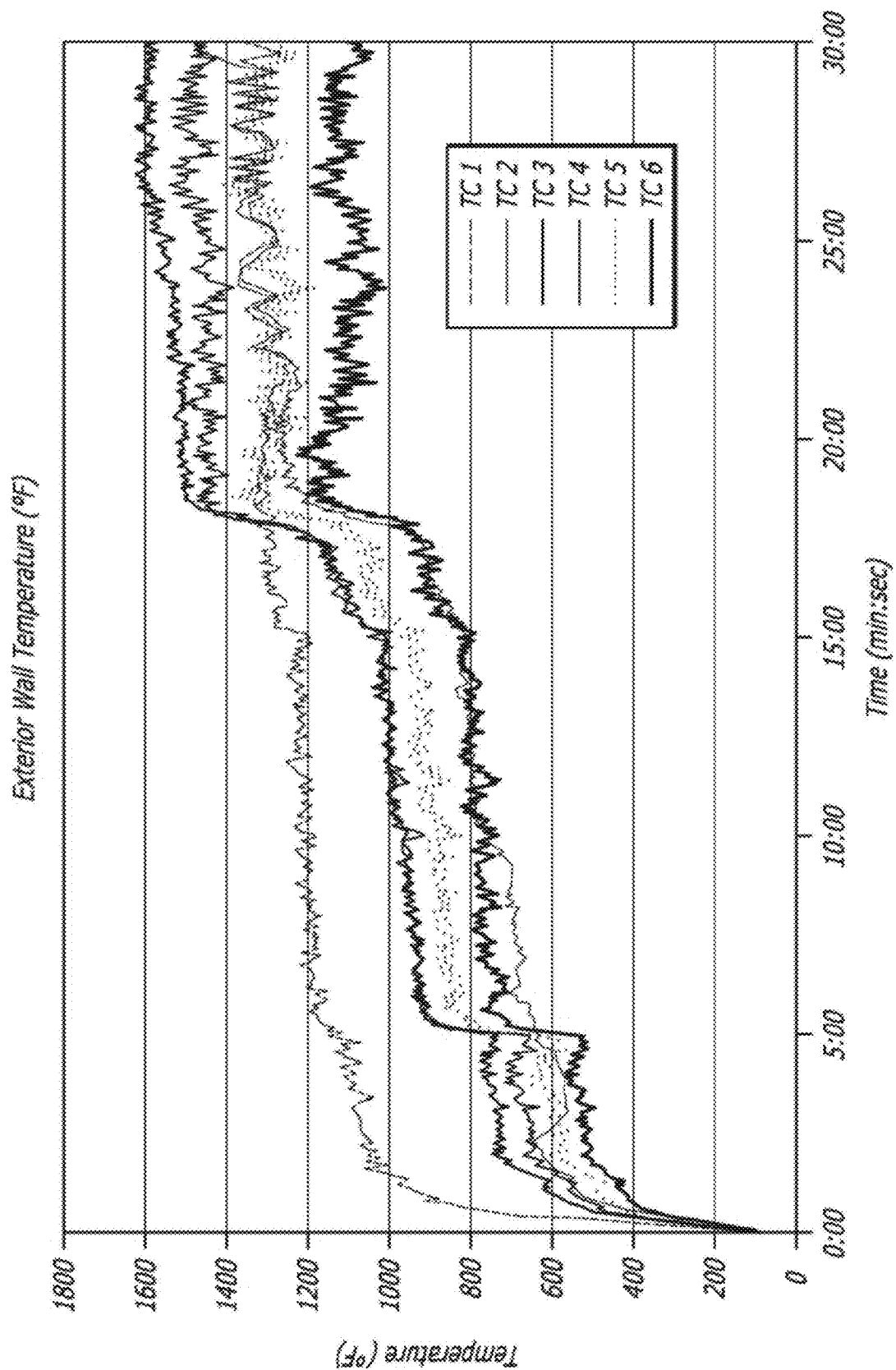
FIGS. 29-39 are line charts illustrating the temperature data per time for NFPA 285 Test 1.
Figure 30:
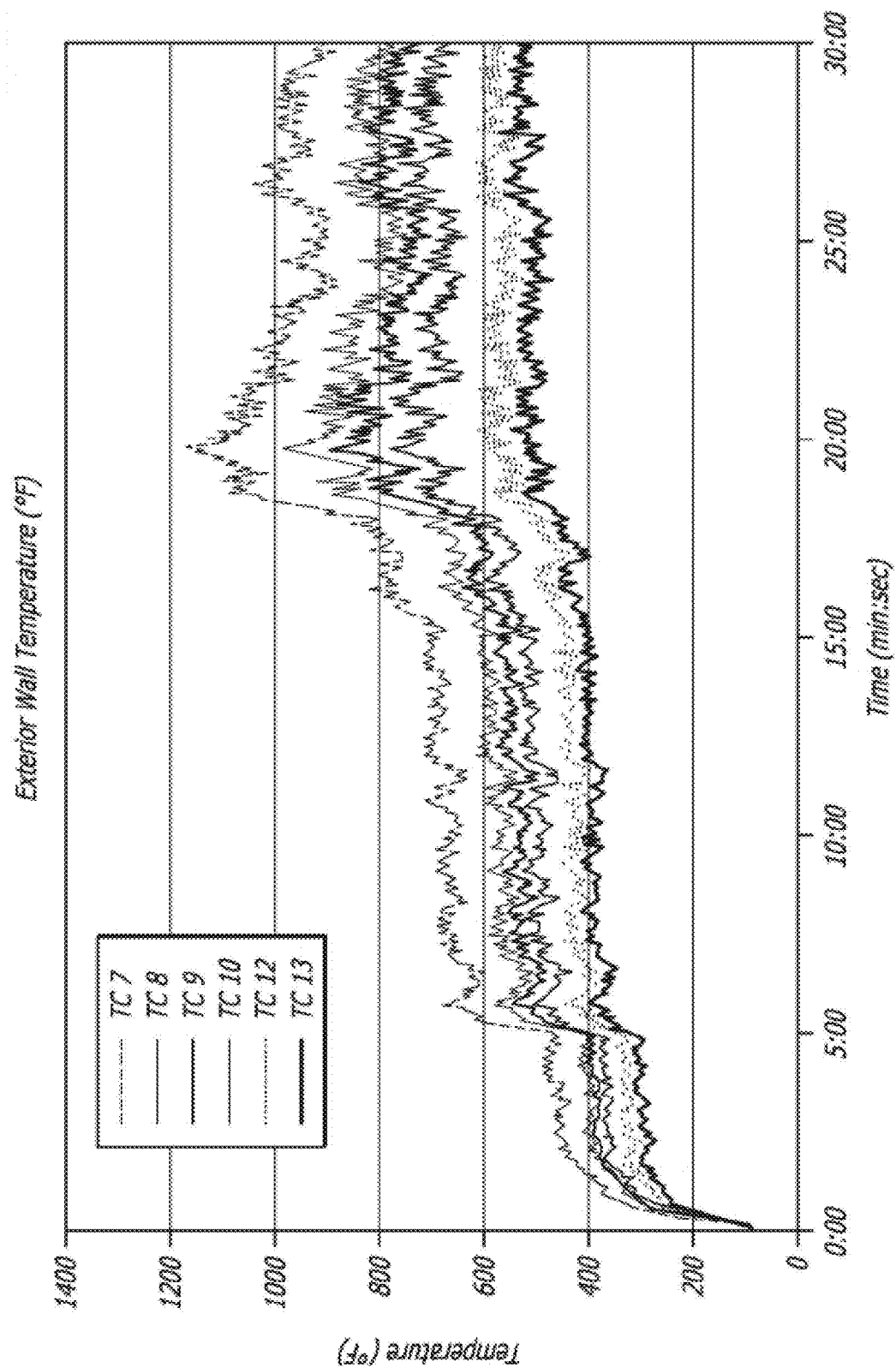
Figure 31:
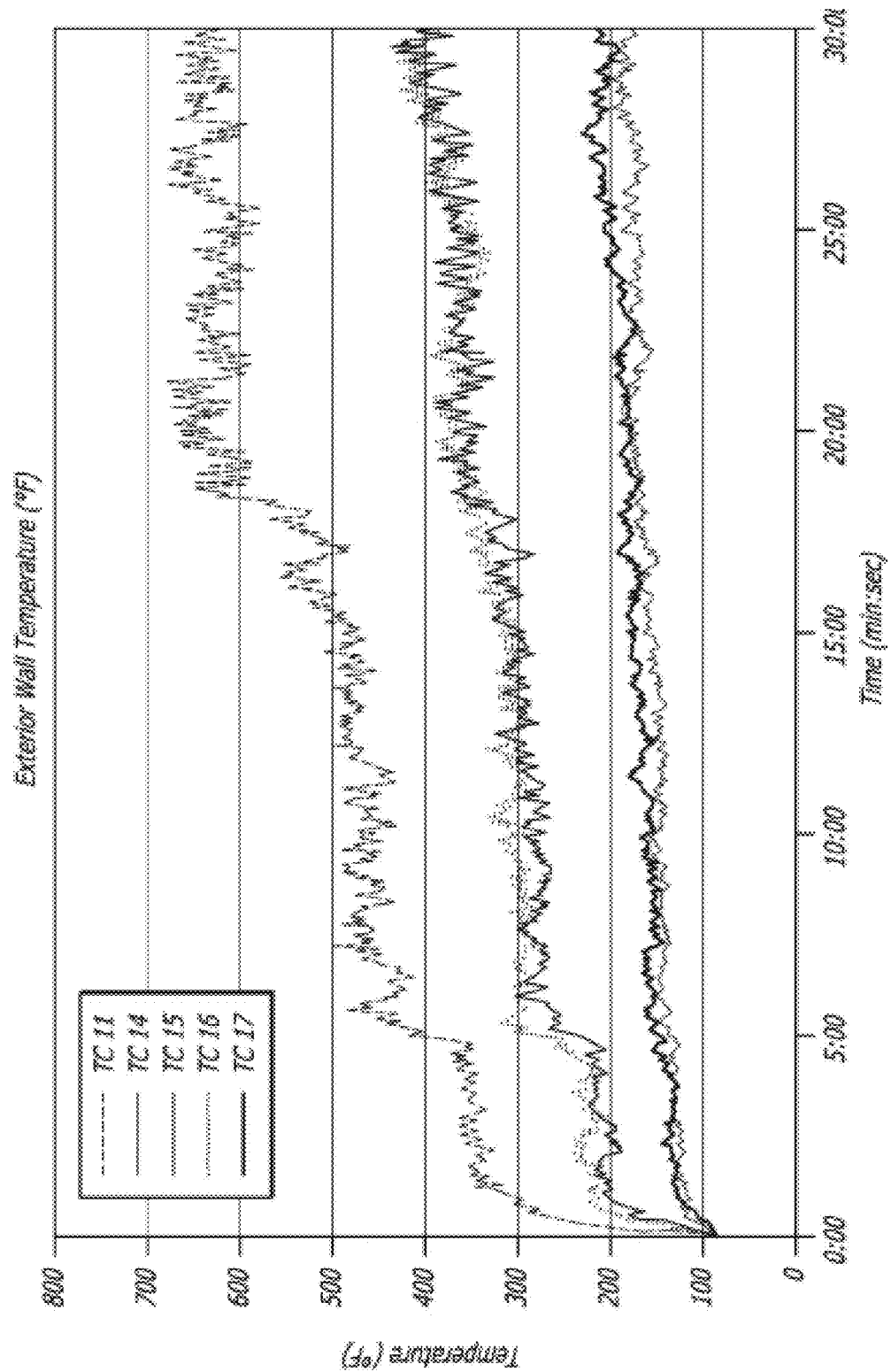
Figure 32:
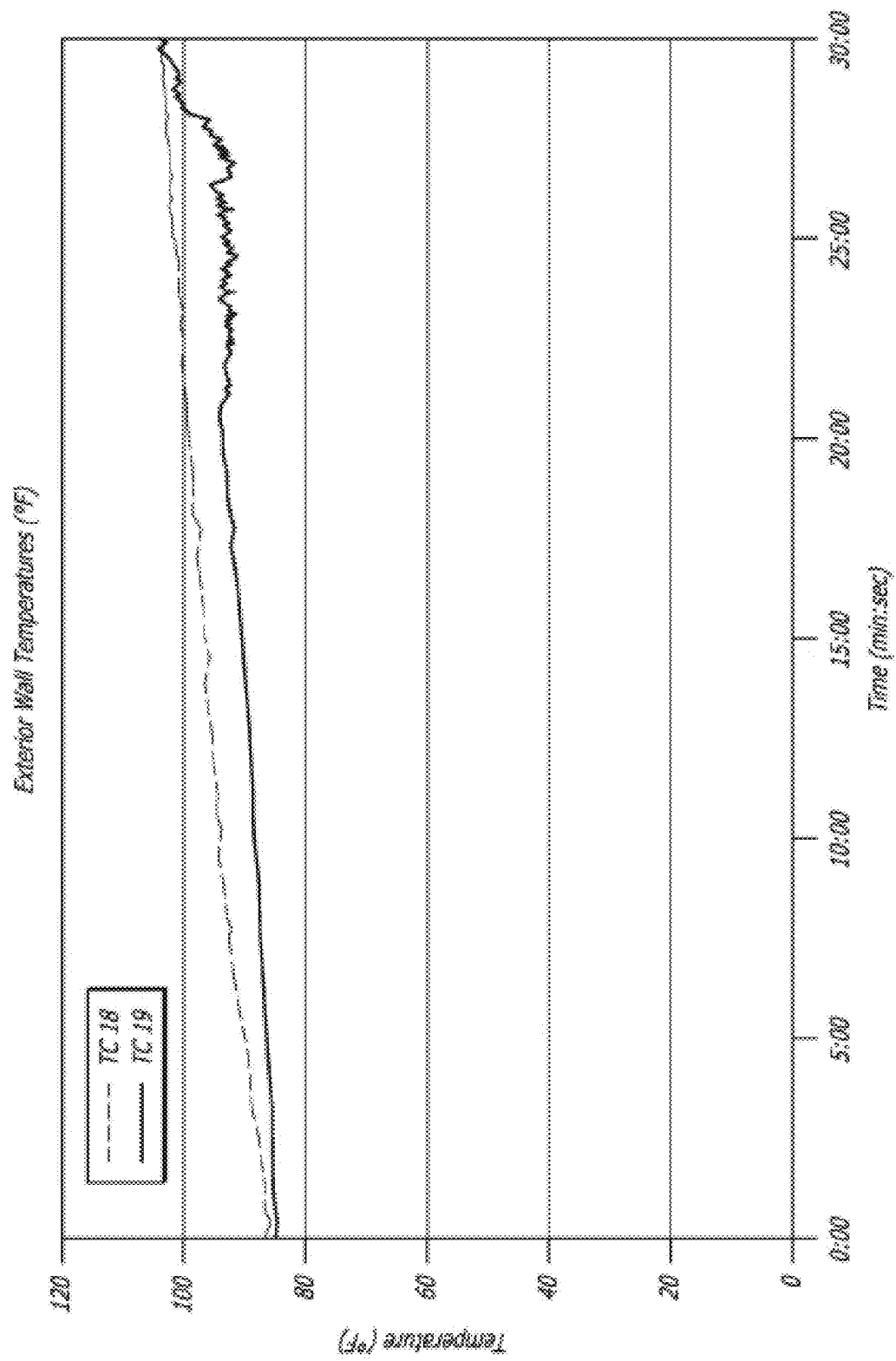
Figure 33:
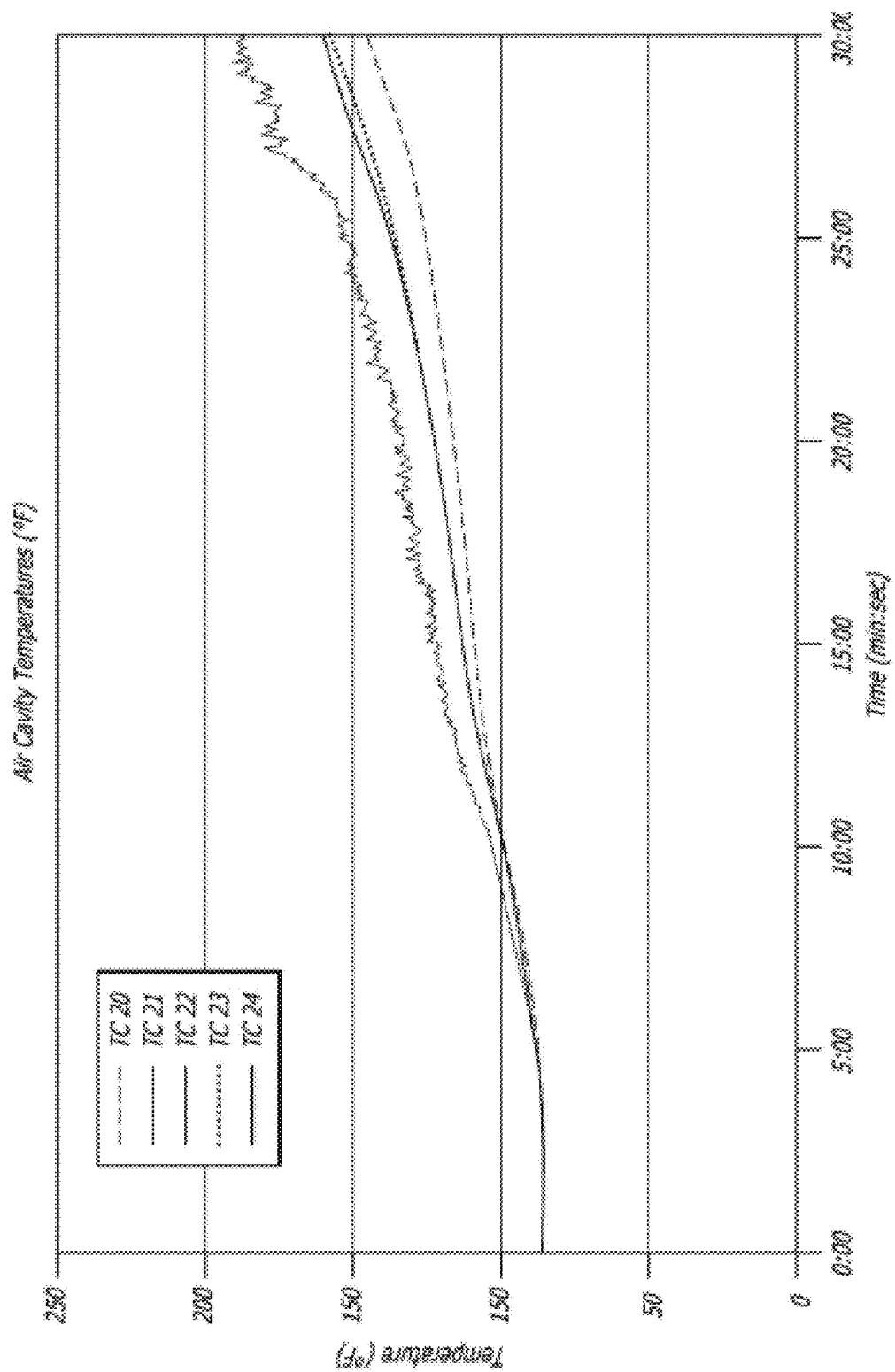
Figure 34:
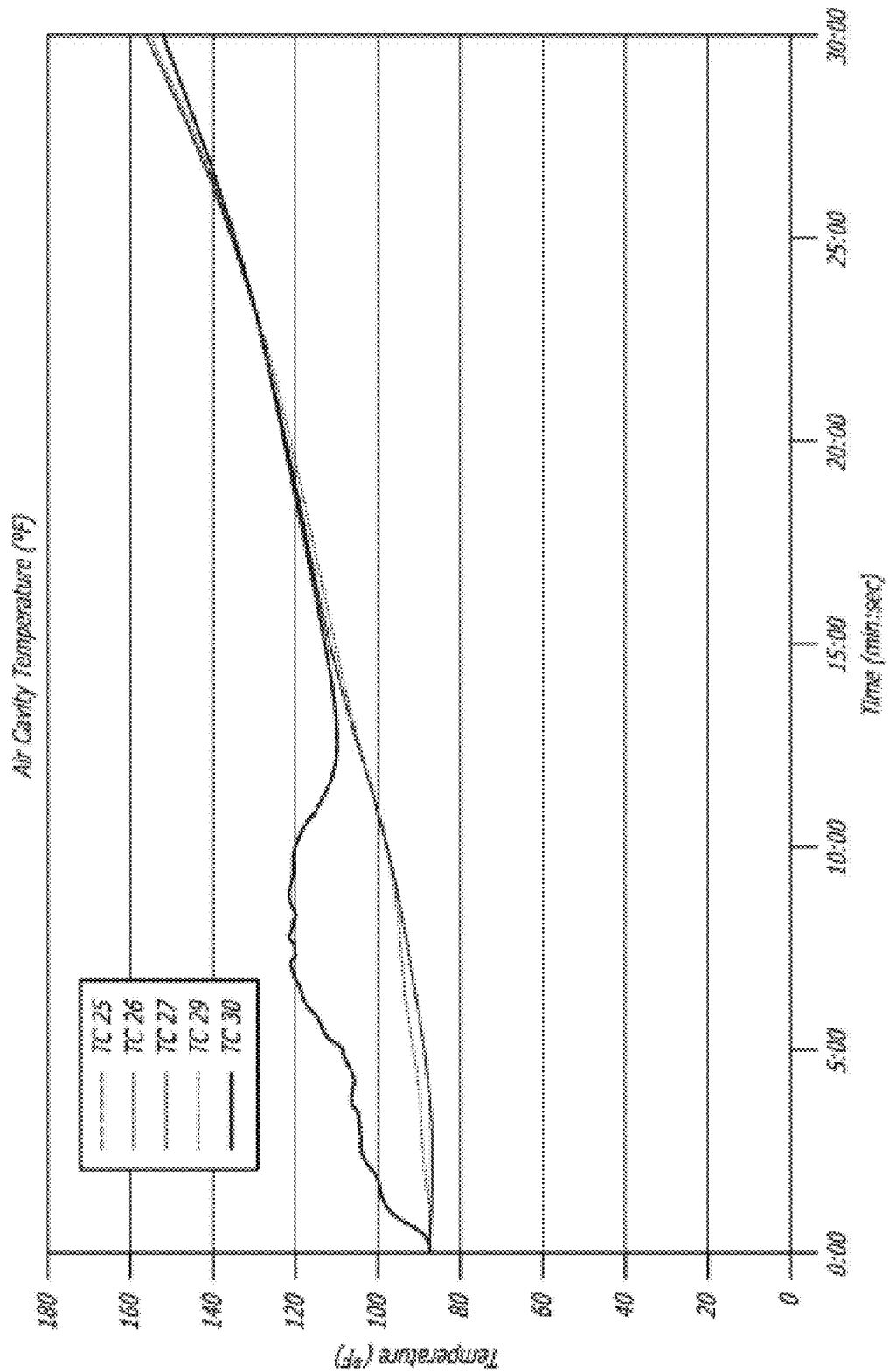
Figure 35:
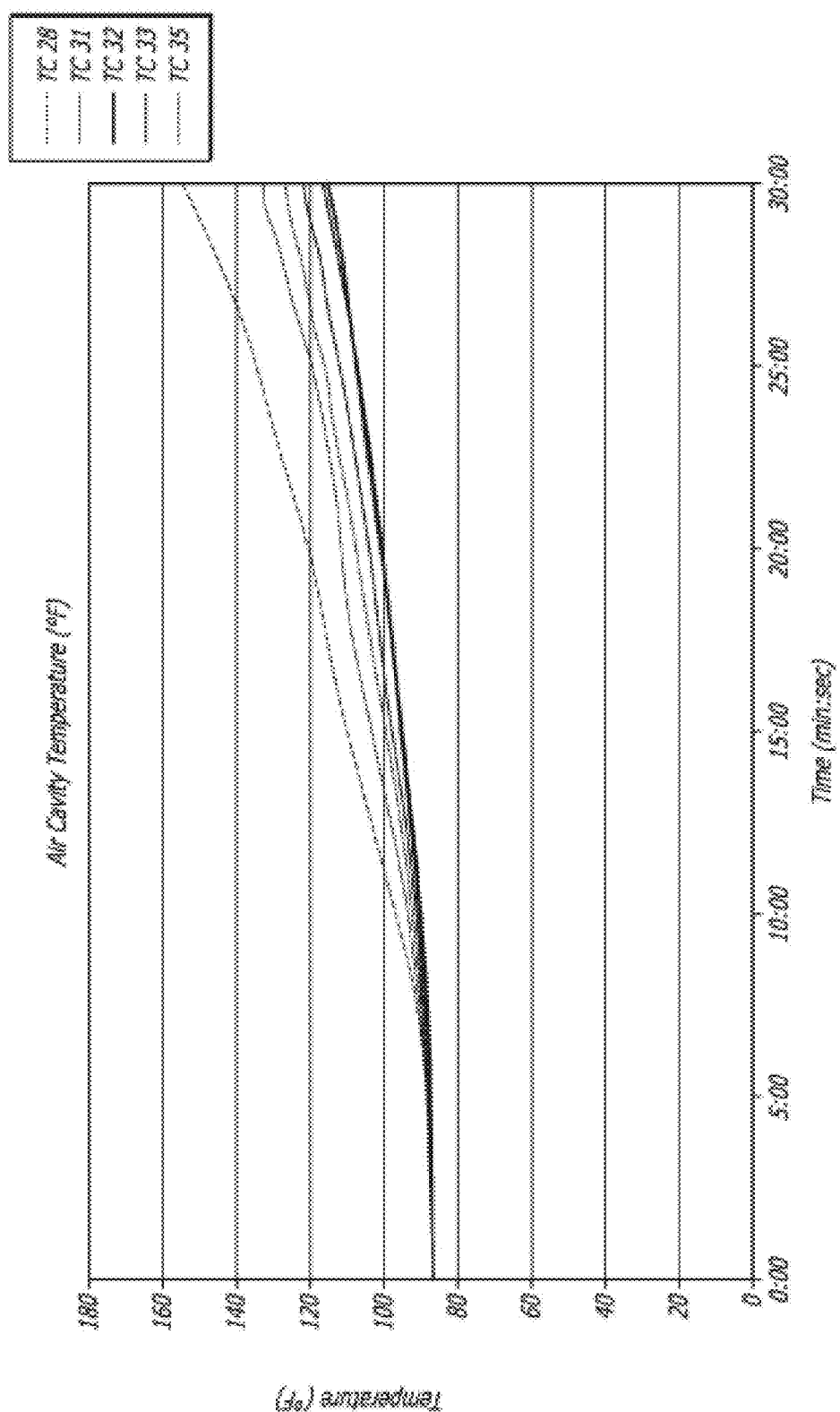
Figure 36:
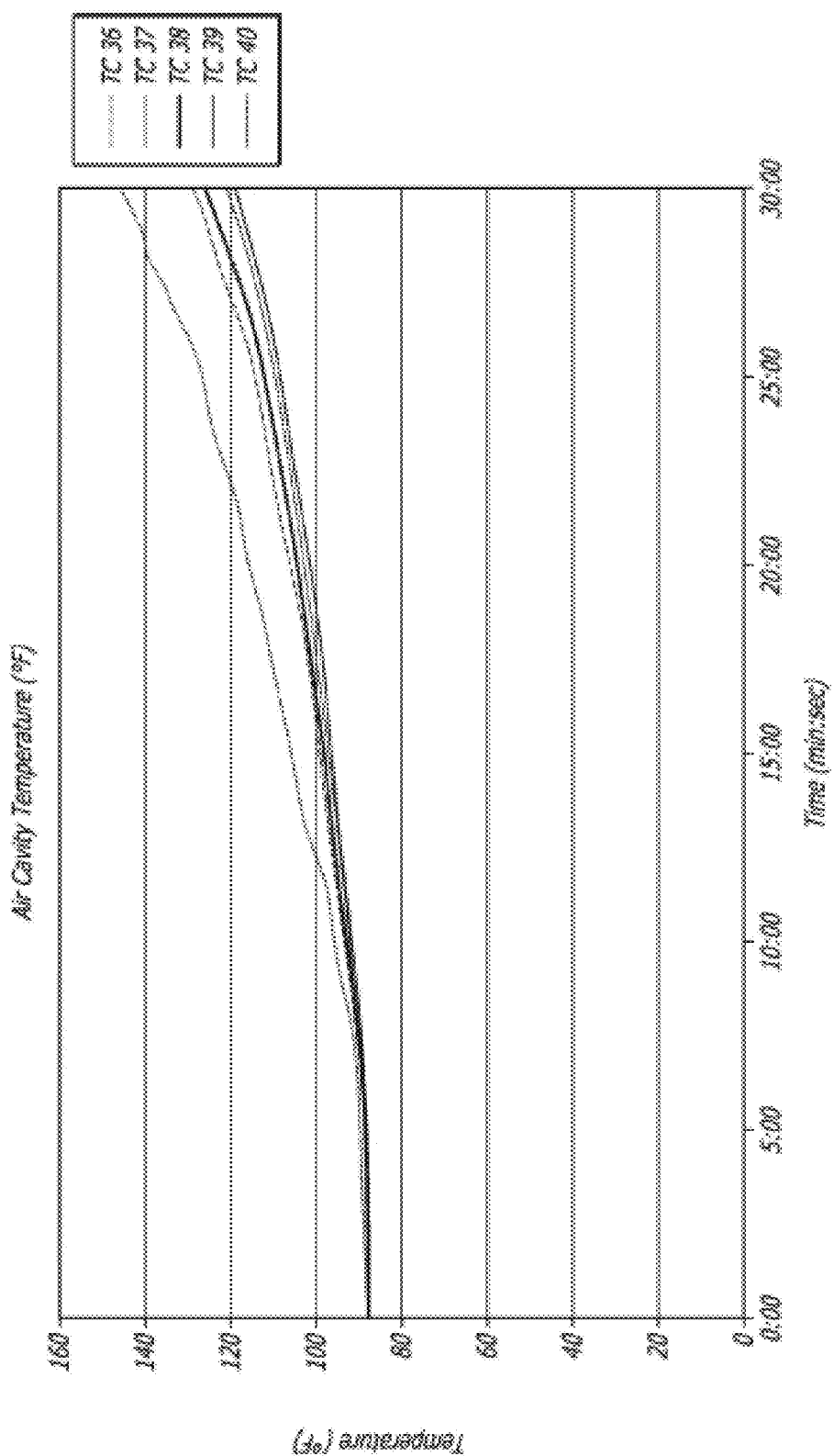
Figure 37:
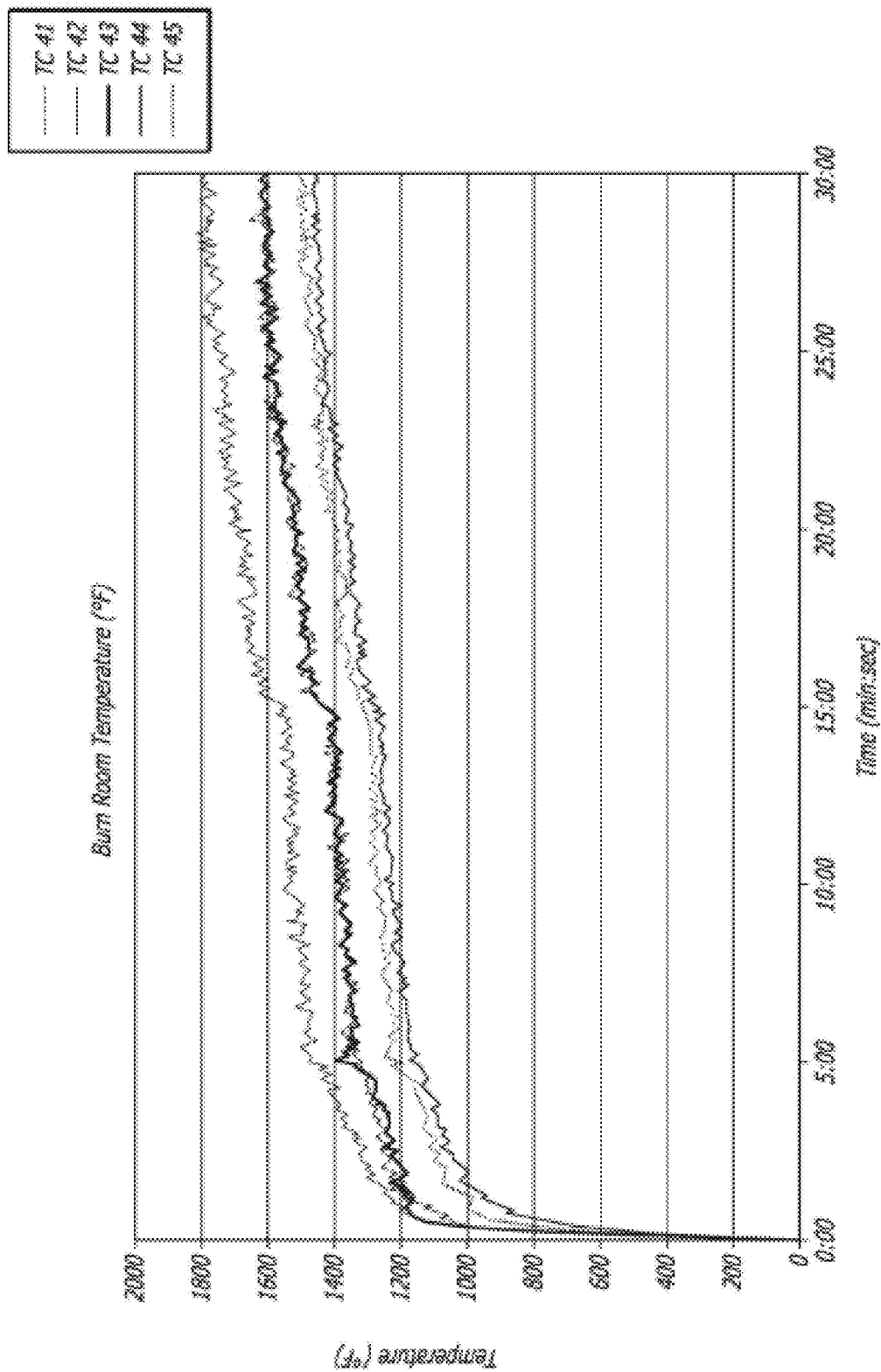
Figure 38:
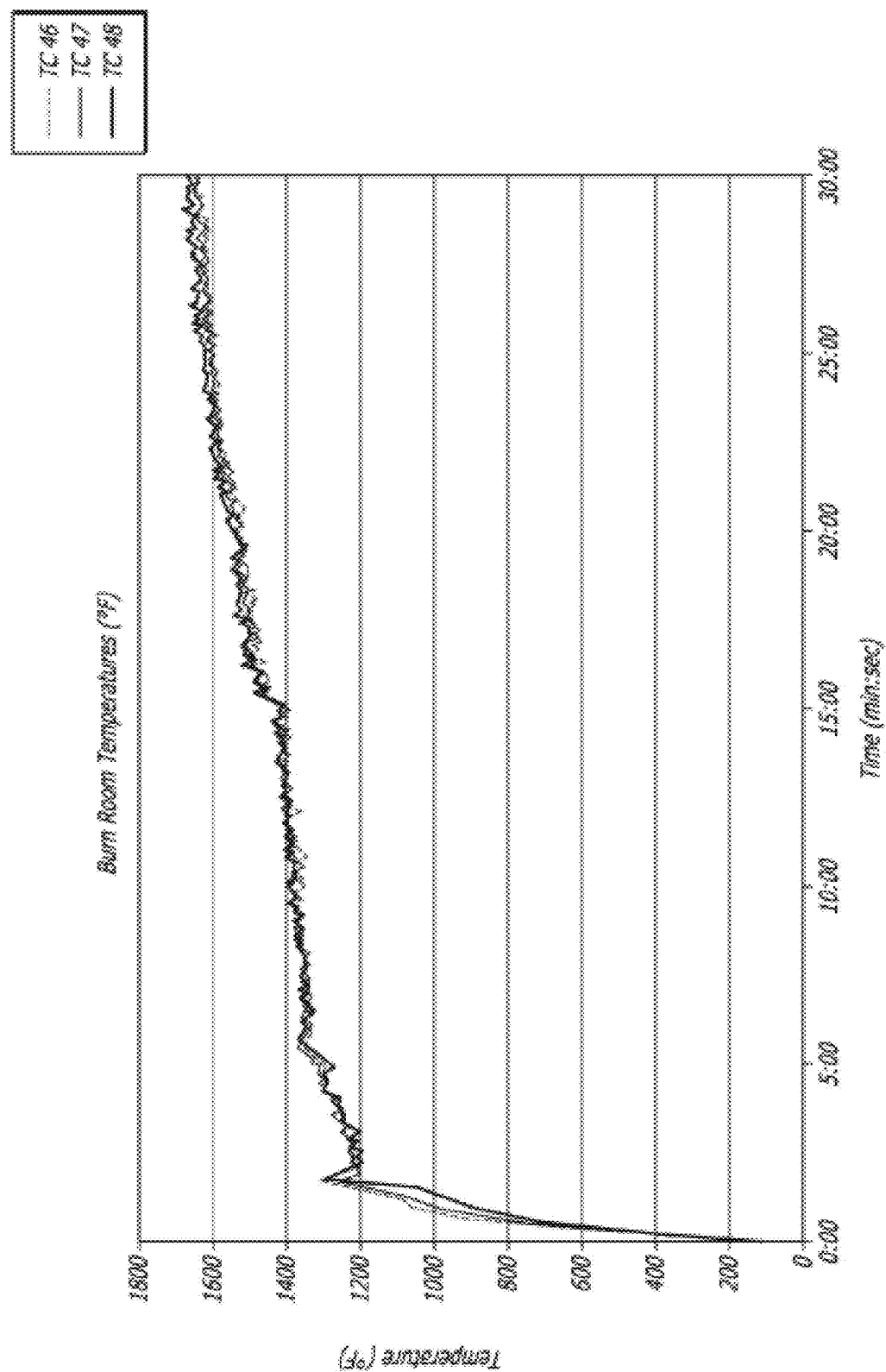
Figure 39:
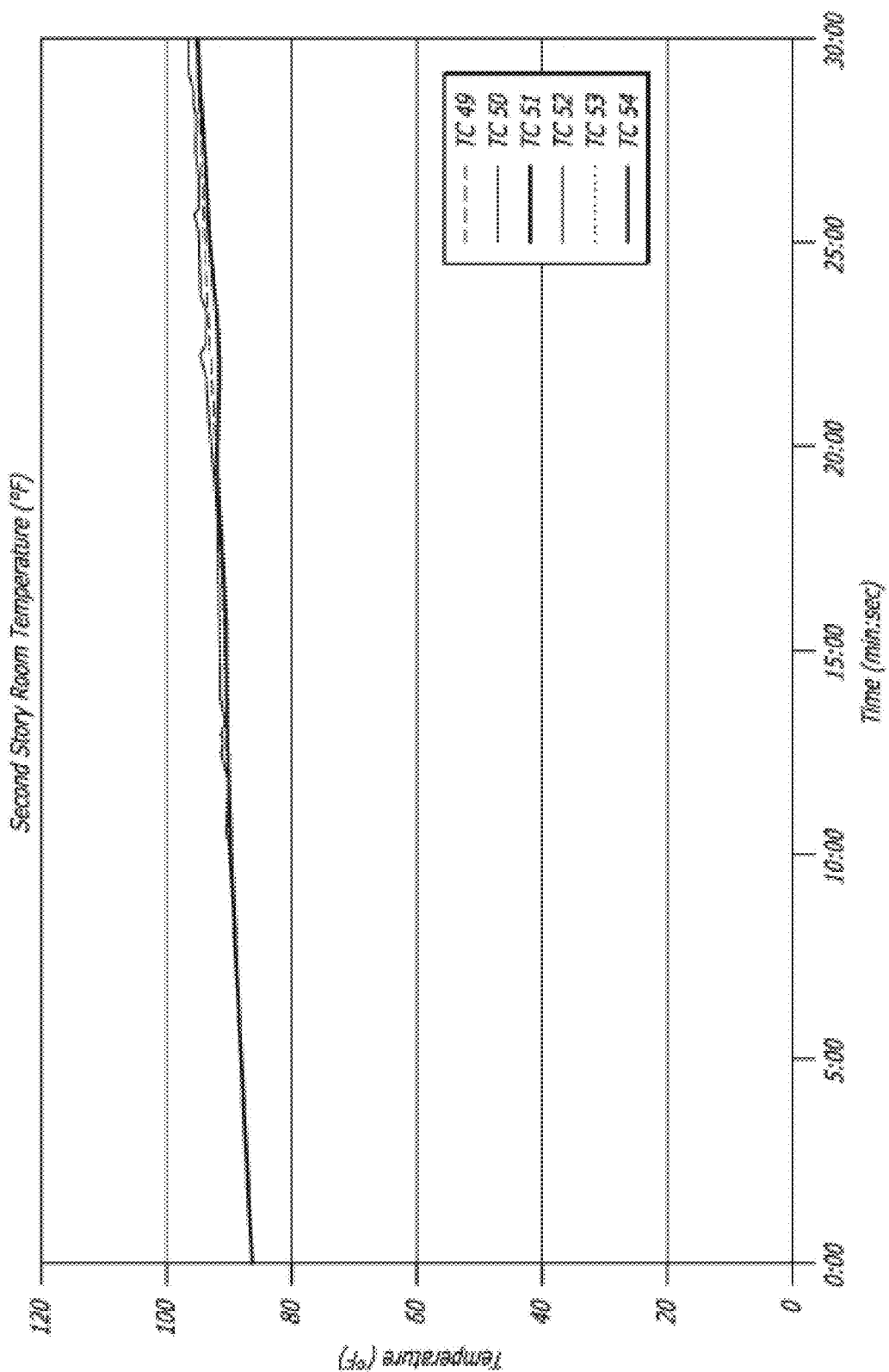
Figure 40:
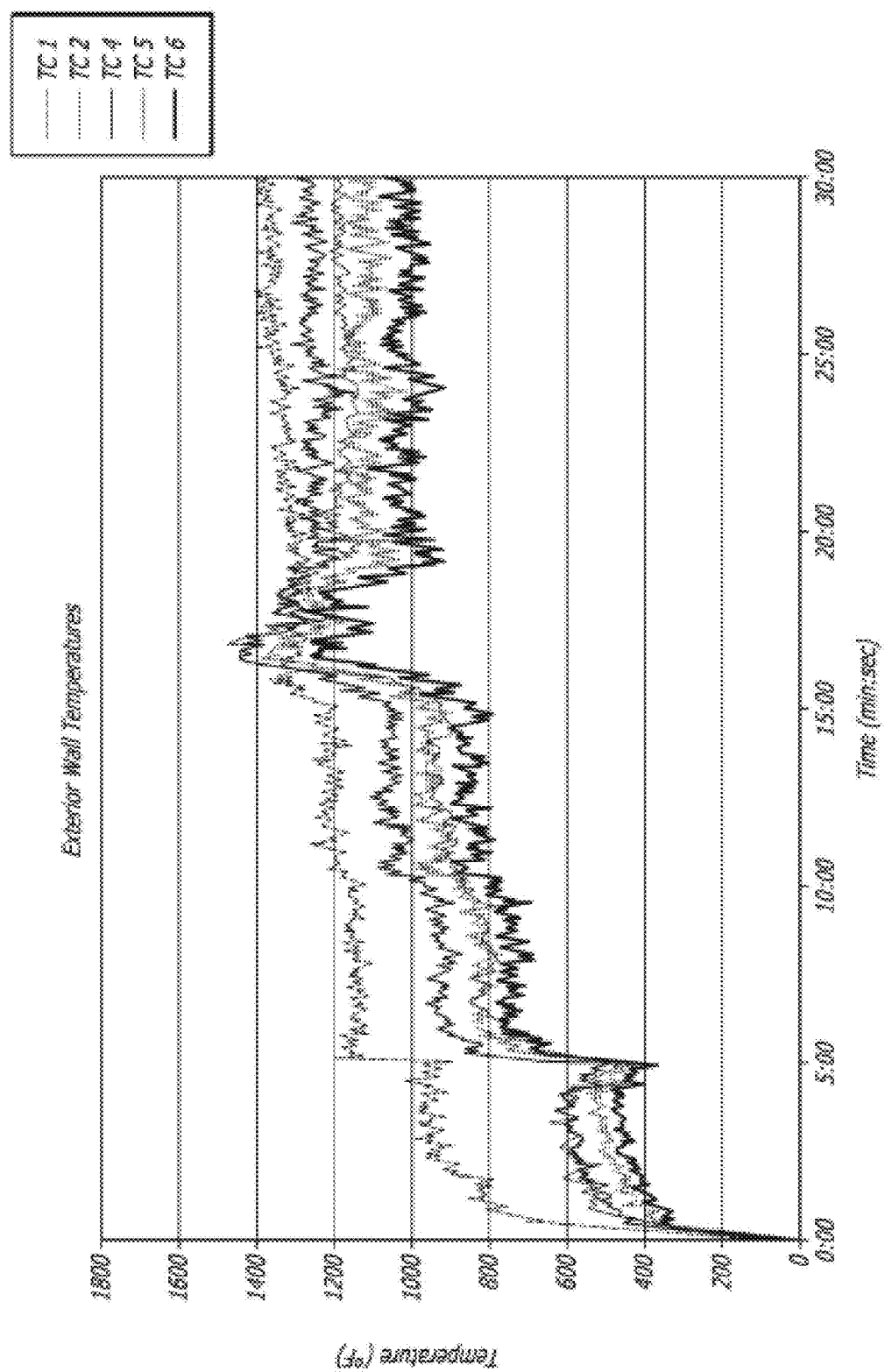
FIGS. 40-50 are line charts illustrating the temperature data per time for NFPA 285 Test 2.
Figure 41:
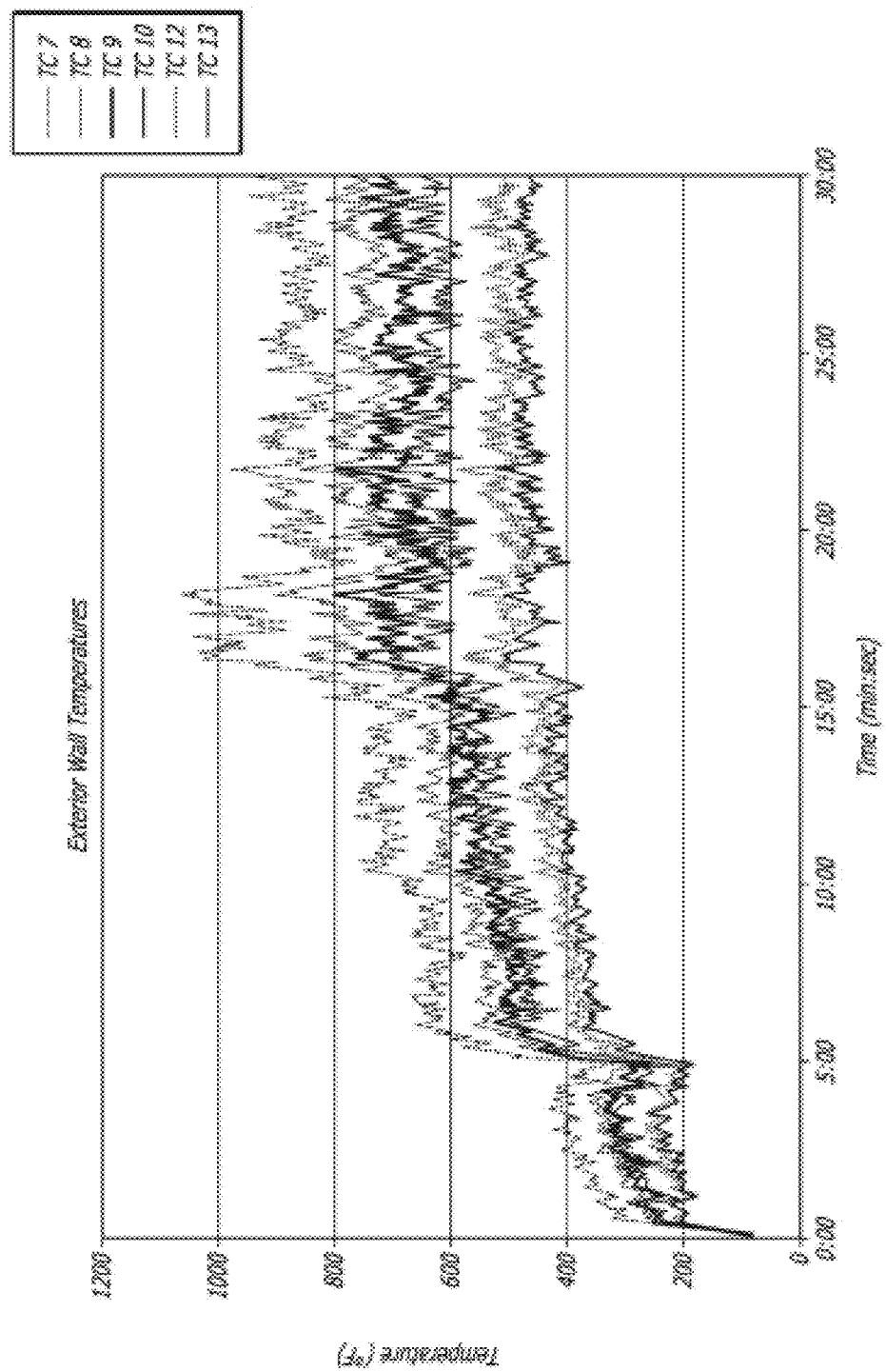
Figure 42:
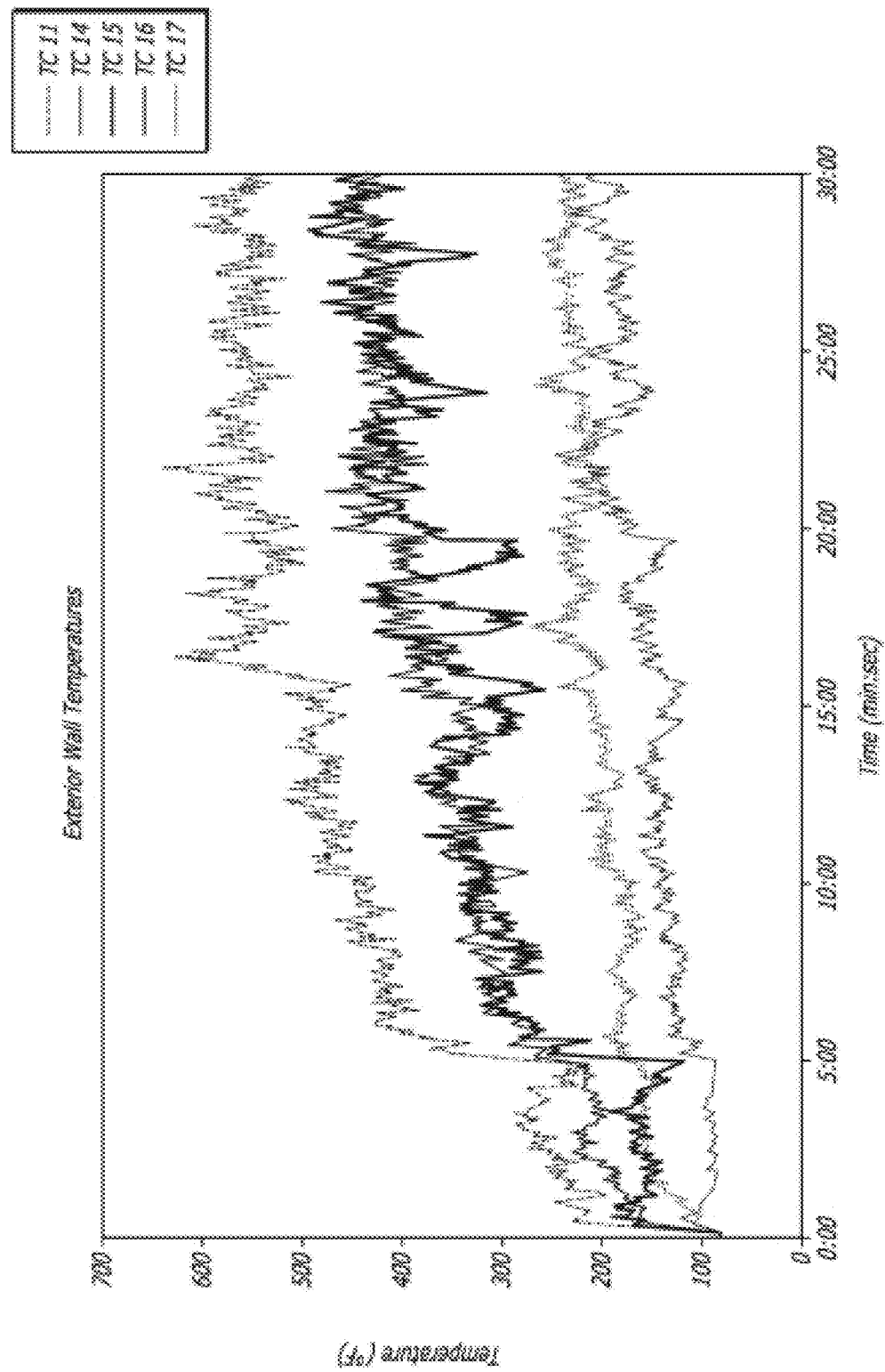
Figure 43:
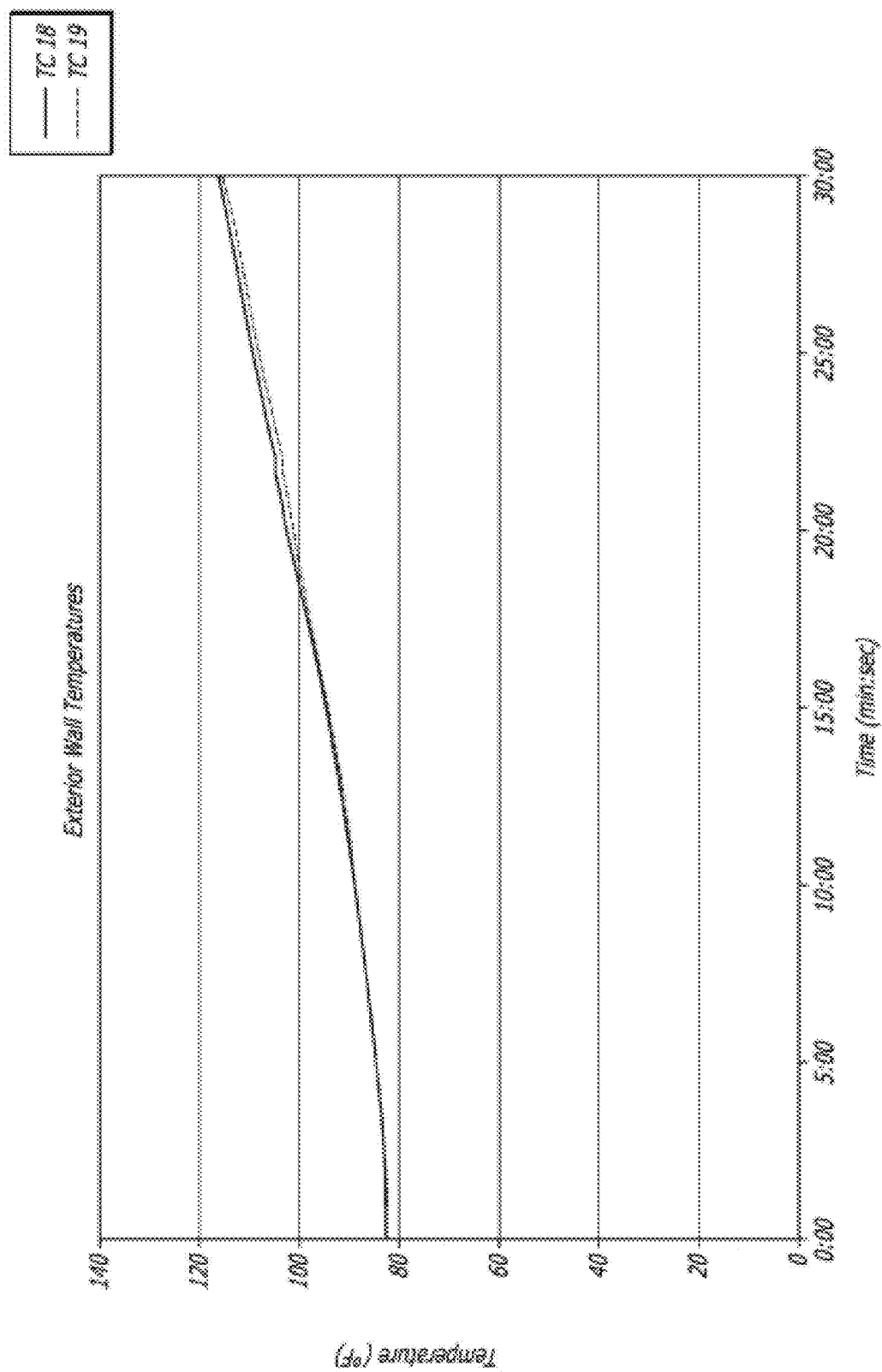
Figure 44:
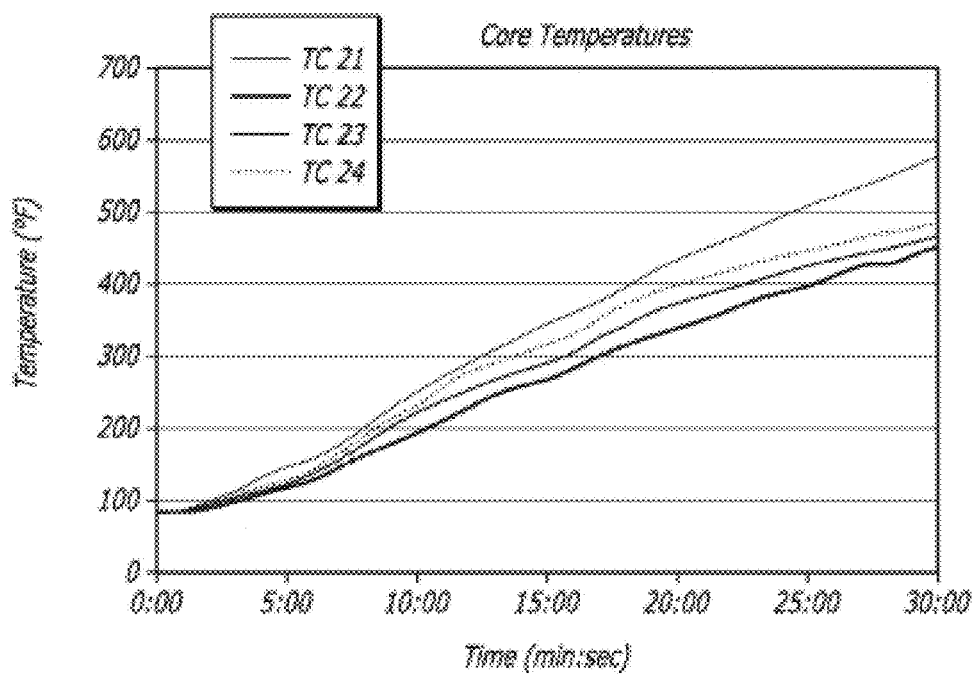
Figure 45:
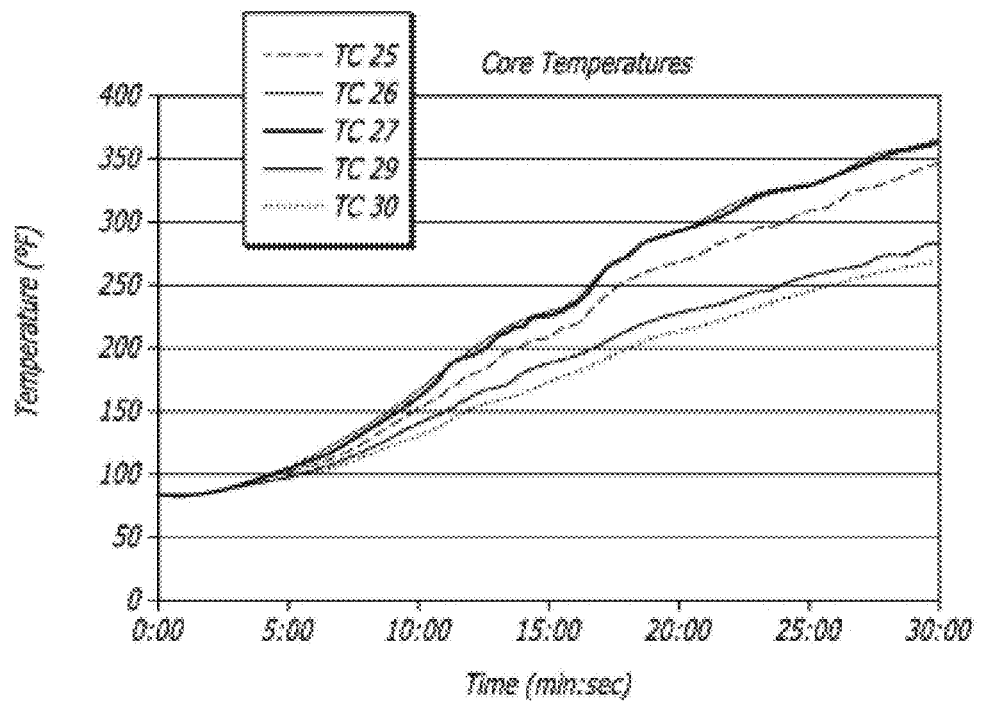
Figure 46:
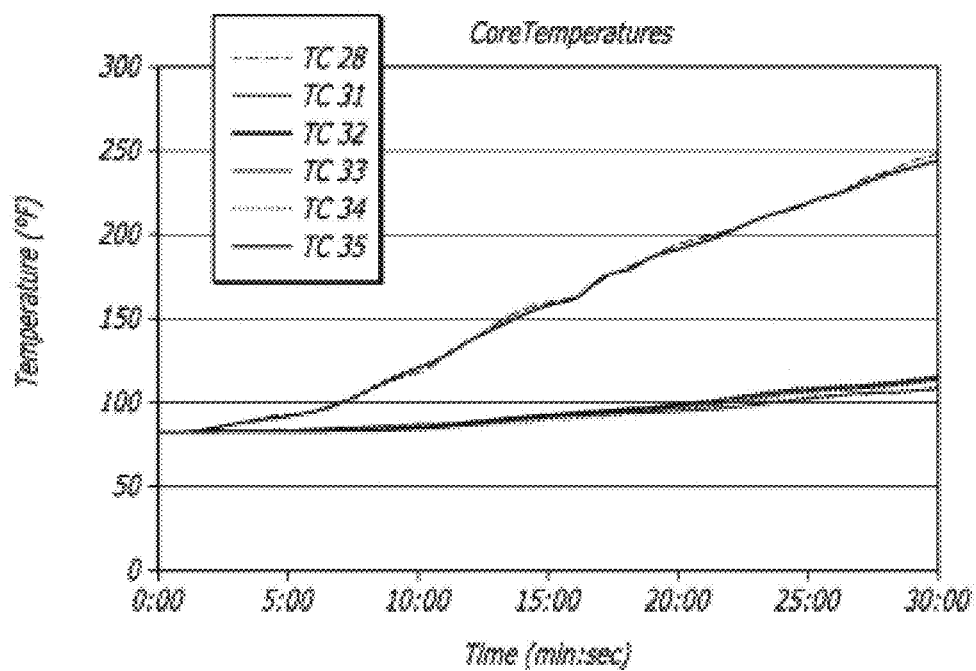
Figure 47:
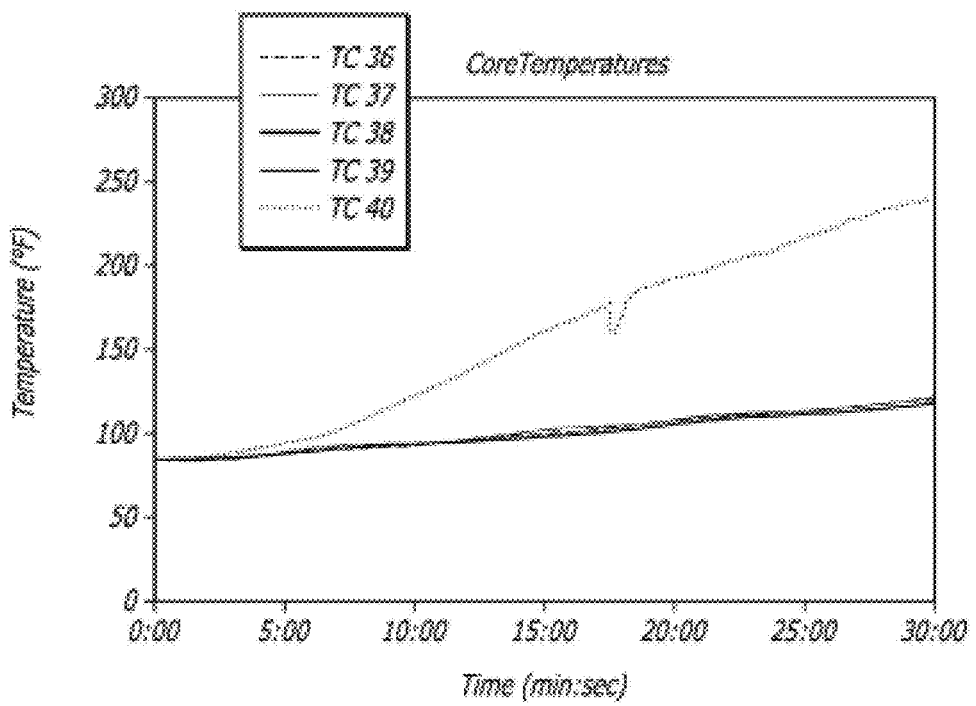
Figure 48:
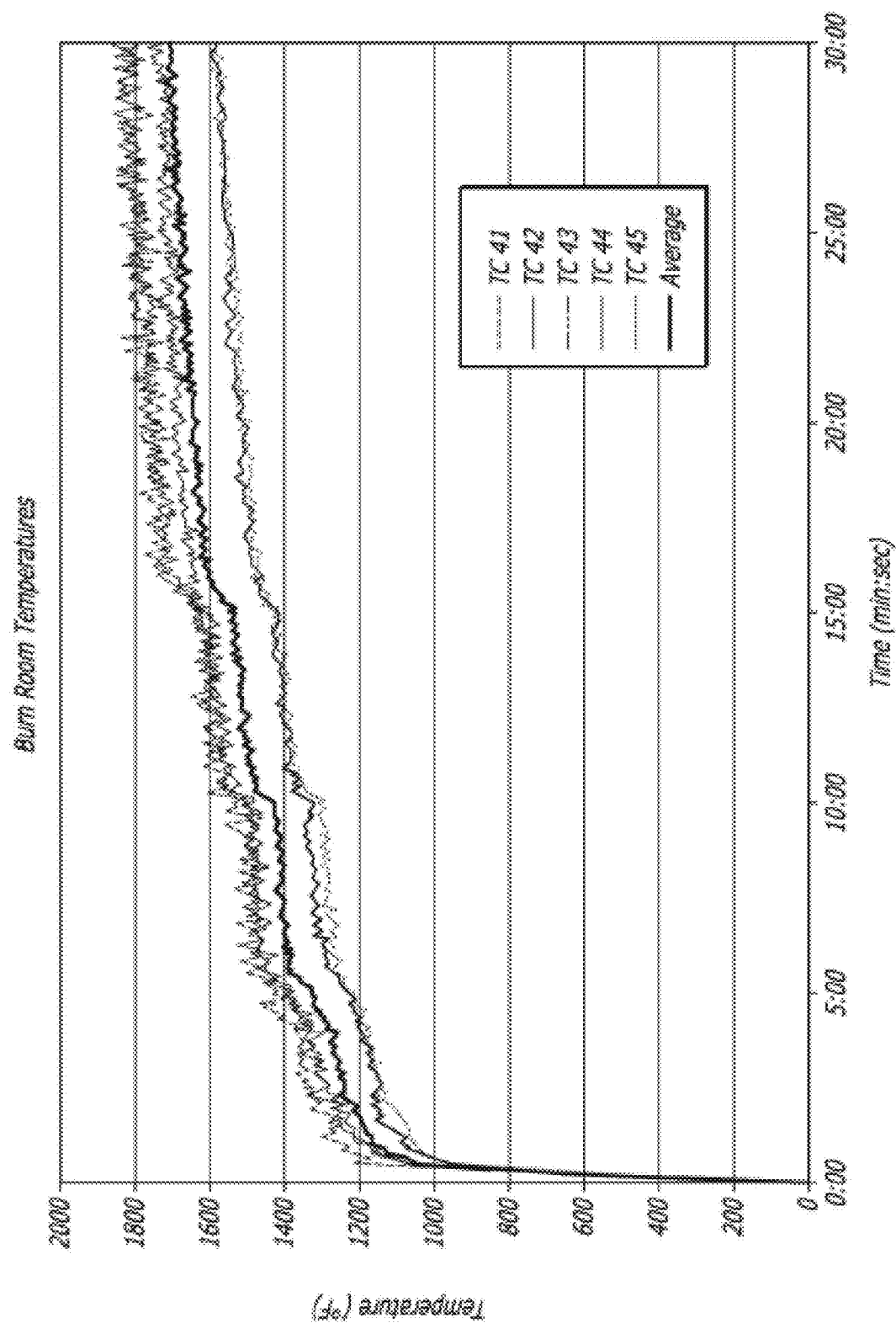
Figure 49:
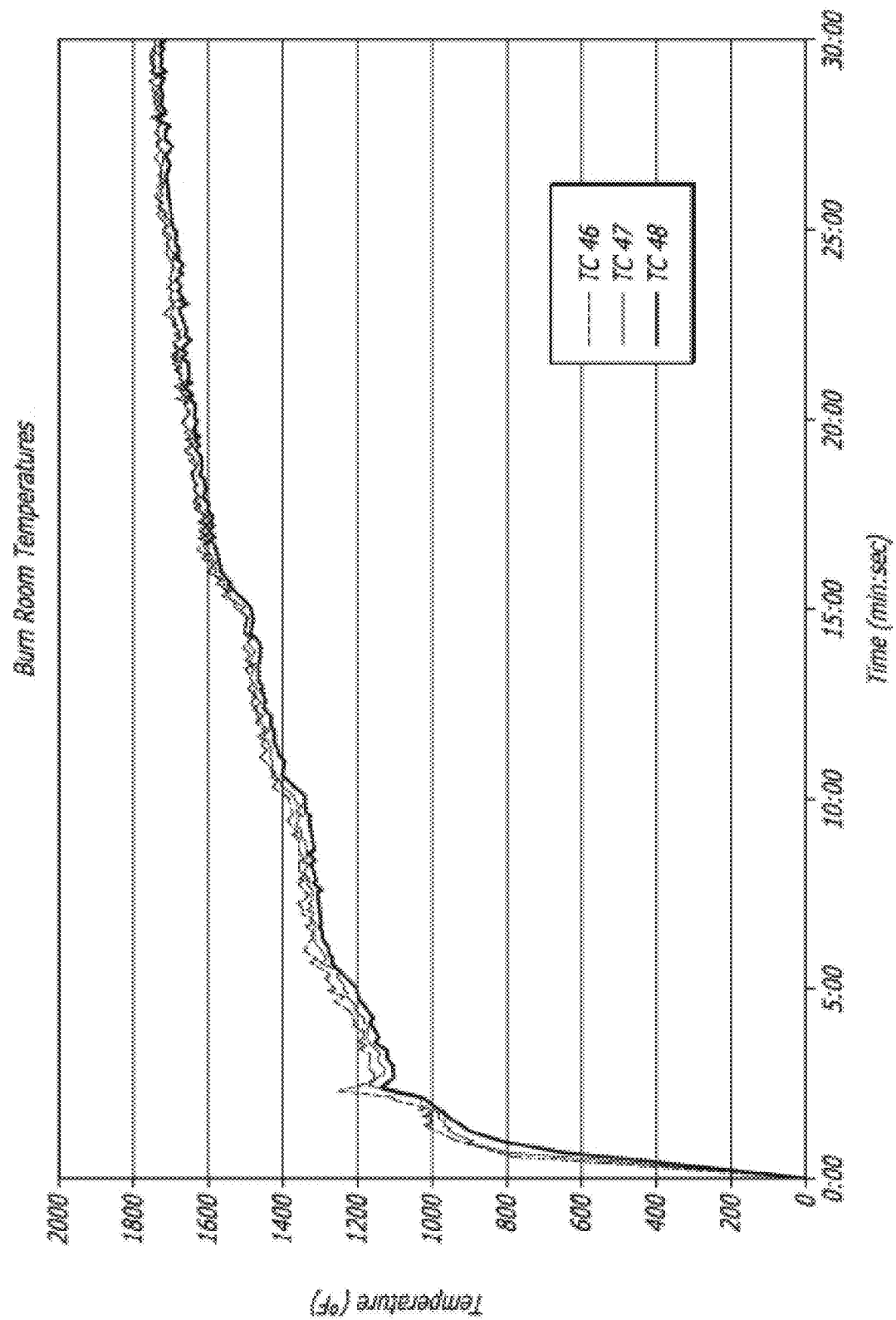
Figure 50:
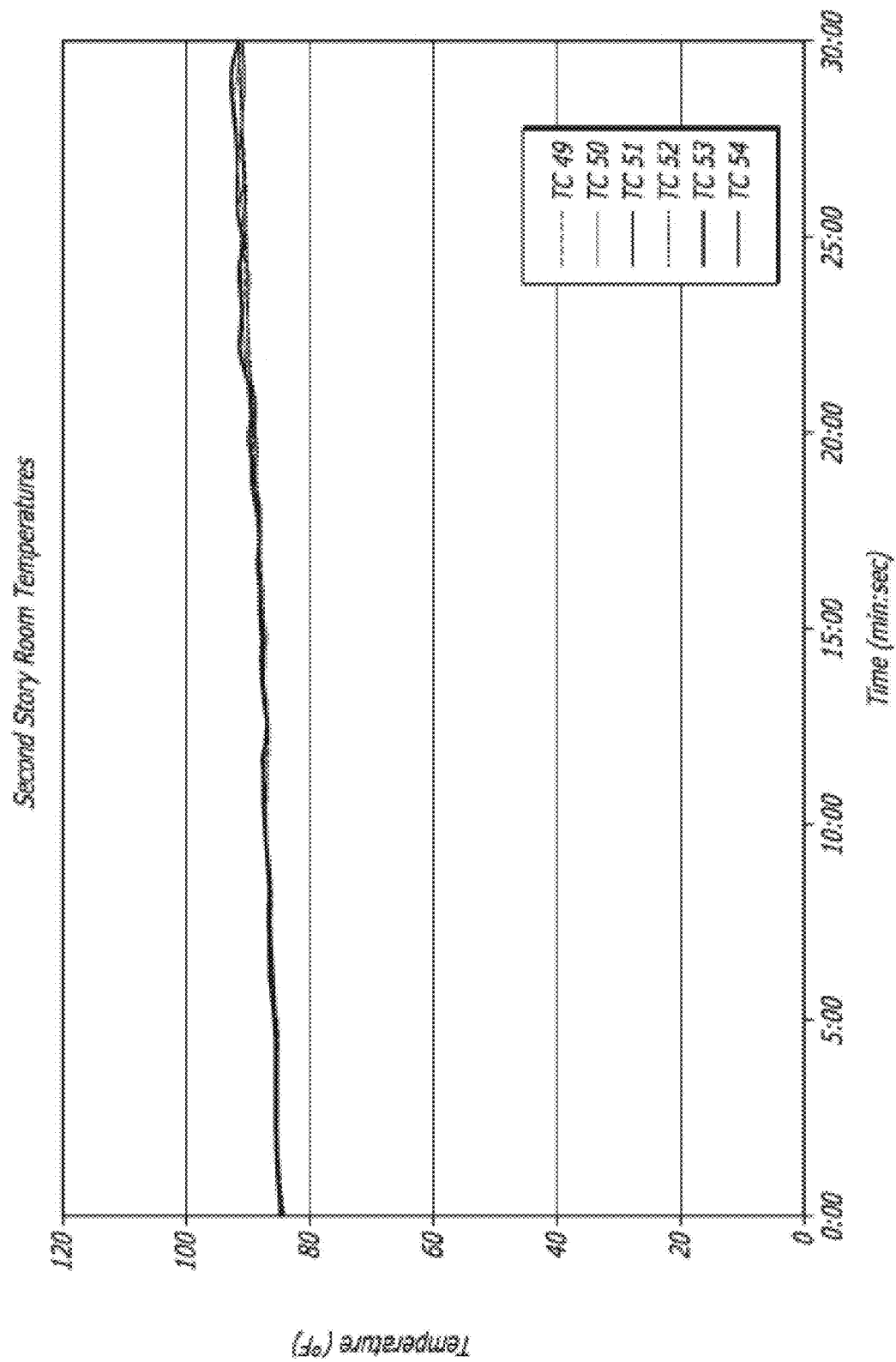

FIGS. 29-30 illustrate the temperature data per time for NFPA 285 Test 1.

NFPA 285 Test 2

The moldable fire-resistant composite panels were made according to Example 6. Each panel underwent the NFPA 285 testing. The moldable fire-resistant composite panels were a nominal 0.18-in. thick panel. The panels included preformed returns, integral aluminum perimeter framing. The panels were an off-white color and had a nominal density of 125 lb/ft3. The moldable fire-resistant composite panels consisted of ¼-in thick aluminum blades which connect to the interior perimeter of returns of the panel. A base wall assembly was first constructed, consisting of 20-ga, 3-⅝-in, C-channel steel studs framed such that a stud was located 8-in from each vertical edge of each prefabricated panel section and the intermediate studs were located between. The interior face of the wall was sheathed with ⅝-in Type "X" gypsum wallboard. The interior face gypsum joints were finished with 2-in tape and treated with joint compound compliant to ASTM C475, Standard Specification for Joint Compound and Joint Tape for Finishing Gypsum Board. The base wall assembly included 4-in thick, 4-pcf, mineral wool safing placed within the stud cavity at each floor line and was held in place by "Z" clips. The mineral wool insulation was installed in multiple layers to cover the full thickness of the flow line, which were nominally 8 in thick. No sheathing was installed on the exterior surface of the base wall framing.

Steel flashing (20-ga galvanized steel) was installed on the interior surface of the window opening such that it capped the interior sheetrock surface of the assembly and terminated 1-in short of the front face of the assembly. The overall assembly depth, including the sheetrock and base wall framing was nominally 22-in deep. The steel flashing on the interior window surfaces was attached only to the aluminum framing with a single row of fasteners spaced nominally 10-in on the center along the window opening header and sill and three screws equally spaced over the height of the jambs. The test wall assembly was built into a movable frame system that was installed and secured to the test apparatus.

The test conditions were recorded at an ambient temperature of 81.0° F. and a relative humidity of 72%. The airflow across the exterior face of the test assembly was less than 4 ft/s as determined by an anemometer placed at right angles to the exterior face. Visual observations made during the test appear in Tables 15 and 16. Flame propagation observations are based on sustained flames on the surface of the wall. Intermittent flaming above the sustained flames is not considered for estimating the extent of flame propagation.

TABLE 15

Test Observations of Front Wall

| Time | Observations of Front Wall |
|---|---|
| 0 | Start of test. |
| 2:30 | Light smoking from gap between window header flashing and bottom edge of panel above window opening. |
| 5:00 | Window burner applied to exterior of surface of wall assembly. |
| 7:11 | No visible discoloration to exterior of surface of wall assembly. |
| 10:00 | Light discoloration of panel exterior immediately above window header. |
| 13:00 | Blistering on exterior surface of panel in area of direct flame impingement. |
| 16:00 | Flame contribution from panel material beginning to take place. Flaming to approximately from 4 ft above window opening header. |

TABLE 15-continued

Test Observations of Front Wall

| Time | Observations of Front Wall |
|---|---|
| 17:30 | Flaming from panel material has subsided. Flaming from exterior of wall assembly appears to be from all from window burner. |
| 21:00 | Burning at window header has subsided. |
| 27:15 | Brief flashes of flame on horizontal joint between first and second panel above window opening. Flashes of flame are to the left of the centerline. |
| 30:00 | Test Terminated. |
| Post-Test | No residual flaming following extinguishment of test burners. |

TABLE 16

Test Observations of Second-Floor Room

| Time | Observations of Front Wall |
|---|---|
| 0 | Start of test. Visibility in observation room 100%. |
| 10:00 | No smoking present in observation room. Visibility remains 100%. |
| 20:00 | No smoking present in observation room. Visibility remains 100%. |
| 27:00 | Minimal amount of smoke in observation room. Visibility is 95%. |
| 30:00 | Test Terminated. No flaming present in observation room at any point during |

Flame Propagation, Exterior Face of Wall Assembly (1). TCs 11 and 14-17 did not exceed 1000° F. at any time during the test; (2). Flames emitting from the surface of the exterior face did not reach a vertical elevation of 10 ft above the top of the window opening at any time during the test; and (3). Flames emitting from the surface of the exterior face did not reach a lateral distance of 5 ft from the vertical centerline of the window opening any time during the test.

Flame Propagation, Core Components

The temperatures in the air cavity behind the panels as measured by TCs 28 and 31-40 did not exceed 1000° F. at any time during the test.

Flame Propagation, Beyond First-Story Test Room

Flames did not occur over the surface of the exterior face beyond the concrete block walls or beyond the intersection of the test wall assembly and the concrete block fixture walls. (2). Lateral temperatures of the air cavity, as measured by TCs 18 and 19, did not exceed 1000 OF at any time during the test.

Temperatures in Second-Story Test Room

Temperatures 1 in. from the interior surface of the wall assembly within the second floor test room, as measured by TCs 49-54, did not exceed 500° F. above the ambient temperature at any time during the test.

Flames in Second-Story Test Room

Review of the pertinent TC data, second-floor videotape, and post-test inspection indicated that flame propagation did not occur in the second floor at any time during the test. The panels met acceptance criteria as stated in the NFPA 285 Standard.

FIGS. 40-50 illustrate the temperature data per time for NFPA 285 Test 2.

Example embodiments have been described hereinabove regarding moldable fire-resistant composite and processes for manufacturing moldable fire-resistant composite. Various modifications to and departures from the disclosed example embodiments will occur to those having ordinary skill in the art. The subject matter that is intended to be within the spirit of this disclosure is set forth in the following claims.

Additional illustrative examples of the disclosure include:

Aspect 1: A fiber-reinforced plastic (FRP) panel including: an inner core material having a perimeter and forming at least one core channel that extends around the perimeter and inward a predetermined depth from the perimeter toward a center of the FRP panel; a first outer wall coupled to a first side of the inner core material; a second outer wall coupled to a second side of the inner core material opposite the first outer wall; and at least one elastic member received within the at least one core channel, the at least one elastic member forming a recess that extends along a top surface of the at least one elastic member and extends inward from the top surface toward a bottom surface of the at least one core channel.

Aspect 2: The FRP panel of aspect 1, wherein the inner core material is an insulating material.

Aspect 3: The FRP panel of aspect 1, wherein the first outer wall and/or the second outer wall comprise gypsum.

Aspect 4: The FRP panel of aspect 1, wherein the first outer wall and/or the second outer wall comprise FRP.

Aspect 5: The FRP panel of aspect 1, wherein the at least one core channel extends a predetermined distance inward from the perimeter toward the center of the inner core material.

Aspect 6: The FRP panel of aspect 1, wherein the at least one core channel extends 1-3 inches inward from the perimeter toward the center of the inner core material.

Aspect 7: The FRP panel of aspect 1, wherein the at least one core channel extends around an entirety of the perimeter of the inner core material.

Aspect 8: The FRP panel of aspect 1, wherein the at least one elastic member includes at least one rubber gasket.

Aspect 9: The FRP panel of aspect 1, wherein the at least one elastic member has sufficient elasticity to form a weatherproof seal when a joining member is inserted therein, while allowing the joining member to shift position within the recess of the at least one elastic member.

Aspect 10: The FRP panel of aspect 1, wherein the recess formed by the at least one elastic member extends inward 1 to 3 inches from the top surface of the at least one elastic member toward the center of the FRP panel.

Aspect 11: The FRP panel of aspect 1, further comprising a frame disposed between the inner core material and the at least one elastic member, wherein an interior surface of the frame is configured to be received within the at least one core channel and an exterior surface of the frame forms at least one frame channel configured to receive the at least one elastic member.

Aspect 12: The FRP panel of aspect 11, wherein at least a portion of the interior surface of the frame is spaced apart from the bottom surface of the at least one core channel.

Aspect 13: The FRP panel of aspect 11, wherein the frame includes a first outer edge that extends between the first outer wall and the inner core material and a second outer edge that extends between the second outer wall and the inner core material to seal the perimeter of the inner core material.

Aspect 14: The FRP panel of aspect 11, wherein the first outer wall, the second outer wall, or the frame, or a combination thereof comprise FRP.

Aspect 15: A curtain wall system comprising: a plurality of adjacent panels, each of the plurality of adjacent panels including (i) an inner core material having a perimeter and forming at least one core channel that extends around the perimeter and extends inward from the perimeter toward a center of the inner core material, (ii) a first outer wall coupled to a first side of the inner core material, (iii) a second outer wall coupled to a second side of the inner core material opposite the first outer wall, and (iv) at least one elastic member received within the at least one core channel, the elastic member forming a recess that extends along a top surface of the elastic member and extends inwardly from the top surface of the at least one elastic member toward a bottom surface of the at least one core channel; and at least one joining member that is configured to be received in the recess of the at least one elastic member of at least two of the plurality of adjacent panels to couple the at least two of the plurality of adjacent panels.

Aspect 16: The curtain wall system of aspect 15, wherein the inner core material of each of the plurality of panels adjacent is an insulating material.

Aspect 17: The curtain wall system of aspect 15, wherein the first outer wall and/or the second outer wall comprise gypsum.

Aspect 18: The curtain wall system of aspect 15, wherein the first outer wall and/or the second outer wall of each of the plurality of adjacent panels comprise FRP.

Aspect 19: The curtain wall system of aspect 15, wherein the channel of each of the plurality of adjacent panels extends 1 to 3 inches inward from the perimeter toward the center of the inner core material.

Aspect 20: The curtain wall system of aspect 15, wherein the at least one elastic member of each of the plurality of adjacent panels has sufficient elasticity to form a weatherproof seal when the at least one joining member is inserted therein, while allowing the at least one joining member to shift position within the recess of the at least one elastic member.

Aspect 21: The curtain wall system of aspect 15, wherein the recess formed by the at least one elastic member of each of the plurality of adjacent panels extends 1 to 3 inches inward from the top surface of the at least one elastic member toward the bottom surface of the at least one core channel.

Aspect 22: The curtain wall system of aspect 15, wherein the at least one joining member includes: a plurality of long joining members, each of the plurality of long joining members configured to be received in the recess of the at least one elastic member of two of the plurality of adjacent panels; and at least one short joining member configured to be received in the recess of the at least one elastic member of at least four of the plurality of adjacent panels at a corner of each of the at least four of the plurality of adjacent panels.

Aspect 21: The curtain wall system of aspect 15, wherein the at least one joining member includes: a plurality of rectangular joining members, each of the plurality of rectangular joining members configured to be received in the recess of the at least one elastic member of two of the plurality of adjacent panels; and at least one L-shaped joining member configured to be received within the recess of the at least one elastic member of at least four of the plurality of adjacent panels.

Aspect 24: The curtain wall system of aspect 15, wherein the at least one joining member is sized such that, when the at least one joining member is received in the recess of the at least one elastic member of two of the plurality of adjacent panels, a first edge portion of the at least one joining member is received in the recess of a first one of the two of the plurality of adjacent panels, a second edge portion of the at least one joining member is received in the recess of a second one of the two of the plurality of adjacent panels, and a middle portion of the at least one joining member extends across a gap between the two of the plurality of adjacent panels.

Aspect 25: The curtain wall system of aspect 24, further comprising sealant or caulking disposed within the gap.

Aspect 26: The curtain wall system of aspect 15, wherein: the at least one channel of each of the plurality of adjacent panels includes a first channel that extends around the perimeter of the core and a second channel that extends around the perimeter of the core parallel to the first channel, wherein each of the first channel and the second channel and extend inward from the perimeter toward the center of the inner core material; and the at least one elastic member of each of the plurality of panels includes a first elastic member received within the first channel and a second elastic member received within the second channel, wherein the first elastic member forms a first recess extending inward from the perimeter toward a bottom surface of the first channel, and wherein the second elastic member forms a second recess extending inward from the perimeter toward a bottom surface of the second channel.

Aspect 27: The curtain wall system of aspect 26, wherein the at least one joining member includes a first joining member and a second joining member, wherein the first joining member is configured to be received within the first recess of two of the plurality of adjacent panels to couple the two of the plurality of adjacent panels, and wherein the second joining member is configured to be received in the second recess of the two of the plurality of adjacent panels to join the two of the plurality of adjacent panels.

Aspect 28: The curtain wall system of aspect 15, wherein each one of the plurality of adjacent panels further comprises a frame disposed between the inner core material and the at least one elastic member, wherein an interior surface of the frame is configured to be received within the at least one core channel and an exterior surface of the frame forms at least one frame channel configured to receive the at least one elastic member.

Aspect 29: The curtain wall system of aspect 28, wherein at least a portion of the interior surface of the frame of each one of the plurality of adjacent panels is spaced apart from the bottom surface of the channel.

Aspect 30: The curtain wall system of aspect 28, wherein the frame of each one of the plurality of adjacent panels includes a first outer edge that extends between the first outer wall and the inner core material and a second outer edge that extends between the second outer wall and the inner core material to provide a weatherproof seal along the perimeter.

Aspect 31: The curtain wall system of aspect 28, wherein the first outer wall, the second outer wall, or the frame, or a combination thereof, of each of the plurality of adjacent panels comprise FRP.

Aspect 32: A method for assembling a curtain wall system, the method comprising: inserting a first edge of a first joining member into a portion of a first receiving member on a right side of a first panel, the first receiving member extending around a perimeter of the first panel; joining a second panel to the first panel by inserting a second edge of the first joining member into a portion of a second receiving member on a left side of the second panel, the second receiving member extending around a perimeter of the second panel; inserting a first edge of a second joining member into a portion of the first receiving member on a top side of the first panel; joining a third panel to the first panel by inserting a second edge of the second joining member into a portion of a third receiving member on a bottom side of the third panel, the third receiving member extending around a perimeter of the third panel; inserting a first edge of a third joining member into a portion of the second receiving member on a top side of the second panel; joining a fourth panel to the second panel by inserting a second edge of the third joining member into a portion of a fourth receiving member on a bottom side of the fourth panel, the fourth receiving member extending around a perimeter of the fourth panel; inserting a first edge of a fourth joining member into a portion of the third receiving member on a right side of the third panel; and joining the fourth panel to the third panel by inserting a second edge of the fourth joining member into a portion of the fourth receiving member on a left side of the fourth panel.

Aspect 33: The method of aspect 32, further comprising: inserting a first portion of a fifth joining member into a portion of the first receiving member at a first corner of the first panel where the top side and the right side of the first panel meet; inserting a second portion of the fifth joining member into a portion of the second receiving member at a second corner of the second panel where the left side and top side of the second panel meet; inserting a third portion of the fifth joining member into a portion of the third receiving member at a third corner of the third panel where the bottom side and the right side of the third panel meet; and inserting a fourth portion of the fifth joining member into a portion of the fourth receiving member at a fourth corner of the fourth panel where the left side and the bottom side of the fourth panel meet.

What is claimed is:

1. A fiber-reinforced plastic (FRP) panel comprising:
an inner core material having a perimeter and forming at least one core channel that extends around the perimeter and inward a predetermined depth from the perimeter toward a center of the FRP panel;
a first outer wall coupled to a first side of the inner core material;
a second outer wall coupled to a second side of the inner core material opposite the first outer wall;
at least one elastic member received within the at least one core channel; and
a frame disposed between the inner core material and the at least one elastic member,
wherein an interior surface of the frame is configured to be received within the at least one core channel and an exterior surface of the frame forms at least one frame channel configured to receive the at least one elastic member,
wherein the frame comprises a first outer edge that extends between the first outer wall and the inner core material and a second outer edge that extends between the second outer wall and the inner core material to seal the perimeter of the inner core material,
wherein the at least one elastic member forms a recess extending along a top surface of the elastic member and extends inwardly from the top surface of the at least one elastic member toward a bottom surface of the at least one frame channel until contacting the bottom surface of the at least one frame channel,
wherein the recess of the at least one elastic member is configured to receive a joining member for joining to another FRP panel.

2. The FRP panel of claim 1, wherein the inner core material is an insulating material.

3. The FRP panel of claim 1, wherein the first outer wall and/or the second outer wall comprise gypsum.

4. The FRP panel of claim 1, wherein the first outer wall and/or the second outer wall comprise FRP.

5. The FRP panel of claim 1, wherein the at least one core channel extends a predetermined distance inward from the perimeter toward the center of the inner core material.

6. The FRP panel of claim 1, wherein the at least one core channel extends 1-3 inches inward from the perimeter toward the center of the inner core material.

7. The FRP panel of claim 1, wherein the at least one core channel extends around an entirety of the perimeter of the inner core material.

8. The FRP panel of claim 1, wherein the at least one elastic member includes at least one rubber gasket.

9. The FRP panel of claim 1, wherein the at least one elastic member has sufficient elasticity to form a weatherproof seal when the joining member is inserted therein, while allowing the joining member to shift position within the recess of the at least one elastic member.

10. The FRP panel of claim 1, wherein the recess formed by the at least one elastic member extends inward 1 to 3 inches from the top surface of the at least one elastic member toward the center of the FRP panel.

11. The FRP panel of claim 1, wherein at least a portion of the interior surface of the frame is spaced apart from the bottom surface of the at least one core channel.

12. The FRP panel of claim 1, wherein the first outer wall, the second outer wall, or the frame, or a combination thereof comprise FRP.

13. A fiber-reinforced plastic (FRP) panel comprising:
an inner core material having a perimeter and forming at least one core channel that extends around the perimeter and inward a predetermined depth from the perimeter toward a center of the FRP panel;
a first outer wall coupled to a first side of the inner core material;
a second outer wall coupled to a second side of the inner core material opposite the first outer wall;
at least one elastic member received within the at least one core channel; and
a frame disposed between the inner core material and the at least one elastic member,
wherein an interior surface of the frame is configured to be received within the at least one core channel and an exterior surface of the frame forms at least one frame channel configured to receive the at least one elastic member, wherein at least a portion of the interior surface of the frame is spaced apart from the bottom surface of the at least one core channel,
wherein the at least one elastic member forms a recess extending along a top surface of the elastic member and extends inwardly from the top surface of the at least one elastic member toward a bottom surface of the at least one frame channel until contacting the bottom surface of the at least one frame channel,
wherein the recess of the at least one elastic member is configured to receive a joining member for joining to another FRP panel.

14. The FRP panel of claim 13, wherein the frame comprises a first outer edge that extends between the first outer wall and the inner core material and a second outer edge that extends between the second outer wall and the inner core material to seal the perimeter of the inner core material.

15. The FRP panel of claim 13, wherein the first outer wall, the second outer wall, or the frame, or a combination thereof comprise FRP.

16. The FRP panel of claim 13, wherein the at least one elastic member has sufficient elasticity to form a weatherproof seal when the joining member is inserted therein, while allowing the joining member to shift position within the recess of the at least one elastic member.

17. The FRP panel of claim 13, wherein the at least one core channel extends around an entirety of the perimeter of the inner core material.

18. The FRP panel of claim 13, wherein the inner core material is an insulating material.

19. The FRP panel of claim 13, wherein the first outer wall and/or the second outer wall comprise gypsum or FRP.

20. The FRP panel of claim 13, wherein the at least one core channel extends a predetermined distance inward from the perimeter toward the center of the inner core material.

* * * * *